Jan. 23, 1951  H. T. AVERY  2,538,826
CALCULATING MACHINE
Filed March 15, 1949  13 Sheets-Sheet 1

INVENTOR:
Harold T. Avery
BY
Howard M. Dustin

INVENTOR.
Harold T. Avery

Jan. 23, 1951  H. T. AVERY  2,538,826
CALCULATING MACHINE
Filed March 15, 1949  13 Sheets-Sheet 4
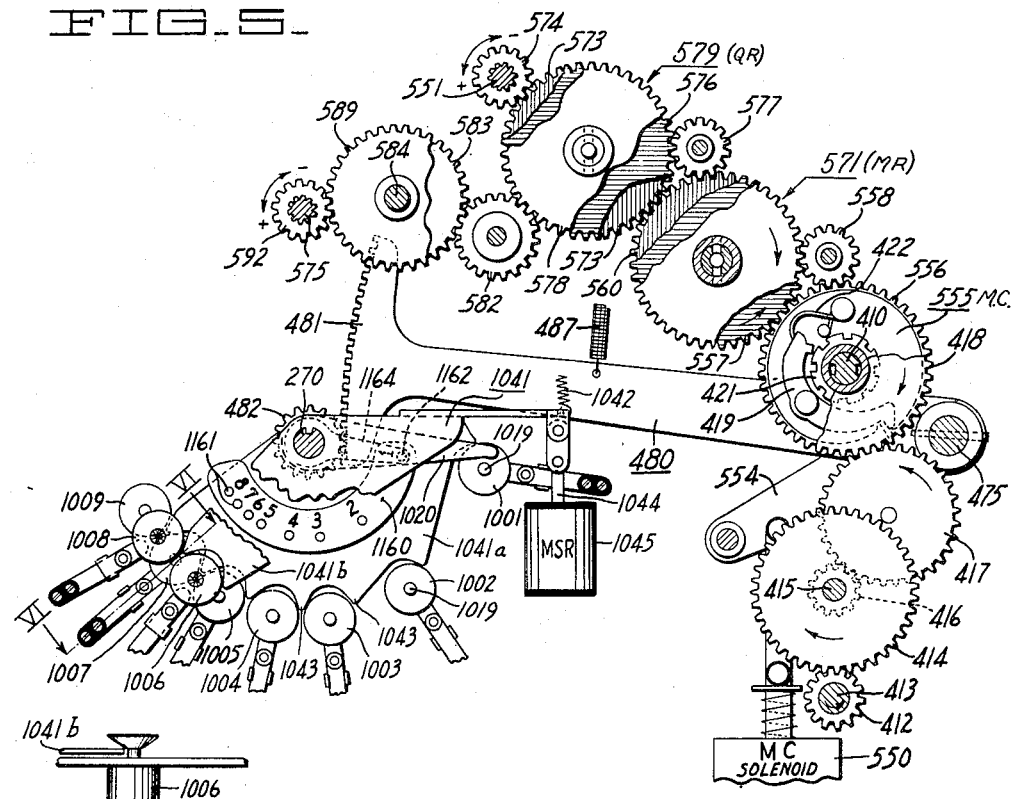
FIG. 5.
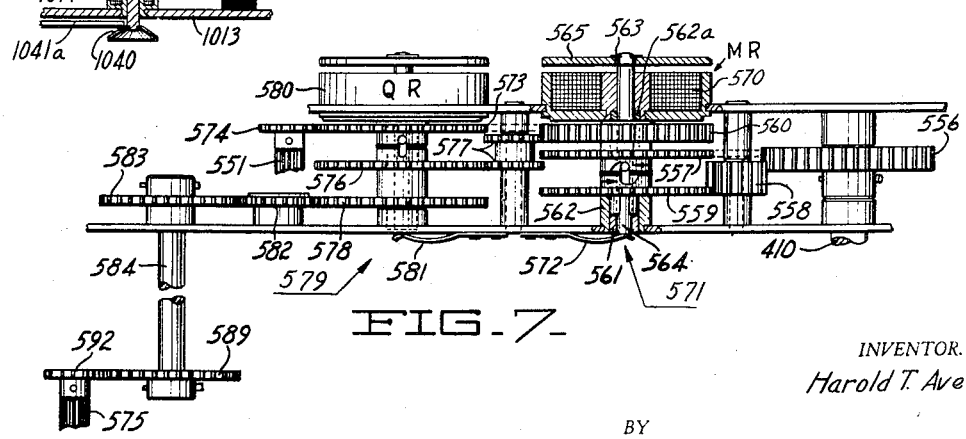
FIG. 6.
FIG. 7.
INVENTOR.
Harold T. Avery
BY
Howard M. Dustin.

Jan. 23, 1951     H. T. AVERY     2,538,826
CALCULATING MACHINE
Filed March 15, 1949     13 Sheets-Sheet 5
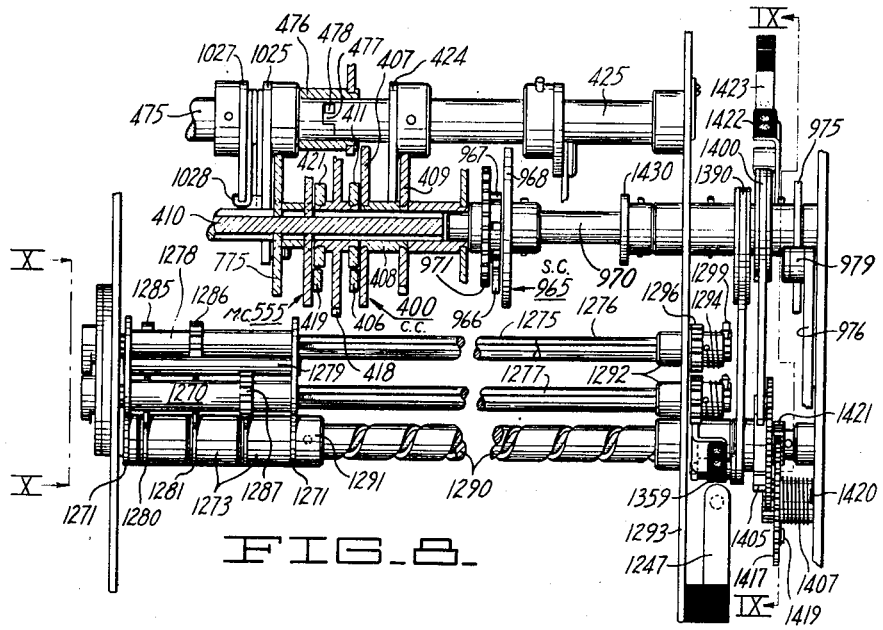
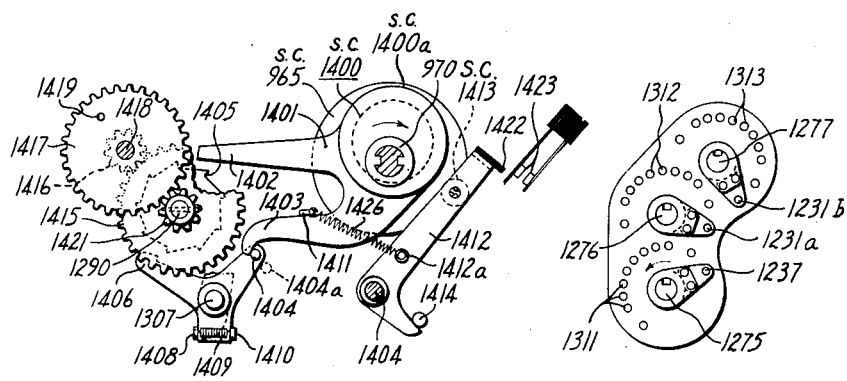
INVENTOR.
*Harold T. Avery*
BY
*Howard M. Dustin.*

Jan. 23, 1951   H. T. AVERY   2,538,826
CALCULATING MACHINE
Filed March 15, 1949   13 Sheets-Sheet 6

INVENTOR.
Harold T. Avery
BY
Howard M. Dustin.

Jan. 23, 1951 H. T. AVERY 2,538,826
CALCULATING MACHINE
Filed March 15, 1949 13 Sheets-Sheet 7
FIG.13.
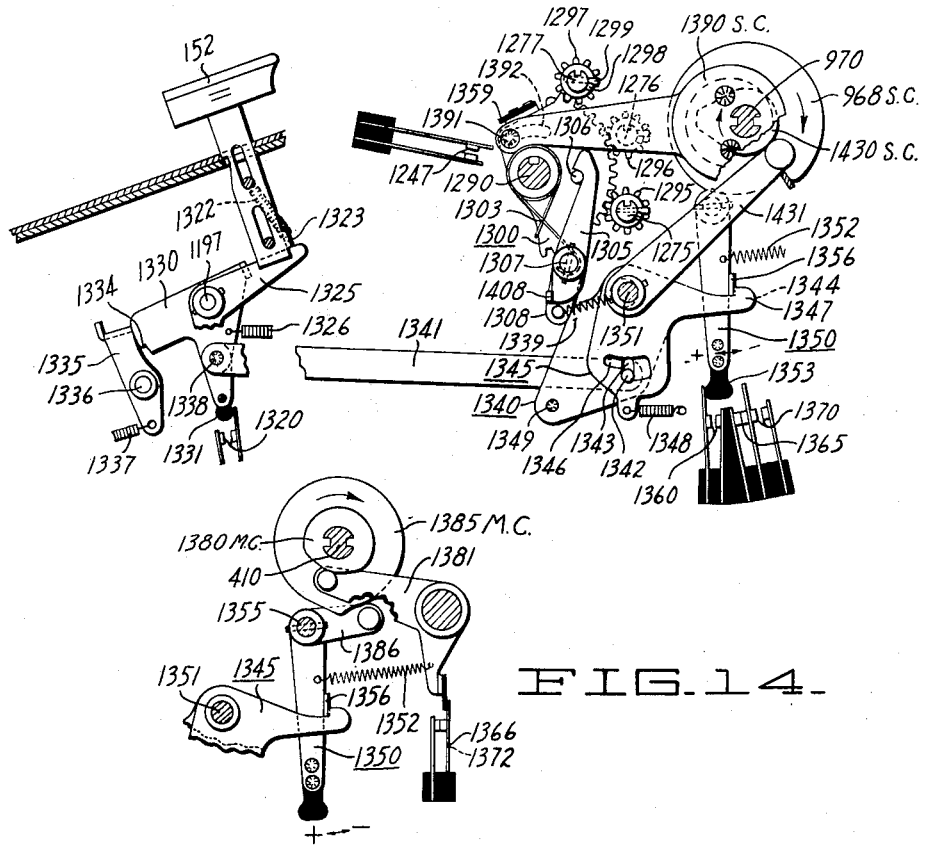
FIG.14.
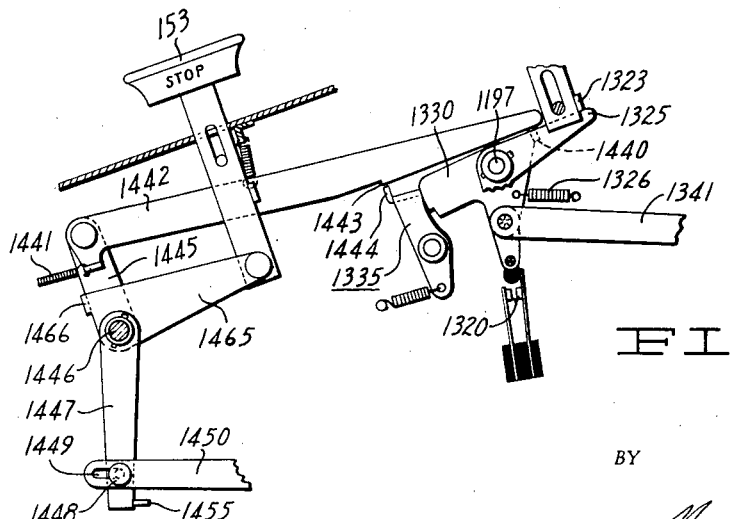
FIG.15.
INVENTOR.
Harold T. Avery
BY
Howard M. Dustin.

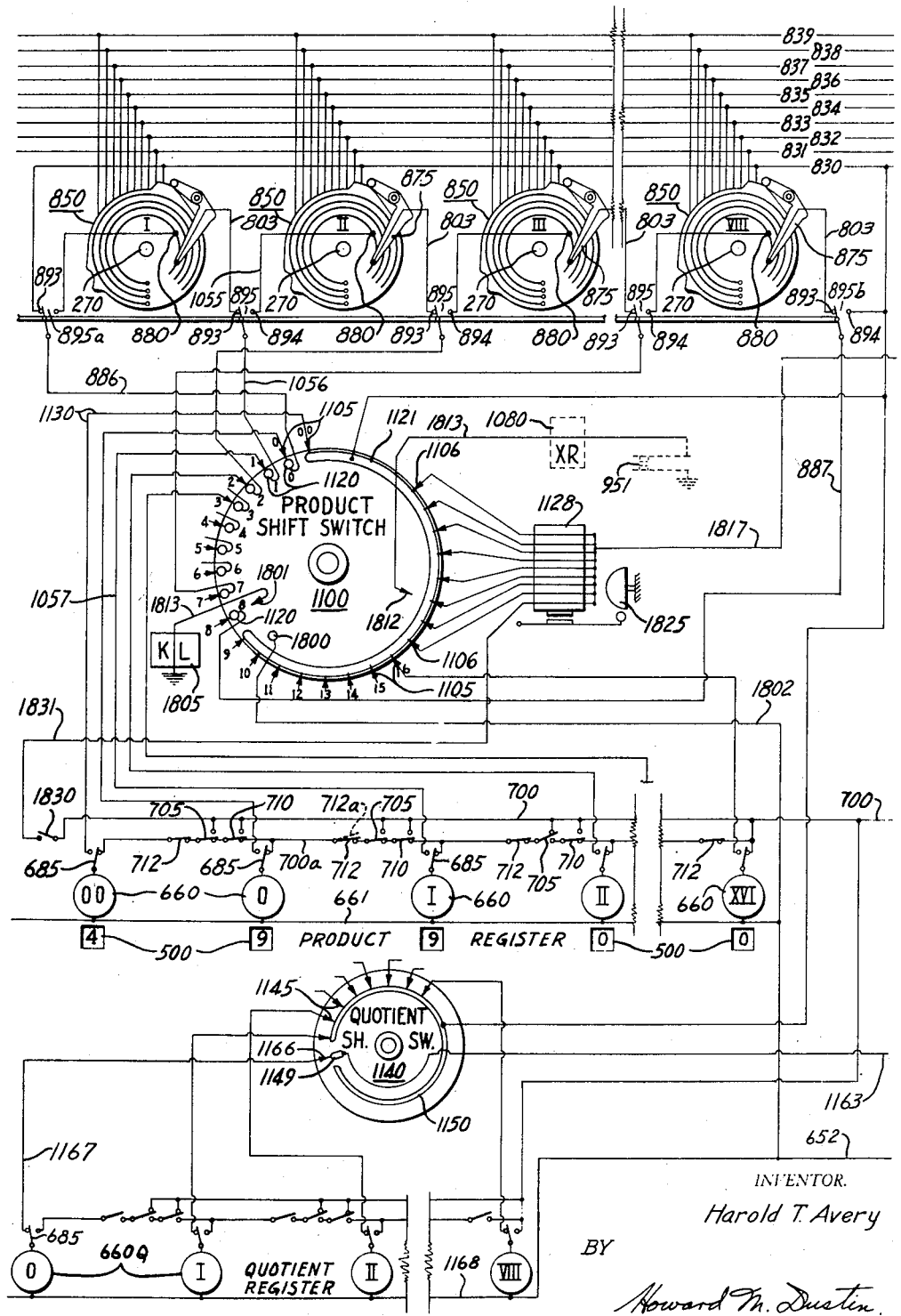

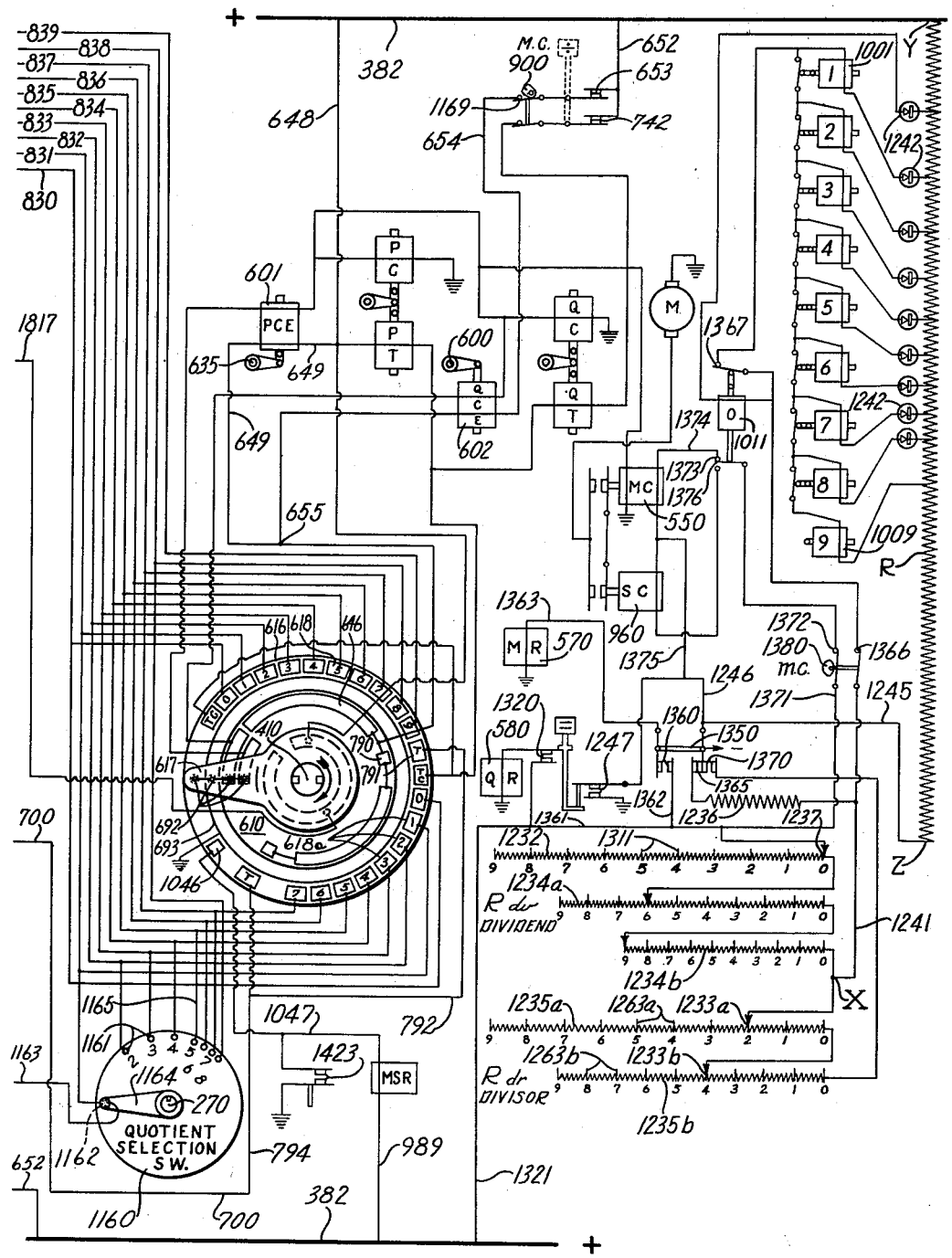
FIG.16-B.

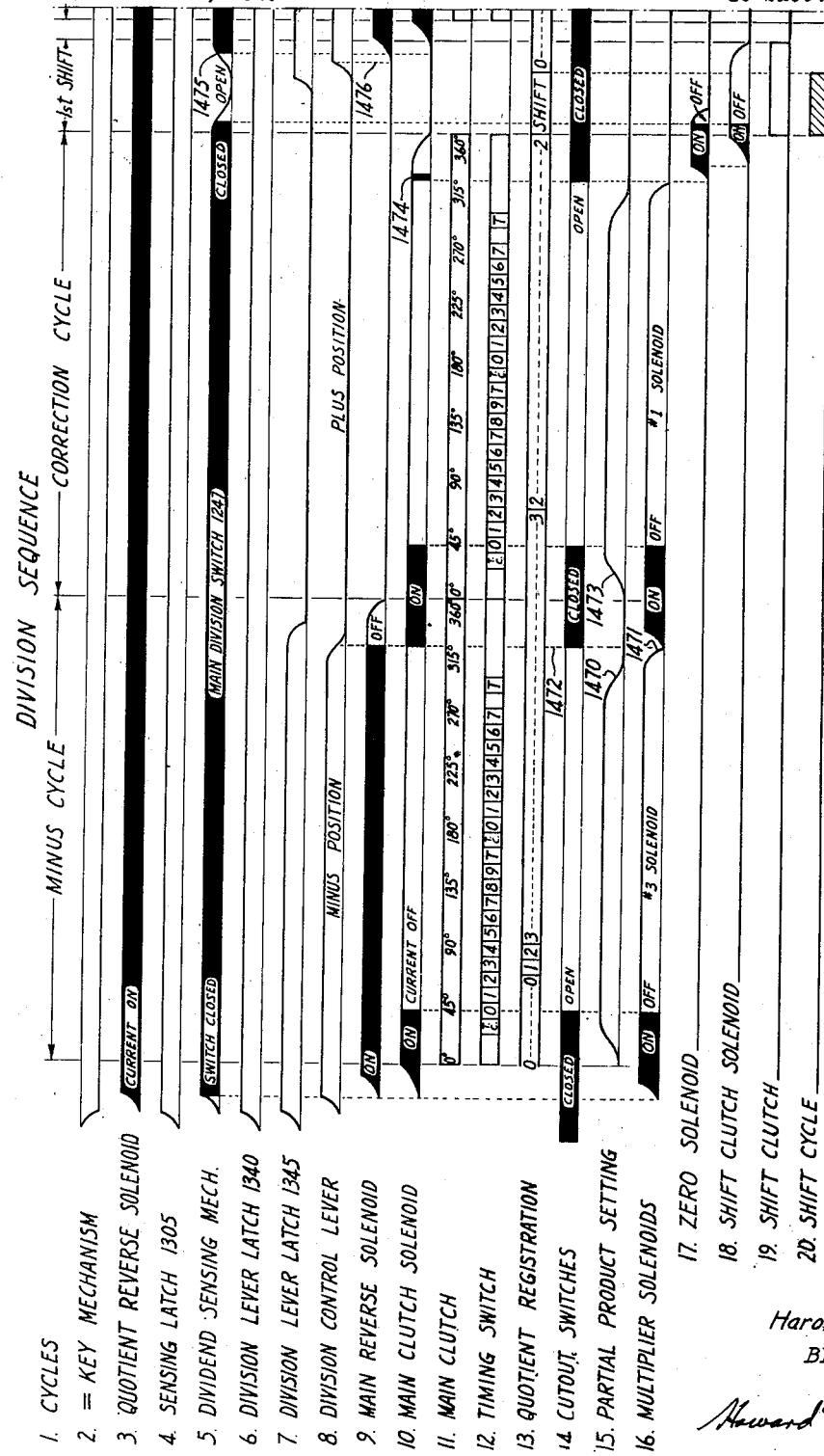

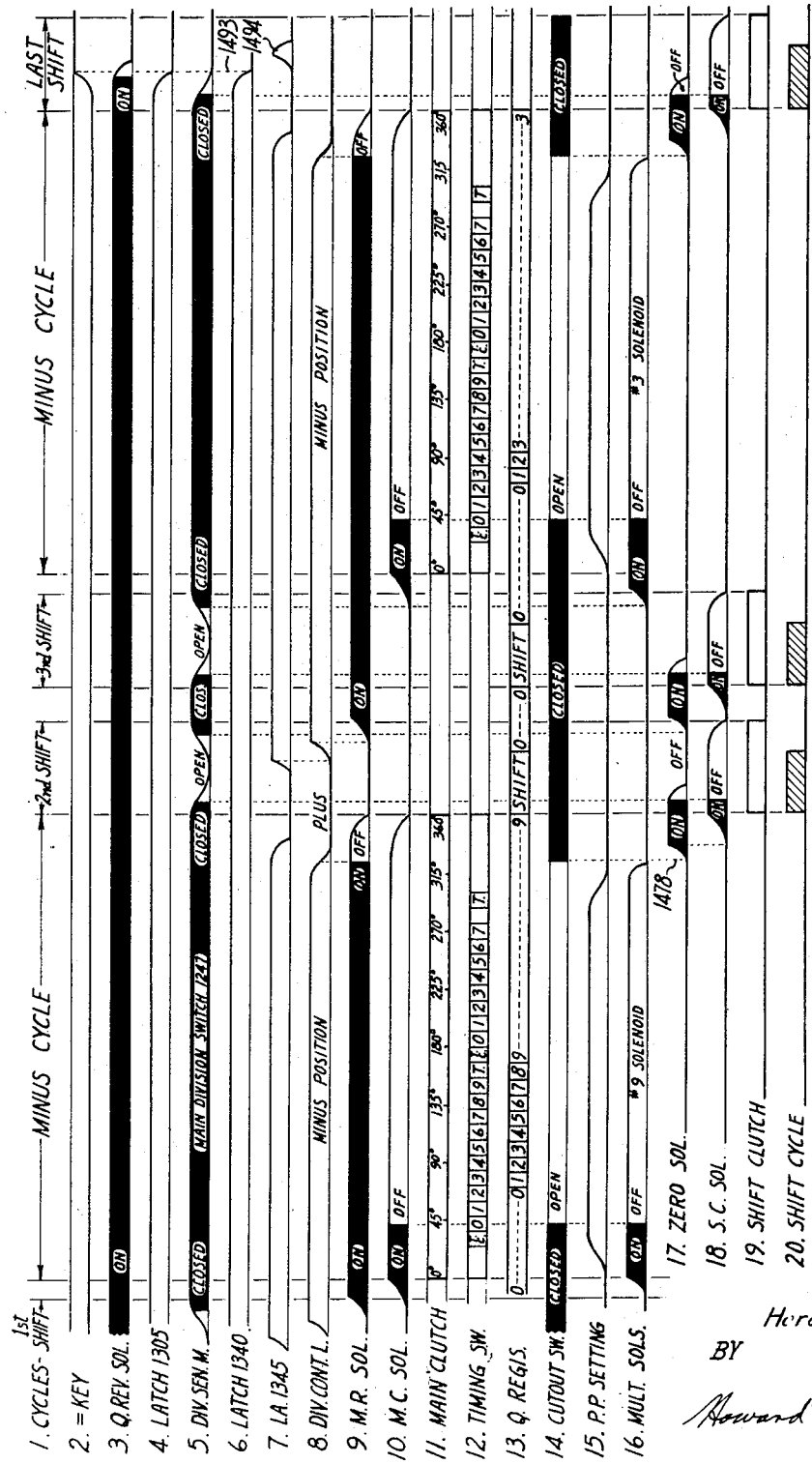

Jan. 23, 1951 H. T. AVERY 2,538,826
CALCULATING MACHINE
Filed March 15, 1949 13 Sheets-Sheet 12

INVENTOR:
Harold T. Avery
BY
Howard M. Dustin.

Patented Jan. 23, 1951

2,538,826

UNITED STATES PATENT OFFICE 2,538,826

CALCULATING MACHINE

Harold T. Avery, Oakland, Calif., assignor to Marchant Calculating Machine Company, a corporation of California Application March 15, 1949, Serial No. 81,501

20 Claims. (Cl. 235—61)

The present invention relates to calculating machines and more particularly to automatic division mechanism therefor.

In performing division on conventional calculating machines, it is the usual practice to subtract the product of a quotient digit times the divisor from the divident or current remainder. This has been accomplished by a number of different methods, of which, the repeated subtraction method has been most generally used. This requires a great number of machine cycles to perform a division calculation, and in order to reduce the over-all time required for performing such division calculations by this method, the cyclic speed of the actuating mechanism of such machines has been increased to such a degree that there would appear to be relatively little room for further gains in this direction.

Numerous ingenious mechanisms have been devised to reduce the number of cycles of operation necessary to enter, either negatively or positively, the product of two numbers into an accumulator. Some of the mechanisms have been based on what is known as partial product multiplication, by means of which a multi-digit product of one multi-digit factor times at least one digit of another factor is predetermined and entered into the accumulator during a single cycle of operation; while other mechanisms have been based on various methods of short cutting either or both the factors which determine the value of the product.

To take full advantage of the time saving characteristics of these multiplication mechanisms in the performance of division calculations, it becomes necessary to pre-estimate the value of each quotient digit before multiplication of the quotient digit times the divisor may be initiated because these mechanisms are capable of operation only when both factors are known in advance of the start of the multiplication.

A form of electrical pre-estimation division mechanism in combination with partial product multiplication mechanism was disclosed in the Weiner Patent No. 1,813,830. This division mechanism is based on a complicated system comprising a network of what may be termed "estimating grids" which are controlled by a great number of multiple contact relays. Selected ones of these relays are energized in accordance with the value of certain of the higher order digits of the dividend and divisor and close one circuit out of several hundred to thereby energize one of ten quotient solenoids corresponding to the estimated quotient digit. The Weiner machine is capable of making this estimation on the basis of only one digit of the divisor and two digits of the dividend and therefore the initial estimation may be in error by any amount up to five. Weiner, therefore provides for a system of trial multiplication, comparisons, and subsequent corrections which are repeated until the correct quotient digit is found. The time required for these trial operations is so great, particularly in view of the large percentage of cases in which the quotient digit is initially estimated erroneously that the time saved in pre-estimating is largely, if not entirely, offset thereby.

To improve the accuracy of the initial estimation, it would be necessary to take into account three digits of the dividend and two digits of the divisor, but the basic system of Weiner is such that increase in the capacity of the machine to take into account the three and two digits of the dividend and divisor factors respectively would increase the required number of circuits from several hundred to several thousand, together with a corresponding increase in the number of relays and grids.

In contrast with the Weiner system, a form of mechanical comparison division has been disclosed in the Avery Patent No. 2,343,273. The latter mechanism comprises comparator means one part of which is adjustable in accordance with a single compounded value corresponding to three digits of the dividend and another part of which is adjustable in accordance with a similarly compounded value corresponding to two digits of the divisor. These adjustments are arranged to directly set a quotient member to a position indicative of the estimated quotient digit, instead of selecting one of a multiplicity of devices as Weiner does. Division problems, however, vary so widely that it may become necessary, in one case, to compare a dividend value such as 987 with a divisor value of 99, for example, while in another case it may be necessary to compare a dividend value of 012 with a divisor value of 11.

If the single mechanical movement representative of the larger of the above mentioned dividend figures is limited to an amplitude suitable for incorporation in a calculating machine of ordinary size, the corresponding movement representative of the smaller dividend figure would be reduced to such an extent that backlash and mechanical variations would destroy the accurate representation of the latter. Therefore, two comparators were provided in the prior Avery machine, one for comparing the three highest order significant digits of the dividend with the two highest order digits of the divisor, and another which supersedes the first comparator when the first of said three dividend digits is zero to thereby afford accurate comparison of the remaining two significant digits of the dividend with the two digits of the divisor. A great simplification of pre-estimation division mechanism was thereby accomplished coincidentally with the securing of more accurate estimation.

The electrical comparing and estimating means of the present structure takes advantage of the prior Avery principle of compounding a multi-digit value into a single representative value, but effects this compounding in a different way so as to entirely avoid inaccuracies due to backlash and mechanical variations.

This is accomplished by providing a separate resistor for each of the three highest order digits of the dividend and the two highest order digits of the divisor, and adjusting each resistor by full steps corresponding to full digital increments. These adjustments therefore constitute a simple conversion from digital increments into increments of resistance. The compounding is then effected by connecting the three dividend resistors in series and the two divisor resistors in series, thereby establishing two single representative resistance values corresponding to the three and two digits respectively of the dividend and divisor.

It may be seen therefore that by providing the full step adjustment of the resistors, the inaccuracies due to backlash and misalignment of the numeral wheels or mechanical variations in the other mechanism for adjusting the resistors are completely corrected, and no accumulation of backlash and mechanical variations are involved in compounding by the simple connection of the resistors in series.

A further and more important advantage over the prior mechanical comparing means arises from the fact that in mechanical devices it is very difficult, if not impossible for all practical purposes, to provide a mechanical movement, the maximum value of which may be of the order of one hundred times its minimum value, and to have anything like the same percentage of accuracy in the maximum and minimum values, whereas in electrical devices such as that shown in the present case, resistance values which vary as greatly as in the ratio of one hundred to one, may be readily established and utilized with substantially equal percentage of accuracy in each. Therefore, only one comparing means is necessary in the present case.

The above mentioned resistance values are compared in a system based on the principles of the Wheatstone bridge. In the establishment of these resistance values the resistors are adjusted in such a way as to cause a certain operating current to flow across the bridge, and this current is utilized to control the operation of certain electromagnetic devices used for the selection of estimated quotient digits. When the resistances are established at a given ratio, a corresponding current flow is effected across the bridge, but the characteristics of the Wheatstone bridge are such that proportional increases in the resistances forming the legs of the bridge, cause a decrease in the flow of the controlling current. I have discovered that the variations in such current flow may be minimized by modifying the increments of resistance representing the various numeral values to provide, in accordance with a definite plan, a non-proportional relationship between the resistances representing proportional numeral values.

More specifically I have discovered that the accuracy of quotient estimation may be enhanced by effecting the following modifications from the principles of a simple balanced Wheatstone bridge:

(1) Providing a quotient resistor on the side of the bridge opposite the dividend and divisor resistors, tapped at such points that the establishing of pre-selected critical ratios of resistance will, instead of balancing the bridge, cause enough current to flow across it to operate the proper electromagnetic devices.

(2) Basing the dividend and divisor resistors, respectively, on different respective units of resistance so as to more nearly equalize the steps of quotient resistance, and thereby achieve accuracy of quotient estimation in the various parts of the quotient estimating range.

(3) Arranging the successive steps of dividend and of divisor resistances in accordance with non-uniform scales such that the current flow across the bridge will be substantially the same for a given dividend-divisor ratio regardless of the specific size of the respective dividend and divisor.

(4) Alternatively, establishing respective control voltages for a series of electronic tubes by comparing the fixed potentials of the taps on the quotient resistor with the potential established by the dividend and divisor resistances, and causing electrical current, independent of the bridge circuit, to selectively flow through the plate circuits of said tubes as determined by the respective control voltages of the tubes. The flow of plate current through a significant tube may be used for energization of a respective quotient electromagnet or the like.

It is therefore a principal object of the invention to provide an improved and simplified mechanism for comparing the value of the divisor with that of the dividend or current remainder and to pre-estimate on the basis of such comparison the value of each successive quotient digit.

It is a further object of the invention to provide an improved pre-estimation division system which is particularly adapted to electro-magnetically controlled calculating machines.

It is a further object of the invention to utilize the characteristics of an unbalanced Wheatstone bridge for controlling the pre-estimation division mechanism of calculating machines.

It is a further object of the invention to cause current to so flow across a Wheatstone bridge in response to the setting up of a division problem that the flow of current may be utilized to operate with a high degree of accuracy the division control mechanism of a pre-estimation division system.

It is a further and more specified object of the invention to electrically connect into a modified Wheatstone bridge circuit, the electro-magnets which control the multiplication mechanism of a calculating machine.

It is a further and more specific object to selectively energize a quotient electro-magnet by the flow of plate current through a respective electronic tube and to control said flow of current by comparing the fixed potential of a respective tap on the quotient resistor with a potential determined in accordance with the dividend and divisor resistances.

It is a further and more specific object of the invention to establish on one side of a modified Wheatstone bridge a plurality of resistance ratios which are representative of the integers 0 to 9, to establish on the outer side of the bridge a selected resistance ratio which is representative of the ratio of the divisor to the dividend or current remainder, to compare the selected resistance ratio with the plurality of resistance ratios, and to select one the basis of such comparison the integer which corresponds to the ratio of the divisor to the dividend.

Other objects will appear during the following detailed description of a preferred form of the invention, reference being made to the accompanying drawings forming a part of this specification in which:

Fig. 5 is a longitudinal section, as viewed from the right, showing particularly the drive train for the numeral wheel shafts and part of the multiplication controlling mechanism.

Fig. 6 is a detailed sectional view of the multiplier solenoids and related mechanism, the section being taken on the line VI—VI of Fig. 5.

Fig. 7 is a plan view of the numeral wheel shaft drive trains and reversing mechanism shown in Fig. 5. In this view, the left side of the machine is at the top of the figure.

Fig. 8 is a plan view of the various clutches in the machine, and the mechanism actuated by the shift clutch for shifting the dividend sensing carriage. In this view, the top of the figure is at the rear of the machine.

Fig. 9 is a sectional view taken on the line IX—IX of Fig. 8 showing particularly the dividend sensing carriage shifting mechanism.

Fig. 10 is a side view taken from the left side of the machine as indicated by the arrows X—X of Fig. 8, showing the dividend sensing switches.

Fig. 13 is a right side view of the division control mechanism showing particularly the "equals" key and the mechanism controlled thereby for enabling the dividend sensing mechanism and for initiating a division operation.

Fig. 14 is a right side view of the cams for actuating the division cut-out switches and for restoring the division control lever from the minus to plus position.

Fig. 15 is a right side view of the control key section, showing particularly the "stop" key and the mechanism actuated thereby for releasing the "equals" key and for stopping the machine.

Figs. 16A and 16B when combined, form a wiring diagram of the machine.

Figs. 17A and 17B when combined, form a timing chart of the sequence of division operations in the solution of a typical problem.

Figure 18:
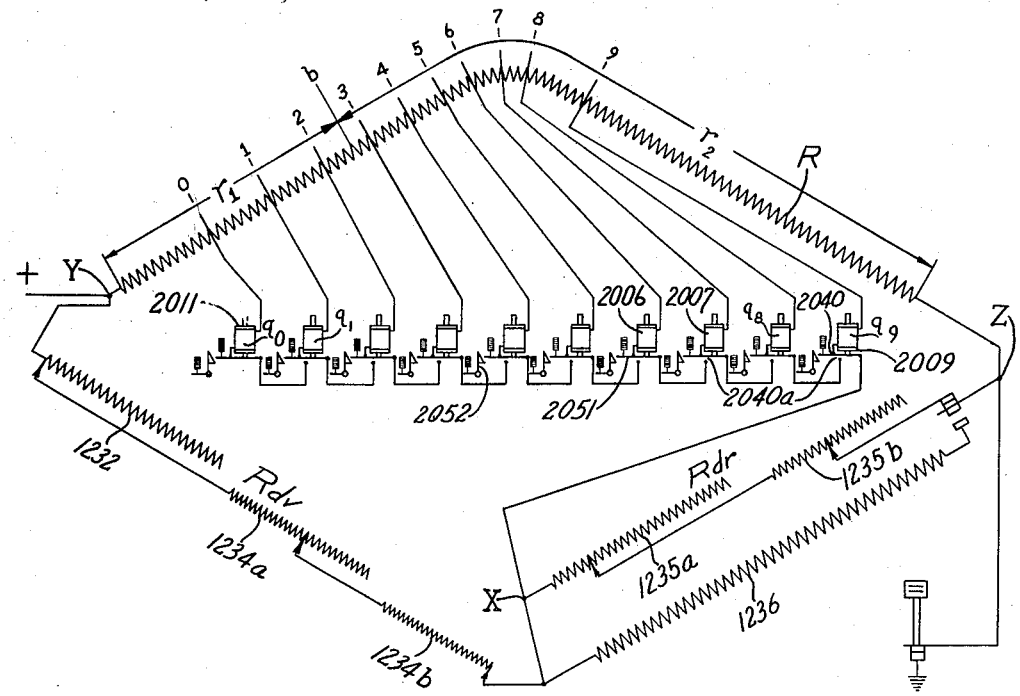

Fig. 18 is a schematic diagram of a second embodiment of the quotient estimating system.

Figure 20:
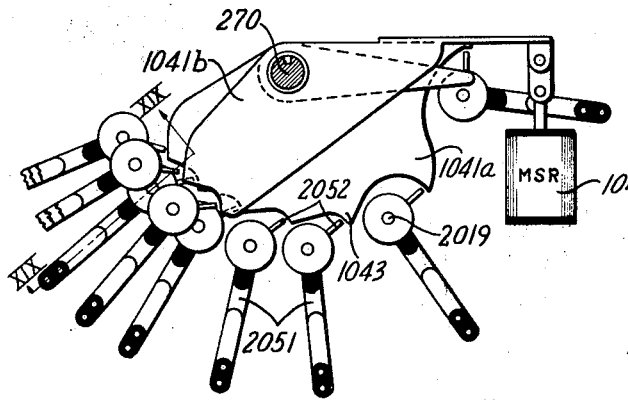
Figure 19:
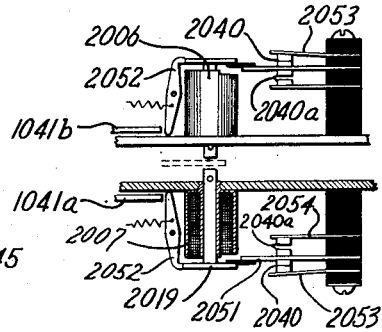

Fig. 19 is a detailed sectional view of the multiplier solenoids and related mechanism of the second embodiment, the section being taken on line XIX—XIX of Fig. 20.

Fig. 20 is a modification of the multiplier solenoid release mechanism shown in Fig. 5.

Figure 21:
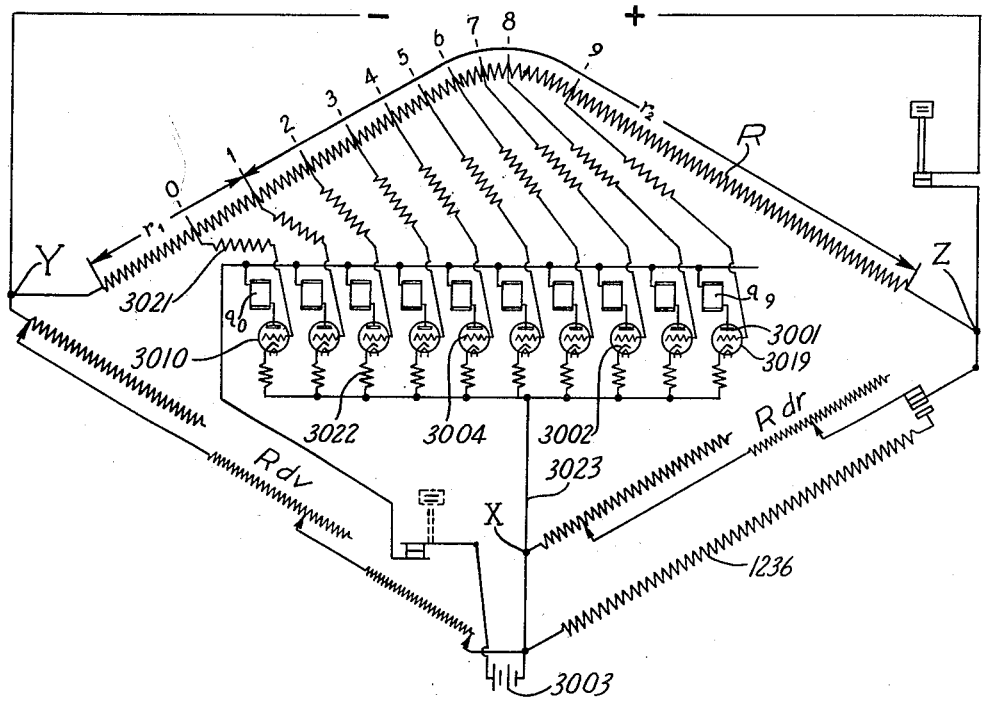

Fig. 21 is a schematic diagram of a third embodiment of the quotient estimating system.

This application is a continuation in part of the patent application Serial No. 554,558, filed September 18, 1944, and abandoned March 17, 1949 which was a division of the patent application Serial No. 506,519, filed October 16, 1943, now Patent No. 2,467,419, issued April 19, 1949. The latter application discloses a machine that departs from conventional calculating machines in several respects, namely, the operator simply "writes" the problem on the keyboard of the machine, as it appears on paper by depressing the keys in rapid succession, after which, the answer appears in a result register.

In division, the dividened is first set up in the left factor indicator 110 (Fig. 3) by depression of the numeral keys 140—149. Depression of the dividend (÷) key 151 transfers the amount from indicator 110 to the product or dividend register 100 and automatically clears indicator 110. The divisor is then entered into indicator 110 and upon depression of the "equal" (=) key 152 an automatic division operation is initiated. During such operation the quotient digits are estimated by novel electrical devices, described hereinafter, and are successively entered into the quotient register 120.

The present invention, comprising a quotient pre-estimating mechanism, preferably is embodied in a machine in which the actuators are controlled by a partial product multiplying mechanism. In such a machine the partial products of the divisor times a quotient digit are subtracted from the dividend register during a single cycle of operation of the machine regardless of whether the quotient digit is a one or a nine.

The quotient pre-estimating mechanism is also applicable to that type of machine which performs division by the repeated subtraction method. In such a machine the stopping of the actuators is determined during the operation thereof and thus limits the speed of the machine; whereas the application of a pre-estimating mechanism to such a machine makes it possible to determine when the stopping will occur well in advance of the stopping and even in advance of the starting. This permits a substantial increase in the operating speed of the machine. It should be understood, therefore, that the use of the pre-estimating mechanism is not limited to the particular embodiment disclosed herein, but that other alternative uses will occur to those skilled in the art.

SELECTING MECHANISM

The numeral keys 140—149 (Fig. 3) effect entry of values into the numeral wheels of indicator 110 by means of a shiftable set-up carriage mechanism which moves ordinally step by step into operative relation with successive numeral wheels of the indicator.

The set up carriage mechanism includes the carriage 240 (Fig. 4) and the ten levers 251 carried thereby. The levers are slidably mounted on the shafts 190—199 to permit shifting of the carriage and the levers relative to the ordinally arranged blocking levers 258. Depression of the numeral keys 140—149 (Fig. 3) rocks a respective shaft 190—199 and lever 257. The latter, in turn, rocks an aligned blocking lever 258. The rocking of any one of the blocking levers releases an associated ordinal setting arm 280. Upon such release the setting arm rotates counterclockwise until it is blocked by the operated blocking lever 258. The arm 280 includes a gear segment 281 which enmeshes with an idler gear 282. The latter is enmeshed with a numeral wheel gear 283 which is rotated by the differential rotation of arm 280 and indicates the selection made in that order.

After each ordinal set-up the selection set-up carriage and the levers 257 are shifted to the next lower order so that the second digit of the factor may be entered in the manner described above. This process is repeated until the setting of the desired number of digits into factor indicator 110 is completed.

The above described selection mechanism is fully described and claimed in the patent application Serial No. 581,514, filed March 7, 1945, now Patent No. 2,459,862 to which reference may be had for a more complete understanding of the specific operation of the selection mechanism.

Figure 12:
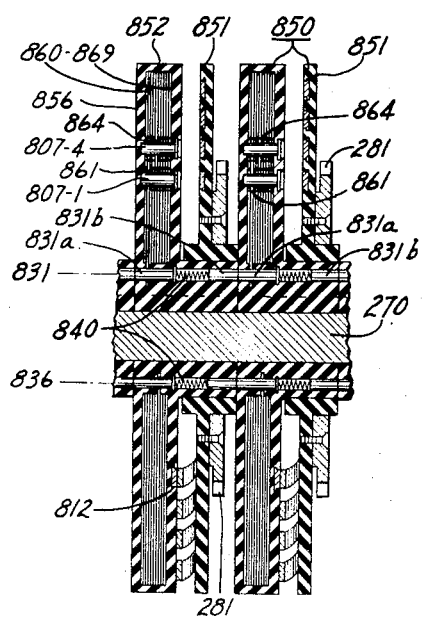
Fig. 12 is an enlarged sectional view of two orders of partial product selectors.

A multiplicand selection disc 851 (Fig. 12) is attached to each gear 281 (Figs. 4 and 12) for rotation therewith. Each multiplicand disc 851 together with a respective "multiplier disc," described hereinafter, comprises one order of a partial product selector mechanism. In division operations the multiplicand discs are set according to the value of the divisor which is set up in indicator 110 while the multiplier discs are all set and then reset in each successive order according to the value of the current quotient digit.

The above mentioned partial product multiplying mechanism is fully described and claimed in the patent application Serial No. 793,503, filed December 23, 1947. The latter application and the application Serial No. 581,514, mentioned hereinbefore, are divisions of the previously mentioned application Serial No. 506,519. Reference may be had to the latter application for a complete disclosure of the parts of the machine not specifically described herein, it being noted that the parts shown in the drawings, but not described in this specification will be found to bear the same reference numerals used to identify the corresponding parts in said application. The parts so identified but not described, operate exactly as described in said application.

REGISTERS

Each ordinal numeral wheel of the product and quotient registers is actuated by an ordinal clutch which is of the type shown and described in the Avery Patent No. 2,387,870, issued October 30, 1945, to which reference may be had for a description of the clutch and control mechanism not specifically disclosed herein. Each order of the dividend register includes a numeral wheel 500 (Fig. 4) which is advanced by a respective ordinal clutch generally indicated at 500A. Each clutch is engaged by the rocking of a shaft 635 at a fixed time in the operating cycle of the machine, and this shaft is rocked by the energization of a PCE (product clutch engaging) solenoid 601 diagrammatically illustrated in Fig. 16B and fully described in the application Serial No. 506,519. Disengagement of a clutch is effected by the energization of an associated electromagnet 660 (Fig. 4) at a selected time in the operating cycle. In any order where a numeral wheel is not to be advanced, the electromagnet 660 in that order is energized slightly before shaft 635 is rocked, thus preventing engagement of the clutch 500A.

The quotient register numeral wheels are driven by clutches (not shown) which operate in the same manner as the clutches for the dividend register numeral wheels. The quotient register clutches are engaged under control of a shaft 600, diagrammatically illustrated in Fig. 16B and which shaft is rocked by energization of the QCE (quotient clutch engaging) solenoid 602. The quotient clutches are disengaged by energization of respective clutch disengaging magnets 660Q (Fig. 16A). The QCE solenoid 602 (Fig. 16B) shaft 600, and the electromagnets 600Q for the quotient register, operate in the same manner as corresponding parts for the dividend register.

The control of the numeral wheel clutches is derived from the operation of a timing switch 610 (Fig. 16B) which includes a stationary insulating disc 616 having a plurality of contacts molded or otherwise mounted thereon, and an arm 617. This arm is mounted for rotation with a main clutch shaft 419 and is driven in time with the numeral wheel drive shafts, which are also driven by the main clutch as described hereinafter. The arm 617 carries four brushes shown by dotted lines and identified by the reference numeral 692. Since the four brushes are electrically connected and could as well be a single brush spanning the four circles of contact, these brushes will be considered as a single brush 692 and referred to as such hereinafter.

Engagement of the product and quotient numeral wheel clutches is effected at a fixed time early in the main clutch cycle by movement of the brush 692 (Fig. 16B) onto contact 646, thereby connecting that contact to a ground contact ring 693, and completing the circuit from the main line 382 shown at the top of Fig. 16B, leads 648 and 649, and through the PCE (product clutch engaging) solenoid 601 to the junction point 655, and also from the main line 382 through a parallel circuit including lead 652, the normally closed contacts 653 and 1169, lead 654, and the QCE (quotient clutch engaging) solenoid 602 to the junction 655, and therefrom to the contact 646, brush 692, and the contact ring 693 to ground. Closure of the above circuit at the fixed time in the cycle therefore energizes the solenoids 601 and 602 which rock their respective shafts 635 and 600 to effect engagement of the product and quotient numeral wheel clutches in the manner described in the application Serial No. 506,519.

Energization of a clutch disengaging magnet 660 (Fig. 16A) at a selected time in the cycle of the machine is effected by the arrangement and timing of the following mechanism. In the particular embodiment shown, the quotient and dividend numeral wheel drive shafts, described hereinafter, are driven three revolutions or the equivalent of thirty digital increments during a main clutch cycle, and the timing switch arm 617 (Fig. 16B) makes one revolution per main clutch cycle. The contacts 618 are spaced one-thirtieth of 360° or 12° apart, so that the brush 692 mounted on the arm 617 sweeps from one contact to the next synchronously with the movement of the numeral wheel from one numeral to the next. A plurality of partial product selectors, previously mentioned, are adapted to connect selected ones of the contacts 618 of the timing switch into the digitation control circuits controlling the magnets 660 in such a way that if one of the partial product selectors in a given order is set for a five product selection, for example, the number 5 selection circuit connected to the number 5 contact 618 (Fig. 16B) only is closed, and as the numeral wheel, in the order with which it is associated, approaches the fifth digit from an initial position, the brush 692 passes onto the number 5 contact and completes the circuit from ground through the contact ring 693, brush 692, the number 5 contact 618, the lead 835 (Figs. 16B and 16A), through a selected partial product selector 850 (Fig. 16A), the switch 895, the product shift switch 1100, through the selected numeral wheel control magnet 660 to the lead 661, and lead 652 which is connected to the main line, thereby causing energization of this magnet and disengagement of the numeral wheel clutch as the numeral wheel enters its fifth position.

The partial product selectors 850, the switches 895 and the product shift switch 1100 all operate in the manner described in the application Serial No. 506,519. It should be noted that the product shift switch 1100 (Fig. 16A) is operated by a shift clutch described hereinafter, to connect the partial product selectors 850 to successive ordinal series of disengaging magnets 600. The timing switch 610 (Fig. 16B) also operates to control the energization of the quotient clutch disengaging magnets 660Q (Fig. 16A) in a manner fully described in connection with division operations.

Since the partial products of any two numbers may comprise a "tens" partial product as well as a "units" partial product, the timing switch 610 (Fig. 16B) includes the two series of contacts 618 and 618a for controlling first the entry of the "units" partial products and then the entry of the tens partial products respectively during each cycle of rotation of the timing switch arm 692. The respective "units" and "tens" partial products are referred to hereinafter as RHPP (right hand partial products) and LHPP (left hand partial products) for convenience and also to prevent confusion between the term "tens carry" and the term "tens" partial products.

TENS TRANSFER MECHANISM

The tens transfer mechanism for the product and quotient registers is substantially the same as that shown in the Avery Patent No. 2,416,369, issued February 25, 1947, and comprises briefly a system utilizing the digitation mechanism for effecting or preventing a transfer. Immediately following each RHPP and LHPP digitation phase of the machine's actuating cycle, each numeral wheel clutch is engaged for a transfer of tens if, during the last digitation period, the numeral wheel immediately to the right thereof passed from "9" to "0" in an additive direction or from "0" to "9" in a subtractive direction or if the mechanism is conditioned for a chain transfer as explained in the last mentioned patent. If not, the clutch engagement is prevented by energization of the same magnets 660 (Fig. 16A) which disengage the clutches in digitation. Reference may be had to the application Serial No. 506,519 for a description of the way in which the above tens transfer mechanism is utilized in a partial product machine.

DRIVING MECHANISM

During automatic division operations, motive power is employed to drive the various mechanisms of the machine through two principal clutches which are selectively engageable, namely, a main clutch and a shift clutch.

Main clutch

The main clutch is used to drive various control cams described hereinafter, the numeral wheel clutches, and the timing switch described hereinbefore. The main clutch 555 (Fig. 5) is of the same type of construction as the clutch shown in the Avery et al. Patent No. 2,162,238, issued June 13, 1939. Upon energization of a MC (main clutch) solenoid 550 (Fig. 5), a main clutch dog 554 is rocked clockwise to clutch engaging position.

A motor drive shaft 4.3 (Fig. 5) drives through the gearing shown to drive the main clutch which drives through suitable gear trains to rotate the two drive shafts 551 and 575 for the dividend and quotient register numeral wheel clutches respectively. The drive train from the main clutch to shaft 551 includes a MR (main reverse unit) generally indicated at 571 (Figs. 5 and 7) which is operable under the control of a MR solenoid 570 (Fig. 7). The drive train from the main clutch to shaft 575 (Fig. 5) includes the above mentioned main reverse unit 571 and a QR (quotient reverse) unit 579, the latter unit being operable under the control of a QR solenoid 580 (Fig. 7) to reverse the drive from the main reverse unit.

The MR solenoid is automatically energized and de-energized, as described under division operations, to cause negative and positive driving of the dividend register numeral wheels. The QR solenoid, however, is permanently energized during division operations to cause the quotient register numeral wheels to be driven in the opposite direction from that of the dividend numeral wheels.

For a more specific description of the reverse units and the drive trains from the main clutch to shafts 551 and 575, reference may be had to the application Serial No. 506,519.

MULTIPLICATION

The partial product multiplying mechanism is used in division to determine the partial products which result from multiplication of the divisor by a pre-estimated quotient digit.

Figure 3:
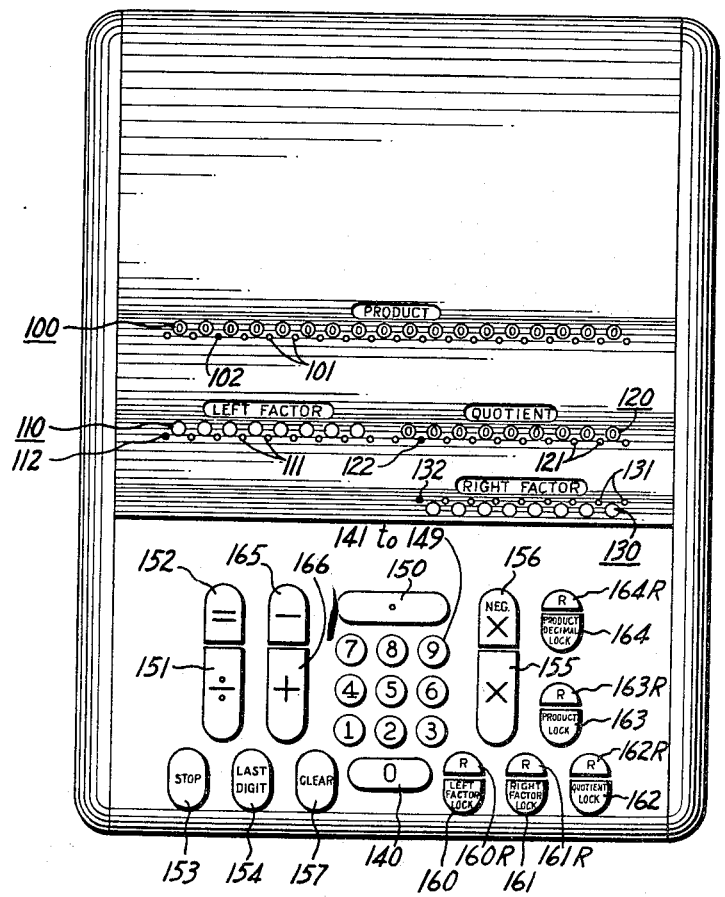
Fig. 3 is a top exterior view of the machine showing particularly the factor and result numeral wheels, and the various selecting and controlling keys therefor.

The partial product multiplying mechanism includes a partial product selector 850 (Fig. 12) for each order of the factor indicator 110 (Fig. 3). Each selector 850 (Fig. 12) comprises a multiplicand selection disc 851 and a multiplier selection disc 852.

The setting of the partial product multiplicand discs has been described in the section titled "Selecting mechanism." The multiplier discs are set in the following manner. Each multiplier disc 852 is keyed to the shaft 270 (Figs. 12 and 5) which also carries an arm 1020 (Fig. 5). Arm 1020 is reciprocated once during each multiplication cycle by operation of the main clutch. A yieldable driving mechanism disclosed in the application Serial No. 506,519, is provided between the main clutch and arm 1020 so that the arm may be blocked in any one of its positions by a corresponding multiplier solenoid 1001—1009, while the main clutch and related mechanisms operate through a fixed cycle.

The multiplier solenoids 1001—1009 are arranged on an arc about shaft 270 and each solenoid includes a plunger 1019 (Figs. 5 and 6) which is ejected into the path of the arm 1020 upon energization of the solenoid. A selected solenoid is energized by the quotient pre-estimating mechanism, as described hereinafter, before the arm 1020 is rocked clockwise. Then the multiplier discs are simultaneously set upon rocking of the arm 1020 to a selected position determined by the energization of a multiplier solenoid 1001—1009. The multiplicand discs having been previously set, as explained hereinbefore, the partial product circuits are thus established for controlling the multiplying operation.

A typical multiplier solenoid is shown in section in Fig. 6, and includes a casing 1012, made of any ferromagnetic alloy, which is riveted to, or otherwise mounted on a machine frame plate 1013. Two coils 1016 and 1017 are fitted into the casing 1012, the first of which coils is used in multiplication operations, and is disabled during division operations, while the second coil is used only in division. A permanent magnet 1018 is fixed to a solenoid plunger 1019, which plunger is made of non-magnetic material such as austenitic stainless steel or beryllium copper. When the solenoid is de-energized, which is normally the case, the permanent magnet 1018 "sticks" to the casing 1012 and holds the plunger in the position shown. When a selected solenoid is energized, however, an opposing electromagnetic field is established which overcomes the permanent magnetic force, and forces the plunger and permanent magnet upwardly as viewed in Fig. 6. When any magnet such as the present permanent magnet 1018 is separated from another magnetic body, the effective force of the magnetic field is reduced rapidly as the separation increases; therefore after the current to the solenoid is cut off by mechanism described hereinafter, the force of the spring of the relay switch 1240 is sufficient to hold the plunger ejected, where it remains until it is recocked by the following mechanism.

A cone shaped member 1040 is riveted to the lower end of the plunger 1019, as viewed in Fig. 6, and when the plunger is ejected, the cone moves upwardly until it abuts the frame plate 1013. A bail 1041 (Fig. 5) is mounted for free rocking movement on shaft 270 and is urged counter-clockwise by a spring 1042. An armature stem 1044 of a MSR (multiplier solenoid restore) solenoid 1045 is connected to the bail 1041 and limits said counter-clockwise movement of the bail to the position shown. The bail 1041 includes two plates 1041a and 1041b, the first of which has a plurality of tips 4043 which normally lie beyond the periphery of the cones of the solenoids 1001 to 1005, inclusive, and 1007 and 1009, with enough clearance to permit free travel of the cone during ejection of the plunger; while the tips of the second plate lie in similar proximity to the periphery of the cones of the solenoids 1006 and 1008. The MSR solenoid is energized near the end of the main clutch cycle by means described immediately hereinafter, which energization pulls the plunger 1044 downwardly, as viewed in Fig. 5, and rocks the bail clockwise a limited amount. Upon such movement of the bail, the tips 1043 engage the cones 1040 which act as camming surfaces, as shown in Fig. 6, thereby causing any plunger 1019 which has been ejected to retract to ineffective position such as that in which the plunger 1019 is shown in Fig. 6. The engagement of the permanent magnet 1018 with the casing 1012 of the solenoid, causes the permanent magnet to "stick" to the casing with sufficient force to overcome the effect of the spring leaf of relay 1240 after the MSR solenoid is de-energized and the bail 1041 is returned to the position shown in Fig. 5 by spring 1042.

The MSR solenoid is energized as follows: As described hereinbefore the arm 617 of the timing switch 610 (Fig. 16B) is rotated one revolution during each main clutch cycle. Near the end of the cycle and after the actuation and transfers are completed, the brush 692 engages a contact 1046 and closes a circuit including the lead 989 shown at the bottom of the drawing and connected to the main line and passing through the MSR solenoid to contact 1046, and therefrom through the brush 692 and the contact ring 693 to ground. As soon as the brush 692 passes off the contact 1046, the circuit is opened and the MSR solenoid is de-energized and allows the spring 1042 (Fig. 5) to restore the bail 1041 and its plate so that the tips 1043 will be out of the way of the cone and allow re-energization of a selected solenoid at the beginning of the next cycle.

For a detailed description of the partial product multiplication mechanism, reference may be had to the previously mentioned divisional application Serial No. 793,503.

*Shifting mechanism*

A shift clutch is effective during each cycle of operation thereof to effect a single step of movement to a pair of column shift switches and a dividend sensing mechanism.

The column shift switches include the product shift switch 1100 (Fig. 16A) and the quotient shift switch 1140. The product shift switch operates as previously mentioned, to connect the partial product selectors 850 to successive series of numeral wheel clutch disengaging magnets 660 and to prevent engagement of the remainder of the clutches which are not under the control of the partial product selectors.

The quotient shift switch 1140 (Fig. 16A) is related to the quotient register in very much the same way the product shift switch is related to the product register, namely, it selects which order of the register is to be controlled for actuation and prevents engagement of the offboard numeral wheel clutches.

When the shaft 270 (Fig. 5) is successively set under control of the multiplier solenoids corresponding to the successive quotient digits selected, the quotient selection switch 1160 (Figs. 5 and 16B) is set accordingly. This switch includes a plurality of stationary contacts 1161 representative of the multiplied digits 1 to 8 and also includes a brush 1162 carried by an arm 1164, which is insulated from, but fixed to the same shaft 270 which sets the multiplier sides of the partial product selectors. The number 1 to number 8 contacts 1161 are connected to the number 1 to number 8 timing switch leads 830 to 838 (Fig. 16B) and the brush 1162 is connected to the quotient shift switch 1140 (Fig. 16A) by a lead 1163 and therefrom to a selective quotient numeral wheel control magnet 660—Q. It will be noted that there is no number "9" contact on switch 1160. This is because no electrical control means are required to effect a nine entry since all the numeral wheel clutches are automatically disengaged after nine increments of movement, as described in the application Serial No. 506,519. Briefly, the quotient numeral wheels are actuated by individual ratchet clutches, one of which clutches is engaged at a fixed time at the beginning of the actuating cycle and is disengaged at a selected time to stop the numeral wheel after advancing a number of positions corresponding to the quotient digit selected.

The quotient shift switch 1149 (Fig. 16A) is shown in its initial position, from which position it is shifted one step clockwise during each ordinal division operation. In its initial position, contact 1149 is on the brush 1166 connected to the leftmost quotient magnet 660—Q designated 0, so that if, for example, the first quotient digit is a "5," the brush 1162 (Fig. 16B) is set on the number "5" contact 1161 to energize the magnet after its numeral wheel has been advanced by five digital increments. The 0 magnet 660—Q is energized through the circuit including the number "5" timing switch contact 618 (Fig. 16B), leads 835, and 1165, the number "5" contact 1161, brush 1162, lead 1163 (Fig. 16A), contact 1149, and brush 1166, lead 1167, switch 685 which at this time is in its lefthand position as explained in the application Serial No. 506,519, and from switch 685 through the 0 magnet to the lead 1168 connected to the main line. The quotient shift switch contact 1150 is connected to the zero lead 830 which transmits an impulse to all other quotient magnets for preventing engagement of their respective clutches.

The actuation of the quotient register occurs during the RHPP digitation phase, and during the LHPP digitation phase it is disabled by operation of the cam 900 (Fig. 16B). Cam 900 is driven by the main clutch and opens a switch 742 in the circuit through a QT (quotient transfer) solenoid, and also a switch 1169 in the circuit through the QCE (quotient clutch engaging) solenoid to prevent energization of these solenoids and thus prevent engagement of the quotient numeral wheel clutches during the LHPP phase and the tens carry phase which follows the LHPP phase.

Figure 4:
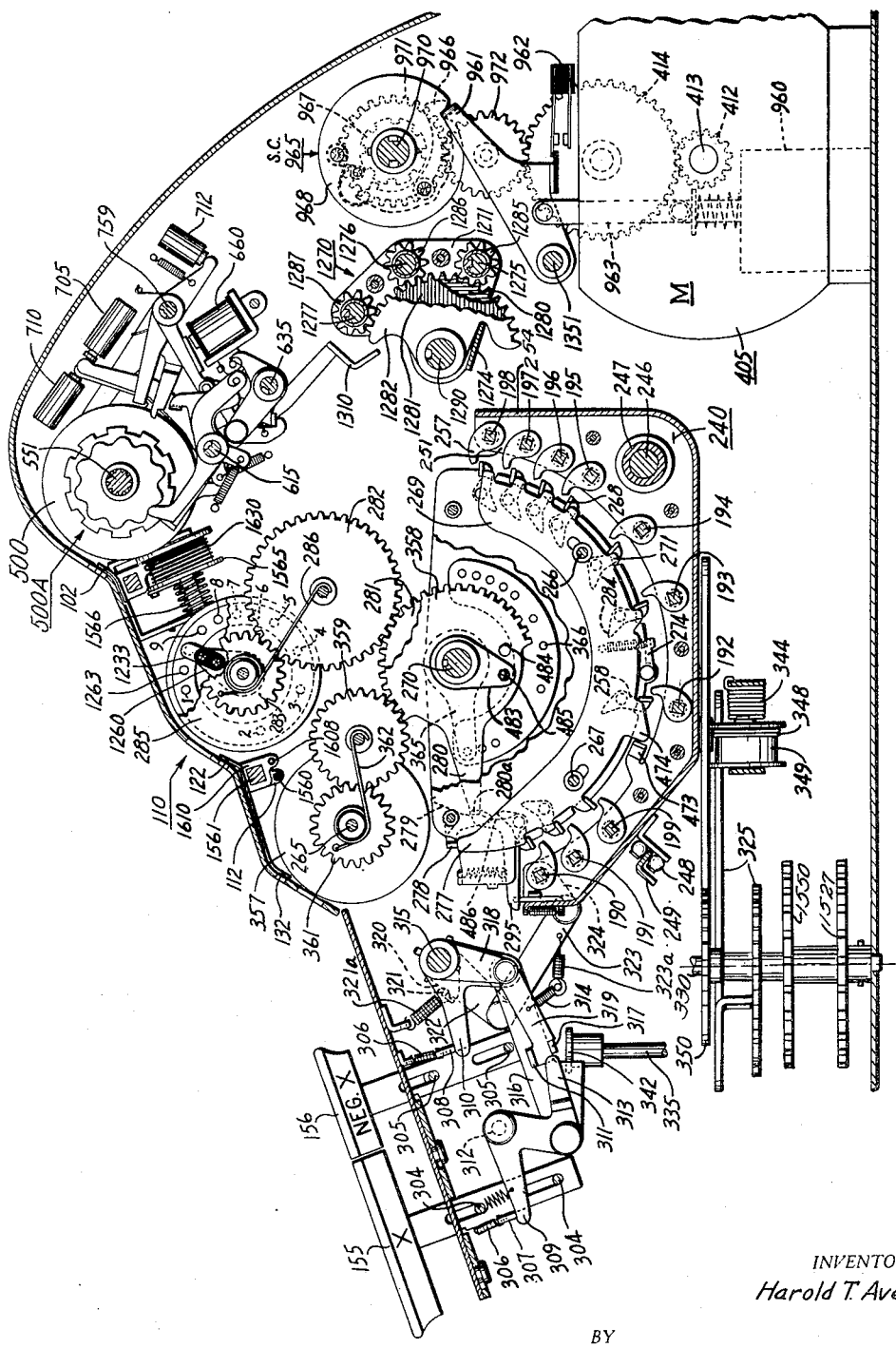
Fig. 4 is a longitudinal section, as viewed from the right side of the machine, showing the general arrangement of the selecting, actuating, and driving mechanisms.

The product and quotient shift switches are advanced one step for each cycle of operation of the shift clutch 965 (Fig. 4) as is described in the application Serial No. 506,519. Clutch 965 is engaged for a single cycle of operation by the energization of a shift clutch solenoid 960 (Figs. 4 and 16B). During division operations, solenoid 960 is energized every time a "0" is pre-estimated as will be made clear hereinafter.

PRE-ESTIMATION DIVISION

The normal way of performing division on the present machine is for the operator to first set up the dividend in the left factor indicator 110 (Fig. 3) by depressing the numeral keys 140—149 indicative of the dividend digits. Depression of the dividend (÷) key 151 then transfers the dividend into the product register 100 and clears the left factor indicator. The divisor is then set up in the left factor indicator by depression of the numeral keys, and subsequent depression of the equals (=) key 152 starts the machine dividing, whereupon the quotient digits successively appear in the quotient register 120.

In the course of a division calculation, each quotient digit is first estimated by the novel mechanism described hereinafter, which mechanism compares the first two digits of the divisor with the first three digits of the dividend or current remainder, and energizes certain electromagnetic devices indicative of this estimation. The partial product selectors described hereinbefore are set under the joint control of these electromagnetic devices and the left factor indicator, for multiplication of the divisor by the estimated quotient digit. This multiplication is negative and therefore subtracts the partial products from the dividend, which subtraction reduces one or more of the higher order numeral wheels of the product register to zero or below. The remainder is then sensed to determine whether an overdraft has occurred due to over estimation of the quotient digit, and if so, a correction cycle is effected, followed by a shift. If the estimation was originally correct, the shift cycle follows immediately after the first subtractive cycle. In either case the shift mechanism moves the dividend sensing mechanism one order toward the right so that the same highest or first two digits of the divisor are compared with the registration on the three dividend numeral wheels located respectively one order further to the right than those with which comparison was first made. The three numeral wheels then sensed normally contain the first three digits of the remainder (new dividend), from which the product of the second estimated quotient digit and the divisor is then subtracted.

*Numerical example*

The sequence of division operations mentioned above can be best illustrated by the following specific numerical example: Assume that a dividend 69731 is entered into the product register and a divisor 2402 is entered into the left factor indicator. A shiftable sensing mechanism, described hereinafter, is so arranged that when the first comparison is made following direct entry of a dividend and setting up of a divisor, the first three digits of the dividend, which are compared with the first two digits of the divisor, include a zero in the highest order of the dividend.

1. *Comparison for estimation of first quotient digit.*—Upon depression of the "=" key the first comparison is made in the following ordinal relation:

$$069$$
$$24$$

The ratio $69/24 = 2.875$, and for reasons described hereinafter the quotient of such a ratio may be estimated one digit higher or "3."

2. *First division cycle.*—In such a case the multiplier sides of the partial product selectors described hereinbefore are set at "3," and the multiplicand sides thereof are set 24020000. The estimated quotient "3" is positively entered into the quotient register 120 (Fig. 3) and the product of $$3 \times 24020000 = 72060000$$

is negatively multiplied and thereby subtracted from the dividend in the following ordinal relation:

$$069731000$$
$$72060000$$
$$\overline{\phantom{0}997671000}\text{—First remainder}$$

3. *Comparison for detecting overdraft.*—The first three digits "997" of the first remainder are compared with an arbitrary number, for instance 900, the representation of which is permanently incorporated in the division system and automatically brought into operation at this time in the sequence for comparison in the following ordinal relation:

$$\frac{997}{900} = 1.1078$$

The quotient estimating system therefore estimates a "1."

4. *Correction cycle.*—The digit "1" is subtracted from the "3" in the quotient register, and 1×24020000 is added to the first remainder in the following ordinal relation.

```
997671000
 24020000
```
021691000—Corrected first remainder.

5. *Comparison for determining shift.*—During the latter part of this correction cycle the corrected first remainder is compared against the arbitrary number 900 to determine whether another correction cycle should be made or if a shift cycle should be the next cycle. This comparison is in the following ordinal relation:

$$\frac{021}{900} = 0.023$$

6. *Shift cycle.*—Since a zero is estimated, a shift cycle is initiated and the sensing mechanism is automatically shifted, which associates the corrected first remainder and the divisor in the following ordinal relation:

```
021691000
  2402000
```

7. *Comparison for estimation of second quotient digit.*—The sensing mechanism enables comparison in the following ordinal relation:

$$\frac{216}{24} = 9.000$$

8. *Second division cycle.*—The estimation quotient digit "9" is entered into the second order of the quotient register 120, and the product 9×2402000=21618000 is negatively multiplied and thereby subtracted from the corrected first remainder in the following ordinal relation:

```
021691000
 21618000
```
000073000—second remainder

9. *Comparison for detecting overdraft.*—This comparison is made in the following ordinal relation:

$$\frac{000}{900} = 0$$

The quotient estimating system therefore estimates a "0."

10. *Shift cycle.*—Since a zero is estimated, no correction cycle occurs and instead, a shift cycle is effected which associates the second remainder with the divisor in the following ordinal relation:

```
0000730000
   2402000
```

11. *Comparison for estimation of third quotient digit is made in the following ordinal relation*

$$\frac{007}{24} = 0.2916$$

12. *No subtractive cycle.*—Since a zero is again estimated, no multiplication is effected and no entry is made in the quotient register (quotient register stands at 29000000 at this time).

13. *No correction cycle.*—Since no subtraction was made, no comparison against 900 is made for correction.

14. *Shift cycle.*—A shift cycle is effected as an incident to a zero estimation, which shift associates the same second remainder with the divisor in the following ordinal relation:

```
000073000
    24020
```

15. Comparison for estimation of fourth quotient digit is made in the following ordinal relation:

$$\frac{073}{24} = 3.0417$$

16. *Third division cycle.*—The estimated quotient digit "3" is entered into the fourth quotient numeral wheel, and 3×2402=72060 is subtracted from the preceding remainder in the following ordinal relation:

```
000073000
    72060
```
000000940

17. *Comparison for detecting overdraft.*—This comparison is made in the following ordinal relation:

$$\frac{000}{900} = 0$$

18. Since a zero is estimated, a shift cycle is effected without a correction cycle. This procedure continues until the entire quotient is registered.

Quotient estimation

Figure 1:
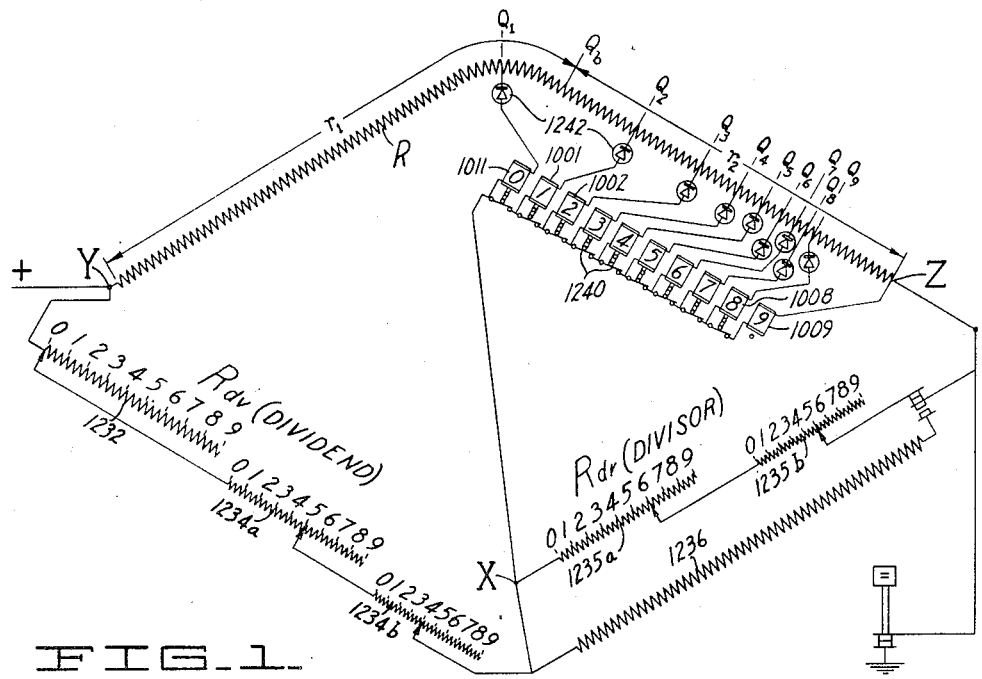
Fig. 1 is a schematic diagram of a theoretical quotient estimating system.
Figure 2:
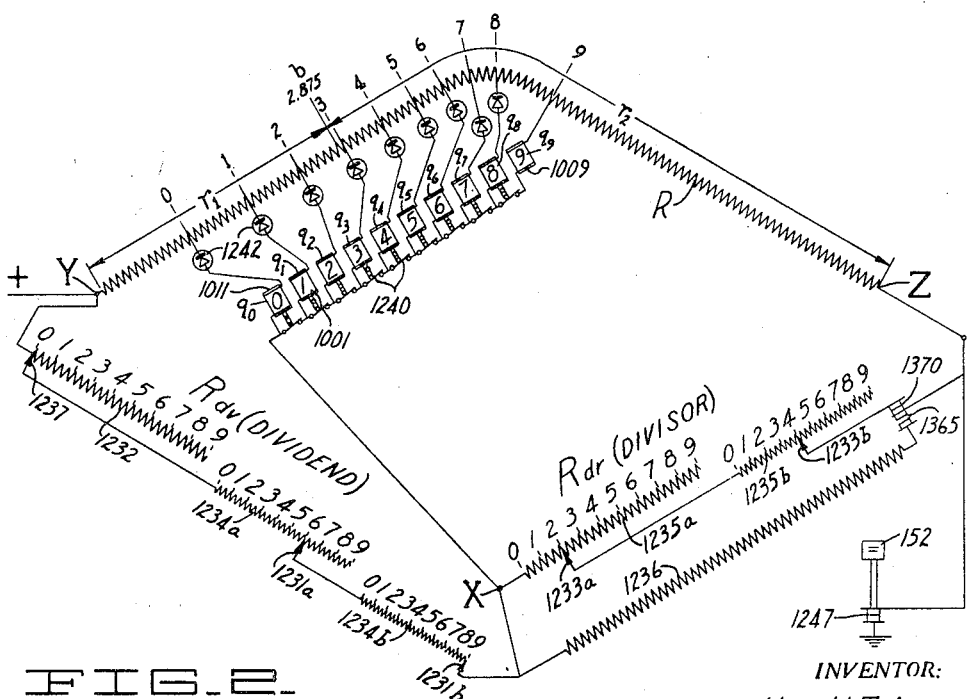
Fig. 2 is a schematic diagram of a preferred quotient estimating system.

The present mechanism utilizes the properties of the Wheatstone bridge for estimating the quotient of a selected dividend and divisor. Figs. 1 and 2 diagrammatically show two such Wheatstone bridge circuits, of which the first, namely, the one shown in Fig. 1 is based on the simplest relationship of resistances and on the assumption that the solenoids operate on negligible current, and the second one shown in Fig. 2 is altered according to definite principles described hereinafter to provide the actual amounts of current required for operating the solenoids and to provide for better selectivity of operation over the entire range of actual operating conditions. The arrangement shown in Fig. 1 will be described first so as to more simply disclose the theory involved and then the arrangement shown in Fig. 2 will be described together with the derivations of the reasons for such alterations. It should be understood therefore that the first arrangement described is included for explanation purposes only, while the second constitutes a preferred embodiment of the present invention.

Theoretical arrangement of Wheatstone bridge as illustrated in Fig. 1

The Wheatstone bridge illustrated in Fig. 1 includes two series of variable resistors $R_{dv}$ and $R_{dr}$ connected in series at point X, on one side of the bridge. The three resistors 1232, 1234a, and 1234b comprising resistor $R_{dv}$ are selectively set according to the value of the three leftmost digits of the dividend. The resistor 1232 has ten times the resistance of resistor 1234a, and the latter has ten times the resistance of resistor 1234b, so that the setting of the three resistors will establish a resistance value which is proportional to the value of the three digit number expressed by these digits. The two resistors 1235a and 1235b comprising resistor $R_{dr}$ are selectively set according to the value of the two leftmost significant digits of the divisor. The resistance values of the last mentioned two $R_{dr}$ resistors have the same resistance value as the two $R_{dv}$ resistors 1234a and 1234b, respectively; therefore, a resistance ratio is established on either side of point X which approximates the ratio of the dividend to the divisor. A single resistor R on the other side of the bridge is tapped at a series of points designated $Q_1 \ldots Q_9$, each of which points divides the resistor R into two portions, which we will call $r_1$ and $r_2$ (Fig. 1). Resistor R represents a resistor of uniform resistance. Point $Q_1$ is half way between points Y and Z, thereby representing a 1 to 1 resistance ratio of $r_1$ to $r_2$; whereas, point $Q_4$ (for instance) is located four-fifths of the distance between Y and Z and indicates a 4 to 1 ratio of $r_1$ to $r_2$.

A series of electromagnets or solenoids 1011 and 1001 to 1009 (Fig. 1), inclusive, numbered "0" to "9," respectively, are connected, on one side, to those points on resistor R which are numbered one digit higher respectively, as for example the number "1" solenoid is connected to the number "2" point $Q_2$, etc. Since no estimation can be greater than 9, the number 9 solenoid is connected directly to point Z instead of to a point $Q_{10}$ (not shown) which point would be ten-elevenths of the distance between Y and Z. With the exception of the "0" solenoid 1011 (Fig. 1), the circuit of each solenoid preferably includes a normally closed relay switch 1240. Each solenoid is electrically connected to point X through a switch 1240 which is opened upon energization of the next lower numbered solenoid, as shown. A rectifier 1242 preferably is interposed between each solenoid and its respective point Q on the resistor R so as to permit flow of current only in the direction of the rectifier arrow. When the ratio of $R_{dv}$ to $R_{dr}$ is between 1 to 1 and 2 to 1, a corresponding potential is established at point X. The balance point designated $Q_b$ which has the same potential as point X, under such conditions falls somewhere between points $Q_1$ and $Q_2$ under which circumstances the relay switches and rectifiers, above mentioned, operate so as to cause continued energization of only the number 1 solenoid, as follows.

Assume for purposes of the theoretical illustration that the resistance of the solenoids are so much greater than the resistance of the resistors R, $R_{dv}$ and $R_{dr}$, that they would require negligible current to operate and would not disturb the balance of the bridge. The potential at point X would, under these conditions, be less than the potential at any point to the left of point $Q_b$ and the current would tend to flow from point $Q_1$ on the resistor R through the zero solenoid to point X. The rectifier 1242 which is associated with the zero solenoid prevents such current flow and therefore prevents energization of the zero solenoid. Furthermore, under the above condition, the potential at point X would be greater than the potential at any point to the right of point $Q_b$, therefore current would flow from point X through the normally closed relay switches and the solenoids numbered 1 to 9, inclusive. Since there is a greater potential drop between point X and points Z, $Q_9$, $Q_8$, etc., than between point X and point $Q_2$, the higher number solenoids operate faster and in rapid succession, the relay switches 1240 are opened by the solenoids 9, 8 ... to 1, and each switch cuts out the solenoids to the right thereof until finally only the number 1 solenoid is energized and effective to determine the setting of the machine for a "one" quotient entry.

If, by way of illustration, the ratio of the resistors $R_{dv}$ and $R_{dr}$ were gradually increased to a 2 to 1 ratio, the potential at point X would gradually change. The point $Q_b$ which has a potential value equal to the potential at point X, would in effect move toward point $Q_2$ and the potential drop between point X and $Q_2$ would become less and less and finally zero when $Q_b = Q_2$. At this time the number 1 solenoid connected to point $Q_2$ would have no current on which to operate and instead, current would flow through the number 2 solenoid to resistor R and become effective to condition the machine for a two quotient registration corresponding to the 2 to 1 ratio of the dividend and divisor.

*Preferred embodiment of Wheatstone bridge as illustrated in Fig. 2*

(a) REASONS FOR DEPARTING FROM THEORETICAL ARRANGEMENT OF FIG. 1

In the foregoing description of the theoretical arrangement, it was assumed that the solenoids would operate on negligible current, which, of course, is not the case, and we must therefore revise our arrangement to supply the required actual operating currents. It was also assumed that equal units of resistance represent each unit digit of the dividend and divisor; whereas, it will be shown hereinafter that this is not the most favorable condition for operation of this system. Formulas for determination of the most favorable relations of resistance values will now be derived and illustrated by the determination of the actual resistance values for the resistors $R_{dv}$, $R_{dr}$, R, $r_1$, $r_2$, as illustrated in Fig. 2, and for the resistance of the solenoids. First let us consider the basic formulas which are characteristic of Wheatstone bridges and applicable to the present problems.

In the following formulae let us assume that:

$Dv$ = dividend value
$R_{dv}$ = resistance proportional to $Dv$
$r_{dv}$ = resistance representing one unit digit of $Dv$
$Dr$ = divisor value
$R_{dr}$ = resistance proportional to $Dr$
$r_{dr}$ = resistance representing one unit digit of $Dr$
R = resistor comprising the two legs $r_1$ and $r_2$ of the bridge which are opposite $R_{dv}$ and $R_{dr}$
$r_1$ = portion of resistor R between point Y and a given point b (Fig. 2)
$r_2$ = the portion of resistor R between point Z and the same given point b.
$q_0$; $q_1$; $q_n$; $q_9$ = indexes of the quotient solenoids. Each index equals the quotient digit which is selected by the respective solenoid.
$i_s$ = current through a given solenoid $q_n$
$r_s$ = resistance of solenoid winding
E = voltage across points Y and Z
K = coefficient of proportionality.

(b) OPTIMUM RELATION OF UNIT DIVIDEND AND DIVISOR RESISTANCES

While we assumed in connection with Fig. 1 that the basic increment of dividend resistance was equal to the basic increment of divisor resistance, the bridge may be constructed with these increments in any desired ratio. We will therefore undertake to determine what relationship these increments of resistance should have in order that the bridge will be best adapted for quotient estimation.

The relative values of $R_{dv}$ and $R_{dr}$ and their components may be expressed algebraically as follows:

$$R_{dv} = Dv \times r_{dv} \qquad (1)$$

in which the resistance value of $r_{dv}$ is arbitrarily chosen, and $$R_{dr} = Dr \times r_{dr} \qquad (2)$$

Assume that:

$$r_{dr} = r_{dv} K \qquad (3)$$

Combining (2) and (3):

$$R_{dr} = Dr \times r_{dv} K \qquad (4)$$

Combining (1) and (4):

$$\frac{Dv}{Dr} = \frac{R_{dv}/r_{dv}}{R_{dr}/r_{dv}K} = \frac{R_{dv}K}{R_{dr}} \qquad (5)$$

(5) may also be written:

$$\frac{R_{dv}}{R_{dr}} = \frac{Dv}{Dr} \times \frac{1}{K} \qquad (6)$$

As described hereinbefore in connection with Fig. 1, each solenoid 0 ... 8 is connected to a point $Q_1$ ... $Q_9$ which is one unit digit greater than the corresponding solenoid number. In Fig. 2 the locations of the taps on resistor R are changed and lose their significance with respect to the resistance ratio of $r_1$ to $r_2$, and are identified by single numerals 0 to 9, inclusive, in the latter figure. The numbers of the solenoids, however, become of significance and are therefore identified by $q_0$, $q_1$, ... $q_n$ ... $q_9$ and these terms enter into the following formulas.

Under the theoretical conditions mentioned hereinbefore in connection with Fig. 1, it was stipulated that a controlling solenoid would operate on a negligible current, and would cease to operate when cut out by its respective rectifier 1242, or by the switch 1240 of the adjacent solenoid. Another stipulation for theoretical conditions is that a given quotient digit "n" would be registered when the ratio of the dividend to the divisor is equal to any value between $n$ and $n+1$. Under these stipulated conditions therefore, a solenoid $q_n$ would draw a certain maximum current when the ratio of $Dv$ to $Dr$ is equal to $n$, and would draw zero current when said ratio is equal to $n+1$.

Thus, for purposes of the present description, we want:

$$i_s = 0 \qquad (7)$$

when $$\frac{Dv}{Dr} = q_n + 1 \qquad (8)$$

It is well known that a Wheatstone bridge is balanced when the elements thereof are in the following relation:

$$\frac{R_{dv}}{R_{dr}} = \frac{r_1}{r_2} \qquad (9)$$

To obtain the conditions defined by Equation 7, and the accompanying explanation thereof we must simultaneously solve the two Equations 8 and 9 as follows:

Combining (5) and (8):

$$\frac{R_{dv}K}{R_{dr}} = q_n + 1 \text{ or } \frac{R_{dv}}{R_{dr}} = \frac{1}{K}(q_n + 1) \qquad (10)$$

Combining (9) and (10):

$$\frac{r_1}{r_2} = \frac{1}{K}(q_n + 1) \qquad (11)$$

From Fig. 2 it is evident that:

$$r_1 + r_2 = R \text{ or } r_1 = R - r_2 \qquad (12)$$

From (11) and (12) we have:

$$\frac{R - r_2}{r_2} \text{ or } \frac{R}{r_2} - 1 = \frac{1}{K}(q_n + 1) \qquad (13)$$

Solving (13) for $r_2$ as shown by (14), $r_2$ is defined for a point on resistor R to which the solenoid $q_n$ should be connected.

$$r_2 = \frac{RK}{q_n + 1 + K} \qquad (14)$$

If we designate as $r'_2$, a point on R at which a solenoid $q_n + 1$ is connected, from (14) we may then find the value of the resistance "step" between the connections of two adjacent solenoids. This resistance "step" may be expressed as follows:

$$r_2 - r'_2 = \frac{RK}{q_n + 1 + K} - \frac{RK}{q_n + 2 + K} = \frac{RK}{(q_n + 1 + K)^2 + (q_n + 1 + K)} \qquad (15)$$

From examination of (15) it is obvious that for any fixed value of K, the resistance "step" decreases in numeral value as $q_n$ increases. The "step" with which we are principally concerned is that between the points 7 and 8 on resistor R (Fig. 2) because this step is the smallest and therefore gives the least amount of potential difference between adjacent connection points on which to work. The step between points 8 and 9 does not enter into these derivations since the number 9 solenoid is never required to operate under the conditions in which the bridge is near the balance point, for reasons described hereinbefore.

It is an object therefore to search for a value for K which will give a maximum value for $r_2 - r'_2$ when $q_n = 7$. Differentiation of (15) gives the following expression:

$$\frac{d(r_2 - r'_2)}{dK} = R \cdot \frac{q_n^2 + 3q_n + 2 - K^2}{(K^2 + 2q_n K + 3K + q_n^2 + 3q_n + 2)^2} \qquad (16)$$

Equating expression (16) to zero and solving for K we find:

$$K = \frac{r_{dr}}{r_{dv}} = \sqrt{q_n^2 + 3q_n + 2} \qquad (17)$$

Substituting "7" for "$q_n$" in (17) we have:

$$K = 8.485 \qquad (18)$$

Therefore when $K = 8.485$, the value of the "step" $r_2 - r'_2$ between points 7 and 8 (Fig. 2) is at one of its critical points, which might be a maximum, minimum or point of inflection, but by further investigation according to well known rules not presented here, it may be found that this point corresponds to the maximum. In the following computations, K is arbitrarily chosen to equal 10 instead of 8.485.

$$K = 10 \text{ (arbitrarily rounded out value)} \qquad (19)$$

When K equals 10, the "step" between points 7 and 8 is not at its theoretical maximum but is very nearly so and the loss of efficiency due to this arbitrary rounding out of the value of K is negligible as may be seen by examination of Table 1 described immediately hereinafter while at the same time the selection of $K = 10$ simplifies the following computations of the various resistance values. The resistance value corresponding to each digital value of the dividend namely, the value of $r_{dv}$ is therefore one-tenth of the resistance value ($r_{dr}$) corresponding to a digital value of the divisor, or if we assume $$r_{dr} = 0.10 \text{ ohm} \quad (20)$$

then according to Equation 3

$$r_{dr} = r_{dv}K = 10 \times 0.10 = 1 \text{ ohm} \quad (21)$$

The possibility of varying the value of K within relatively wide limits without departing much from the desired maximum value for the steps $r_2 - r_2'$ for the solenoids #7 and #8 will be evidenced by the tabulation of the valuations of expression (15) corresponding to different values of K between 1 to 20 as follows. By substituting in expression (15), 7 for $q_n$ we have:

$$r_2 - r_2' = R\left(\frac{K}{8+K} - \frac{K}{9+K}\right) \quad (15a)$$

Then by substituting in expression (15a) the values of K given in column 1 of the following table, we get the evaluations listed in columns 2, 3, and 4, and from column 4 we get in column 5, the percentages of variation from the theoretical maximum for different values of K.

TABLE 1

| 1 | 2 | 3 | 4 | 5 |
|---|---|---|---|---|
| K | $\frac{K}{8+K}$ | $\frac{K}{9+K}$ | $\frac{K}{8+K} - \frac{K}{9+K}$ | Per Cent |
| 1 | 0.1111 | 0.1000 | 0.0111 | 38 |
| 3 | 0.2727 | 0.2500 | 0.0227 | 77 |
| 4 | 0.3333 | 0.3077 | 0.0256 | 87 |
| 5 | 0.3846 | 0.3571 | 0.0275 | 93.5 |
| 7 | 0.4666 | 0.4375 | 0.0291 | 98.8 |
| 8.485 | 0.5147 | 0.4852 | 0.0295 | 100 |
| 10 | 0.5555 | 0.5263 | 0.0292 | 99 |
| 12 | 0.6000 | 0.5714 | 0.0286 | 97 |
| 14 | 0.6363 | 0.6086 | 0.0277 | 94 |
| 16 | 0.6666 | 0.6400 | 0.0266 | 90 |
| 18 | 0.6923 | 0.6666 | 0.0257 | 87 |
| 20 | 0.7142 | 0.6896 | 0.0246 | 83.3 |

It will be noted that for the values $K=4$ and $K=18$, the decrease in the resistance step is only 13% from the maximum, while any further deviations beyond this range to any value of K approximating 1, the percentage of drop increases rapidly to a 62% drop when $K=1$.

(c) OPTIMUM RESISTANCE OF RESISTOR R

The next task is to determine the optimum resistance value R, and in so doing, it will be seen from the description of the division control mechanism presented later, that the minimum and maximum values of the dividend and divisor which the machine will be called upon to compare are as follows:

$$Dv^{\min} = 0; \quad Dv^{\max} = 999 \quad (22)$$

and, $$Dr^{\min} = 10; \quad Dr^{\max} = 99 \quad (23)$$

According to Equations 1 and 4, the above factor numeral values correspond to the following respective resistance values:

$$R_{dv}^{\min} = 0; \quad R_{dv}^{\max} = 999 r_{dv} \quad (24)$$

and, $$R_{dr}^{\min} = 10 r_{dv}K; \quad R_{dr}^{\max} = 99 r_{dv}K \quad (25)$$

The ratio of the minimum and maximum values of the dividend and divisor resistances may be expressed as follows:

$$\frac{(R_{dv}+R_{dr})^{\max}}{(R_{dv}+R_{dr})^{\min}} = \frac{999 r_{dv} + 99 r_{dv}K}{10 r_{dv}K} = \frac{99(1.009+0.1K)}{K} \quad (26)$$

From (26) we have:

$$(R_{dv}+R_{dr})^{\max} = \frac{99(1.009+0.1K)}{K}(R_{dv}+R_{dr})^{\min} \quad (27)$$

According to the theory underlying the Wheatstone bridge, the greatest current across the bridge resulting from a given change in the resistance in one leg of the bridge, occurs when the resistance on one side of the bridge is equal to the resistance on the other side thereof, as for example, when:

$$R = R_{dv} + R_{dr} \quad (28)$$

Since the values of $R_{dv}$ and $R_{dr}$ change greatly according to the different problems, this equality cannot be maintained for all problems. However, in order that the ratio of departure from such a condition may be held to the minimum, the value of R should be established at the geometric mean of the total range of values of $R_{dv}+R_{dr}$, that is so that the ratio of R to the minimum value of $R_{dv}+R_{dr}$ is the reciprocal of its ratio to the maximum value of $R_{dv}+R_{dr}$, namely, so that:

$$\frac{(R_{dv}+R_{dr})^{\max}}{R} = \frac{R}{(R_{dv}+R_{dr})^{\min}} \quad (29)$$

or $$R = \sqrt{(R_{dv}+R_{dr})^{\max}(R_{dv}+R_{dr})^{\min}} \quad (29a)$$

Combining (27) and (29a), and solving for R we get:

$$R = (R_{dv}+R_{dr})^{\min} \sqrt{\frac{99(1.009+0.1K)}{K}} \quad (30)$$

Substituting $K=10$ in (30) we get:

$$R = (R_{dv}+R_{dr})^{\min} \sqrt{19.889} = (R_{dv}+R_{dr})^{\min} 4.46 \quad (31)$$

The minimum values of $R_{dv}$ and $R_{dr}$ as shown by Equations (24) and (25) are:

$$R_{dv}^{\min} = 0 \quad (32)$$

$$R_{dr}^{\min} = 10 r_{dv}K = 100 r_{dv}$$
(for $K=10$) $\quad (33)$

Then by substituting these values in (31) we have:

$$R = 100 r_{dv} \times 4.46 = 446 r_{dv} \quad (34)$$

using $r_{dv} = 0.1$ ohm, see expression (20)

$$R = 446 \times 0.1 = 44.6, \text{ say 45 ohms} \quad (35)$$

(d) OPTIMUM VALUE OF SOLENOID RESISTANCE

The next problem is to determine the solenoid requirements in terms of $R_{dv}$, $R_{dr}$, $r_1$, and $r_2$ so that a solenoid resistance ($r_s$) may be chosen which will draw the greatest amount of current with the least amount of disturbance of the bridge balance. This resistance value ($r_s$) of the solenoid may be determined by the following Formula 36 which is based on the general Wheatstone bridge theory.

$$r_s = \frac{(R_{dr}+r_2)(R_{dv}+r_1)}{R_{dr}+R_{dv}+r_1+r_2} \quad (36)$$

Utilizing Equation 12 to define $r_1$ in terms of $R$ and $r_2$, we have:

$$r_s = \frac{(R_{dr}+r_2)[R_{dv}+(R-r_2)]}{R_{dr}+R_{dv}+R} \quad (37)$$

In order to satisfy this equation, two conditions must be satisfied, first, the resistance value $r_s$ of the different solenoids must each be different namely, the solenoids bearing the higher indexes such as $q_9$ and $q_8$ correspond to the lower values of $r_2$ and must therefore have different resistance values than those of lower indexes such as $q_0$ and $q_1$; second, the solenoid of a given index must have different resistance values for different problems involving different values of $R_{dv}$ and $R_{dr}$ which are in the same ratio ($R_{dv}/R_{dr}$) to each other.

It is impossible to satisfy the second condition; therefore, we attempt to provide as nearly a maximum energy input as possible for a given solenoid under all conditions, by choosing a resistance value of the solenoid which is the arithmetic mean of the two values of $r_s$ corresponding to the minimum and maximum values of $(R_{dv}+R_{dr})$.

The first condition can be satisfied but this would necessitate making each solenoid different, which would be poor production practice. This necessity is avoided by calculating the value of the resistance ($r_s$) of the solenoid $q_8$ and using that value of $r_s$ for all the other solenoids. The solenoid $q_8$ has been chosen for the following reasons. By investigation of the current values across a Wheatstone bridge for a given amount of unbalance thereof, it may be found that the solenoids controlling the higher quotient digits such as 7, 8, and 9 operate under less favorable conditions with respect to the energy input, than those solenoids which control the digits 1, 2, 3, etc.; therefore, certain relative values of $r_1$ and $r_2$ and other controlling values described hereinafter which will cause the $q_8$ solenoid to operate satisfactorily, will satisfy the requirements of the lower numbered solenoids. The solenoid $q_8$ is chosen instead of the solenoid $q_9$ because the latter solenoid does not operate under such critical conditions as do the others, for reasons described hereinbefore.

The ratio "8" of the dividend to the divisor may be obtained from a great number of dividend and divisor resistances, and as mentioned above, these different values determine different resistance values ($r_s$) of the solenoid $q_8$. Of these, the optimum value of $r_s$ is found by computing the $r_s^{max}$ and $r_s^{min}$, corresponding to the maximum and minimum values of $Dv$ and $Dr$ and then by taking the arithmetic mean thereof as follows:

From (23) we get:

$$Dr^{max}=99 \quad (38)$$

For the ratio $Dv/Dr=8$ $$Dv^{max}=8 \times Dr^{max}=8 \times 99=792 \quad (39)$$

Also from (23) we get:

$$Dr^{min}=10 \quad (40)$$

For the ratio $Dv/Dr=8$ $$Dv^{min}=8 \times Dr^{min}=8 \times 10=80 \quad (41)$$

From Equations 1, 2, 3, 19 and 38 to 41, inclusive, $$R_{dr}^{max}=Dv^{max} \times r_{dr}K=990dv \quad (42)$$

$$R_{dv}^{max}=Dv^{max} \times r_{dv}=792r_{dv} \quad (43)$$

$$R_{dr}^{min}=Dr^{min} \times r_{dv}K=100r_{dv} \quad (44)$$

$$R_{dv}^{min}=Dv^{min} \times r_{dv}=80r_{dv} \quad (45)$$

Combining (14) and (34), we get:

$$r_2=\frac{446r_{dv} \times K}{q_n+1+K} \quad (46)$$

Substituting 8 for $q_n$ and 10 for $K$ in (46), we get:

$$r_2=\frac{4460r_{dv}}{19}=235r_{dv} \quad (47)$$

Combining (37), (42), (43) and (34), we find the maximum value of $r_s$ for solenoid $q_8$ in terms of $r_{dv}$ as follows:

$$r_s^{max}=$$
$$\frac{(990r_{dv}+235r_{dv})[792r_{dv}+(446r_{dv}-235r_{dv})]}{990r_{dv}+792r_{dv}+446r_{dv}}=$$
$$551r_{dv} \quad (48)$$

and combining (37), (44), (45), (47) and (34), we find the minimum value of $r_s$ (in terms of $r_{dv}$) as follows:

$$r_s^{min}=$$
$$\frac{(100r_{dv}+235r_{dv})[80r_{dv}+(446r_{dv}-235r_{dv})]}{100r_{dv}+80r_{dv}+446r_{dv}}=$$
$$156r_{dv} \quad (49)$$

The value which has been chosen for $r_s$ is the arithmetic means of $r_s^{max}$ and $r_s^{min}$ or:

$$r_s=\frac{551+156}{2}r_{dv}=354r_{dv} \quad (50)$$

Again using $r_{dv}=0.1$ ohm, see expression (20)

$$r_s=354 \times 0.1=35.4 \text{ ohms} \quad (51)$$

A solenoid of the size and design illustrated in Fig. 6 is estimated to have 33 ohms resistance, and since this is close enough to the 35.4 ohms above computed, we will hereinafter use:

$$r_s=33 \text{ ohms} \quad (52)$$

The general expression for the resistance of any solenoid $q_n$ corresponding to the conditions represented by the Formula 36 for the specific bridge disclosed is derived by combining Formula 37 with Formula 14 from which we get:

$$r_s=$$
$$\frac{\left(R_{dr}^{max}+\frac{RK}{q_n+1+K}\right)\left(R_{dv}^{max}+R-\frac{RK}{q_n+1+K}\right)}{2(R_{dr}^{max}+R_{dv}^{max}+R)}+$$
$$\frac{\left(R_{dr}^{min}+\frac{RK}{q_n+1+K}\right)\left(R_{dv}^{min}+R-\frac{RK}{q_n+1+K}\right)}{2(R_{dr}^{min}+R_{dv}^{min}+R)}$$
$$(52a)$$

In seeking to simplify Formula 52a, it will be noted from Equations 24 and 25 that:

$$K=\frac{10R_{dr}^{max}}{R_{dv}^{max}} \quad (52b)$$

Substituting (52b) for $K$ in Equation 52a transforms the expression $$\frac{RK}{q_n+1+K}$$

occurring in four places in Equation 52a into $$\frac{10RR_{dv}^{max}}{10R_{dr}^{max}+R_{dr}^{max}(q_n+1)}$$

therefore let:

$$\frac{RK}{q_n+1+K}=\frac{10RR_{dv}^{max}}{10R_{dr}^{max}+R_{dr}^{max}(q_n+1)}=A \quad (52c)$$

Substituting A per Equation 52c in Equation 52a we get:

$$r_s = \frac{(R_{dr}^{max}+A)(R_{dv}^{max}+R-A)}{2(R_{dr}^{max}+R_{dv}^{max}+R)} + \frac{(R_{dr}^{min}+A)(R_{dv}^{min}+R-A)}{2(R_{dr}^{min}+R_{dv}^{min}+R)} \quad (52d)$$

The resistance ($r_s$) of any solenoid therefore may be calculated in accordance with Formulas 52c and 52d.

(e) DETERMINATION OF OPTIMUM LOCATIONS FOR CONNECTING SOLENOIDS TO RESISTOR R

The foregoing equations which are of particular importance are listed below. These equations are used in determining the final values of the various elements of the division system, except that the values of $R_{dr}$, Equation 4, and $r_2$, Equation 46, are changed slightly for reasons described hereinafter.

$$R_{dv} = Dv \times r_{dv} \quad (1)$$

$$R_{dr} = Dr \times 10 r_{dv} \text{ (substituting from (19))} \quad (4)$$

$$r_1 = R - r_2 \quad (12)$$

$$R = 446 r_{dv} \quad (34)$$

$$r_2 = \frac{446 r_{dv} \times K}{q_n+1+K} = \frac{4460 r_{dv}}{q_n=11} \text{ substituting from (19)} \quad (46)$$

$$r_s = 354 r_{dv} \quad (50)$$

By reviewing the section headed "Theoretical arrangement of Wheatstone bridge as illustrated in Fig. 1," it will be recalled that in that description it was assumed that the solenoids would operate on a negligible current, and that a given solenoid $q_n$ would be operable when the ratio $Dv/Dr = n$, and would cease to operate when said ratio becomes $n+1$, at which time the next quotient solenoid $q_n+1$ would come into operation. Under actual operating conditions, however, the solenoids will require more than negligible current to operate, and therefore the solenoid $q_n$ would cease to operate and the solenoid $q_n+1$ would come into operation when the ratio $Dv/Dr$ is less than $n+1$, for example when $$Dv/Dr = n+0.1$$

or $n+0.4$ instead of $n+1$. In fact, in some cases this change-over might occur for ratios less than $n$, and the particular ratio at which this would occur depends upon a number of factors including the resistance ratios in the Wheatstone bridge, the characteristics of the solenoids, and the specific values of the dividend and divisor. It is, of course, desirable to maintain enough current through the solenoids for ratio values greater than $n$ so that the change-over will not occur until the ratio is as close to $n+1$ as possible in order to keep down the number of overstrokes, and yet the change-over must invariably occur by the time the ratio is as large as $n+1$, otherwise under-estimation would occur. In order that the necessary current may be supplied to operate the solenoids up to ratio values more closely approximating $n+1$, the values of $r_2$ must be decreased by certain amounts noted hereinafter. With these revised values of $r_2$, the solenoid $q_n$ will cease to operate and the solenoid $q_n+1$ will come into operation when $Dv/Dr$ reaches a value less than $n+1$ by as small a margin as will always insure this change occurring for values safely less than $n+1$.

Investigation of the current flow across an unbalanced bridge arranged according to the foregoing equations, indicates that for small quotient values such as 1, 2, or 3, the cessation of operation of the solenoids $q_1$, $q_2$, $q_3$, respectively, will occur at quotient ratios more closely approximating $n+1$ that is true of the solenoids $q_7$, $q_8$, and $q_9$ when the quotient digits are 7, 8, and 9 respectively. The lower numbered quotient digits would therefore be estimated correctly the greater part of the time while the higher numbered quotient digits would be estimated one or two digits high, and would necessitate one or two correction cycles the greater part of the time. This difference in operation of the lower and higher numbered solenoids should be corrected so that a quotient digit will preferably never be over-estimated by more than "1," and so that any solenoid $q_n$ regardless of whether it is $q_1$ or $q_9$ should, under all conditions cease to operate when $Dv/Dr$ approaches as closely as feasible the value $n+1$. This correction may be effected by arranging $r_2$ in accordance with a schedule of values presented hereinafter, which depart somewhat from those determined by the previously noted Equation 46. The new basis may be arrived at by starting with the well known equation for the current in an unbalanced Wheatstone bridge, which, when written in the terms assigned to the different elements of the present invention becomes:

$$i_s = E \frac{R_{dr}(R-r_2) - R_{dv} r_2}{R_{dv} R_{dr} R + (R_{dv}+R_{dr})[r_2(R-r_2) + r_s R]} \quad (53)$$

Solving Equation 53 for $r_2$, we get:

$$r_2 = \frac{R}{2} + \frac{E}{2 i_s} - \sqrt{\left(\frac{R}{2} + \frac{E}{2 i_s}\right)^2 - \frac{R_{dr} R E / i_s - [R_{dv} R_{dr} R + (R_{dv}+R_{dr}) r_s R]}{R_{dv}+R_{dr}}} \quad (54)$$

By substituting various ratios of $R_{dv}/R_{dr}$ in the above equation, with $i_s$ and $r_s$ constants, a new set of values for $r_2$ may be obtained which differs slightly from those determined by Equation 46 described hereinbefore. Therefore, when the series of solenoids of constant resistance ($r_s$) are connected to resistor R at the points corresponding to the values ($r_2$) defined by Equation 54, a respective solenoid will, for the particular values of the dividend and divisor employed in the evaluation of the equation, operate at the constant current ($i_s$) used in that evaluation.

This equation must be solved in such a manner as to take account of the fact that it is necessary to provide a certain safety margin whereby the machine may never make an inaccurate estimation which cannot be corrected. An over estimation of one whole unit digit can be corrected by a regular correction cycle mentioned hereinbefore and described in detail later, but no provision is made to correct an under estimation of one whole unit digit. When the ratio $Dv/Dr = n+1$, the value of $i_s$ for the solenoid $q_n$ is therefore chosen as safely less (for the present computations one quarter less) than the minimum amount of current necessary to operate the solenoid $q_n$. This will insure that current through the solenoid $q_n$ will never be sufficient to overcome the force of its polarized armature when the ratio $Dv/Dr$ equals $n+1$. The respective switch 1240 in the circuit of the solenoid $q_n+1$ will in this instance draw its maximum current, which current is far in excess of its minimum required current. The solenoid $q_n+1$ will therefore control entry of the quotient $n+1$ when the ratio of $Dv/Dr = n+1$, and also when it is fractionally less than $n+1$ within a range which constitutes a practical safety margin.

As regards the substitution of values for the terms $R_{dv}$ and $R_{dr}$ in Equation 54 it is evident that a given ratio $Dv/Dr$ and consequently the respective given ratio $R_{dv}/R_{dr}$ may result from a great number of dividend and divisor values, as for example the ratio $Dv/Dr=7$ can represent the ratio of a dividend 693 and a divisor 99, or a dividend 70 and a divisor 10.

Since the solution of Equation 54 for such very different absolute values of $Dv$ and $Dr$ which are in the same ratio, will give slightly different values of $r_2$, we may therefore solve for the values of $r_2$ corresponding to the maximum and minimum values of $Dv$ and $Dr$ for each integral quotient ratio, and then choose for each solenoid a value for $r_2$ which is somewhere within the range of values thus determined, for instance, the arithmetic mean of the values corresponding to the maximum and to the minimum values. The effect of thus choosing the arithmetic mean value for $r_2$ will be commented on further in the next section below.

To compute the values which $r_2$ will assume in accordance with the specific numerical values hereinbefore assigned to other elements of the system, we may insert the following values in Equation 54:

From (35) $R=45$ ohms
From (52) $r_s=33$ ohms
From (42) and (20) $R_{dr}^{max}=99$ ohms (55)
From (44) and (20) $R_{dr}^{min}=10$ ohms (56)

The particular solenoid illustrated in Fig. 6 is designed to operate at 67 milliamperes and to be safely non-operative at 50 milliamperes. Since the criterion for establishing the $r_2$ values is to connect each solenoid to resistor R at such a point that it will drop out of operation safely before the quotient digit being estimated becomes larger by "one" than the digit for which the solenoid is intended to operate, we must solve Equation 54 using the non-operative current, $$i_s = .050 \text{ ampere} \quad (57)$$

and using, for each solenoid the relationship, $$\frac{Dv}{Dr} = q_n + 1 \quad (58)$$

Neither $q_n$ nor the corresponding $$\frac{Dv}{Dr}$$

enter directly into Equation 54 but they determine the choice of the $R_{dv}$ values to be used in that equation, since from Equations 6, 8 and 19:

$$R_{dv} = \frac{Dv}{Dr} \frac{R_{dr}}{10}$$

$$= (q_n + 1) \frac{R_{dr}}{K} \quad (59)$$

The controlling values of $$\frac{Dv}{Dr}$$

for each solenoid is therefore determined per Equation 58, and these values are substituted in Equation 59, using first the maximum and then the minimum values of $R_{dr}$ noted in Equations 55 and 56. Two values of $R_{dv}$ are thus obtained for each solenoid, one corresponding to the maximum $R_{dr}$ of 99 ohms, and the other to the minimum $R_{dr}$ of 10 ohms.

We will assume that the system is to operate on 100 volts, therefore, $$E = 100 \text{ volts} \quad (60)$$

Solving Equation 54, utilizing the numerical values above noted, gives for $r_2$ the values listed in the following table (columns 5 and 8), while

TABLE 2

| 1 | 2 | 3 | 4 | 5 | 6 | 7 | 8 | 9 | 10 |
|---|---|---|---|---|---|---|---|---|---|
| $q_n$ | $\frac{Dv}{Dr}$ | $R_{dr}^{max}$ Ohms | $R_{dv}$ Ohms | $r_2'$ Ohms | $R_{dr}^{min}$ Ohms | $R_{dv}$ Ohms | $r_2''$ Ohms | Actual $r_2$ $\frac{r_2' + r_2''}{2}$ Ohms | Theoretical $r_2$ per (14), (19) and (35) |
| 0 | 1 | 99 | 9.9 | 39.86 | 10 | 1 | 40.05 | 39.95 | 40.91 |
| 1 | 2 | 99 | 19.8 | 36.22 | 10 | 2 | 36.56 | 36.39 | 37.50 |
| 2 | 3 | 99 | 29.7 | 33.16 | 10 | 3 | 33.63 | 33.39 | 34.61 |
| 3 | 4 | 99 | 39.6 | 30.54 | 10 | 4 | 31.12 | 30.83 | 32.14 |
| 4 | 5 | 99 | 49.5 | 27.28 | 10 | 5 | 28.95 | 28.61 | 30.00 |
| 5 | 6 | 99 | 59.4 | 26.30 | 10 | 6 | 27.06 | 26.68 | 28.12 |
| 6 | 7 | 99 | 69.3 | 24.56 | 10 | 7 | 25.39 | 24.97 | 26.47 |
| 7 | 8 | 99 | 79.2 | 23.01 | 10 | 8 | 23.91 | 23.46 | 25.00 |
| 8 | 9 | 99 | 89.1 | 21.63 | 10 | 9 | 22.58 | 22.10 | 23.68 |
| 9 | 10 | 99 | 99.0 | 20.39 | 10 | 10 | 21.39 | 20.89 | 22.50 | column 9 gives the arithmetical mean of these two sets of $r_2$ values.

In the foregoing Table 2, column 2 is a tabulation of evaluations of expression (58) obtained by substituting therein the respective values from column 1. Column 3 is merely a repeated tabulation of expression (55), and column 6 is similarly a repeated tabulation of expression (56). Column 4 is a tabulation of evaluations of expression (58), obtained by substituting therein the values given in columns 2 and 3 of Table 2, while column 7 is a tabulation of the same expression (58) using the values given in columns 2 and 6 of Table 2. Column 5 is a tabulation of the values of $r_2$ which are derived by evaluating expression (54) using the values given in columns 3 and 4 of the table and the fixed values of expressions (35), (52), (57), and (60). Column 8 is a tabulation of the values of $r_2$ which are derived by evaluating expression (54) using the values given in columns 6 and 7 of the table and the same fixed values noted above. Each value in column 9 is the arithemetical mean of the corresponding values in columns 5 and 8. Column 10 shows, for comparison, the theoretical values for $r_2$, derived from Equation 46. Column 9 is a tabulation of the final values of $r_2$ and, consequently, the actual values used in the location of the connections of the solenoids to resistor R in this preferred embodiment shown in Figs. 16B and 2. There is one exception, namely, the connection of the number 9 solenoid (Fig. 2) is moved toward the right to reduce the value of $r_2$ from 20.89 to approximately 18 ohms so as to give the number 9 solenoid more of a margin of operation for reasons described hereinbefore.

Optionally, the number 9 solenoid may be dispensed with altogether and a permanently fixed stop substituted for the ejected plunger thereof. From comparison of columns 9 and 10, it will be seen how the actual values differ from the theoretical.

By combining the above expressions (54) and (59), a general expression may be formulated for deriving the actual value of $r_2$ given in column 9 of Table 2, namely:

$$r_2 = \frac{r_2' + r_2''}{2} = \frac{R}{2} + \frac{E}{2i_s} - \sqrt{\left(\frac{R}{4} + \frac{E}{4i_s}\right)^2 - \frac{\frac{R_{dr}^{max}RE}{i_s} - \frac{(R_{dr}^{max})^2 R(q_n+1)}{K} - \left[\frac{(q_n+1)R_{dr}^{max}}{K} + R_{dr}^{max}\right] r_s R}{4\left[\frac{(q_n+1)R_{dr}^{max}}{K} + R_{dr}^{max}\right]}} $$
$$- \sqrt{\left(\frac{R}{4} + \frac{E}{4i_s}\right)^2 - \frac{\frac{R_{dr}^{min}RE}{i_s} - \frac{(R_{dr}^{min})^2 R(q_n+1)}{K} - \left[\frac{(q_n+1)R_{dr}^{min}}{K} + R_{dr}^{min}\right] r_s R}{4\left[\frac{(q_n+1)R_{dr}^{min}}{K} + R_{dr}^{min}\right]}} \quad (60a)$$

The above equation may be simplified by noting that the expression $$\frac{(q_n+1)R_{dr}^{max}}{K}$$

is repeated in the Equation 60a and that per Equation 52b K has a value of $$\frac{10 R_{dr}^{max}}{R_{dv}^{max}}$$

By combining the last two expressions and assigning to the resulting expression an arbitrary symbol, for instance "B," we get:

$$\frac{(q_n+1)R_{dr}^{max}}{K} = \frac{R_{dv}^{max}(q_n+1)}{10} = B \quad (60b)$$

Similarly the expression $$\frac{(q_n+1)R_{dr}^{min}}{K}$$

is repeated in Equation 60a, and by combining this with the expression for K and assigning to the resulting expression another arbitrary symbol such as "C" we get:

$$\frac{(q_n+1)R_{dr}^{min}}{K} = \frac{R_{dv}^{max} R_{dr}^{min}(q_n+1)}{10 R_{dr}^{max}} = C \quad (60c)$$

Furthermore, the expression $$\frac{E}{i_s}$$

is repeated in Equation 60a; therefore, if we assign to this expression still another arbitrary symbol such as "D," we have:

$$D = \frac{E}{i_s} \quad (60d)$$

Then by substituting B, C and D as expressed in (60b), (60c) and (60d) into Equation 60a and simplifying we get:

$$2r_2 = R + D - \sqrt{\left(\frac{R+D}{2}\right)^2 + r_s R - R R_{dr}^{max}\frac{D-B}{B+R_{dr}^{max}}}$$
$$- \sqrt{\left(\frac{R+D}{2}\right)^2 + r_s R - R R_{dr}^{min}\frac{D-C}{C+R_{dr}^{min}}} \quad (60e)$$

*(f) DETERMINATION OF NON-UNIFORM SCALE OF DIVISOR RESISTANCE VALUES TO COUNTERACT DISTORTION OF BRIDGE CIRCUITS*

The use of a mean value for $r_2$, as derived above, in place of a value satisfying either extreme condition, will tend to increase, in the case of the larger dividends and divisors associated with any given quotient ratio, the margin of safety which insures that the $q_n$ solenoid will become inoperative before the quotient ratio becomes $n+1$, thereby causing additional overstrokes and restoration strokes. In the case of the smaller dividends and divisors associated with each quotient ratio, however, the opposite will be true and this safety margin will be decreased, thereby impairing the degree of safety which was originally introduced to provide against under estimates. Since each of these effects is, in some degree, detrimental, it is desirable to eliminate such differences. Noting that, regardless of the value of the quotient, the same maximum divisor, namely 99, gives one extreme of these conditions (see Table 2, columns 3 and 5), and the same minimum divisor, namely 10, the other extreme (see Table 2, columns 6 and 8), it is clear that an increase in the amount of the $R_{dr}$ resistance corresponding to the maximum divisor and decrease of that corresponding to the minimum (coupled, of course, with corresponding readjustment of the resistances chosen to represent intermediate divisor values) can be made use of to minimize the effect of the differences between $r_2$, $r_2'$ and $r_2''$ referred to. If each increment of divisor resistance is thus increased or decreased by such an amount that each solenoid controlling entry of a digit "$n$" will, when a quotient ratio of $n+1$ is set up, draw a current determined as the maximum that we can always count on as being insufficient to operate the solenoid $n$ (for instance 50 milliamperes) then the difference in safety margins referred to will be entirely eliminated. Unfortunately the amount of alteration of a given $R_{dr}$ which brings about such an effect is not exactly the same for all solenoids, but is nearly enough the same so that the $R_{dr}$ values may be altered to greatly minimize rather than entirely eliminate the differences referred to. Those altered values of $R_{dr}$ can be most readily obtained by solving Equation 53 for $R_{dr}$, as follows:

$$R_{dr} = \frac{r_2 + \frac{i_s}{E}[r_2(R-r_2) + r_s R]}{R - r_2 - \frac{i_s}{E}[R_{dv}R + r_2(R-r_2) + r_s R]} R_{dv} \quad (61)$$

This equation may be evaluated using, for each solenoid, the value of $r_2$ taken from column 9 of Table 2, above, the values of R, $r_s$, $i_s$, and E used in evaluating Equation 54 above, which values are given in expressions (35), (52), (57) and (60) respectively, and a value of $R_{dv}$ as determined by the following equation derived from expressions (1), (20), and (58)

$$R_{dv} = Dr(q_n+1)r_{dv} = \frac{Dr}{10}(q_n+1) \quad (62)$$

Evaluating Equation 61 by use of these values, independently for each solenoid, and repeating the solution for $Dr$ values of 10, 20, 30, 40, 50, 60, 70, 80, 90, and 100 we obtain the following table of the $R_{dr}$ values which would cause exactly 50 milliamperes to flow through each solenoid when the quotient ratio becomes larger by "one" than the value for which the solenoid is intended to operate.

TABLE 3

| Dr | Solenoid $q_n$ | | | | | | | | | Average $R_{dr}$ |
|---|---|---|---|---|---|---|---|---|---|---|
| | 0 | 1 | 2 | 3 | 4 | 5 | 6 | 7 | 8 | |
| 10 | 9.750 | 9.750 | 9.709 | 9.693 | 9.669 | 9.652 | 9.626 | 9.607 | 9.578 | 9.668 |
| 20 | 19.605 | 19.572 | 19.543 | 19.520 | 19.480 | 19.457 | 19.414 | 19.385 | 19.336 | 19.479 |
| 30 | 29.567 | 29.533 | 29.504 | 29.484 | 29.439 | 29.419 | 29.368 | 29.339 | 29.280 | 29.437 |
| 40 | 39.638 | 39.612 | 39.594 | 39.588 | 39.546 | 39.540 | 39.492 | 39.474 | 39.415 | 39.544 |
| 50 | 49.820 | 49.813 | 49.815 | 49.834 | 49.808 | 49.826 | 49.791 | 49.795 | 49.746 | 49.805 |
| 60 | 60.062 | 60.137 | 60.171 | 60.225 | 60.225 | 60.280 | 60.269 | 60.306 | 60.280 | 60.217 |
| 70 | 70.523 | 70.587 | 70.664 | 70.765 | 70.803 | 70.906 | 70.932 | 71.014 | 71.021 | 70.802 |
| 80 | 81.048 | 81.165 | 81.297 | 81.458 | 81.545 | 81.708 | 81.783 | 81.924 | 81.978 | 81.545 |
| 90 | 91.691 | 91.873 | 92.073 | 92.305 | 92.455 | 92.692 | 92.828 | 93.041 | 93.155 | 92.457 |
| 100 | 102.468 | 102.714 | 102.994 | 103.311 | 103.537 | 103.861 | 104.073 | 104.371 | 104.560 | 103.543 |

It will be noted that for values of $Dr$ of 50 or less, the computed $R_{dr}$ values are, without exception, numerically less than the corresponding $Dr$ values, which is equivalent to using a value of $r_{dr}$ less than unity in Equation 2. Similarly for values of $Dr$ of 60 or more, the $R_{dr}$ values are without exception greater than the corresponding $Dr$ values. It will also be noted that the departure of $r_{dr}$ from unity becomes steadily greater in the two directions as the upper and lower limits of the table are approached. The computed values of $R_{dr}$ for any given $Dr$ vary somewhat, but not by more than plus and minus one percent from a mean. For instance, for $Dr=10$, the $R_{dr}$ values vary from about 2.5% to about 4.2% below the value of 10, and average 3.32% below; while for $Dr=100$ they vary from about 2.5% to about 4.5% above the value of 100, averaging 3.54% above.

The last column of the above table gives for each value of $Dr$ the arithmetical average of the nine values of $R_{dr}$ computed and listed in the table for a given value of $Dr$, and if resistor 1235a (Fig. 2) is provided with taps for the respective digital values corresponding to this schedule, the condition of current equaling 50 milliamperes when the quotient ratio is $n+1$ will be very closely approximated for all possible dividends and divisors.

There still remains, however, the question of the proper method of subdividing the secondary divisor resistor 1235b. Since each successive step on resistor 1235a is larger than the preceding one, the unit step on resistor 1235b cannot be one-tenth of that of each step of 1235a as with a uniform scale of $R_{dr}$. Because any given amount of change in resistor 1235b would represent almost ten times as large a percentage of change at the lower extreme of $Dr$ values as at the higher extreme resistor 1235b must be subdivided to correspond more closely to this lower range. We do not have to consider, however, the step from a $Dr$ value of 0 to 10, because 10 is the minimum $Dr$ value on which the machine is desired to operate. If, however, we subdivide resistor 1235b into steps corresponding to one-tenth of the step on resistor 1235a from a $Dr$ value of 10 to a value of 20, it will fit perfectly into the pattern of operation up to a $Dr$ value of 20, and depart increasingly as the $Dr$ values become larger, but because of the increasing size of $R_{dr}$ the percentage error will not be large at any $Dr$ value. However, with the secondary resistor fitted to the smallest active step of the primary resistor, any error in the total resistance of any two digit divisor will always be on the low side. The maximum amount of such error may, however, be cut in half by increasing the resistance up to each tap on the primary resistor by half the amount that the total resistance would otherwise be low when a "9" is set on the secondary resistor 1235b.

From Table 3

When
$$Dr=10, R_{dr}=9.668 \qquad (63)$$

and when
$$Dr=20, R_{dr}=19.479 \qquad (64)$$

Therefore, using $r_{dr}''$ to indicate the unit step on the secondary divisor resistor 1235b, and $R_{dr}''$ to indicate the total resistance of that resistor for any given $Dr$ value, $$r_{dr}'' = \frac{19.479 - 9.668}{10} = 0.9811 \qquad (65)$$

and $$R_{dr}'' = Dr \times r_{dr}'' = Dr \times 0.9811 \qquad (66)$$

As previously mentioned, this value for the secondary resistor will not permit it to fit perfectly into the higher steps of the primary resistor. The $R_{dr}$ values may be readjusted so as to minimize this resulting error as follows:

Let $R_{drn}$ = primary resistor value for a digital divisor $n$.

$R_{drn+1}$ = primary resistor value for next higher digital divisor.

$e$ = greatest error that would exist due to discrepancy between values of primary and secondary resistor steps if primary resistor values were not readjusted to split this error.

$R_{drn}'$ = readjusted value of $R_{drn}$.

Since the maximum error, $e$, would in each instance occur for a secondary digit of "9,"

$$e = 0.9(R_{drn+1} - R_{drn}) - 9 \times 0.9811 \qquad (67)$$

The maximum amount of error from this source may be cut in half by increasing $R_{drn}$ by $e/2$ which requires that, $$R_{drn}' = R_{drn} + \frac{e}{2} = 0.55 R_{drn} + 0.45 R_{drn+1} - 4.415 \qquad (68)$$

Readjusting the resistance values $R_{dr}'$ of the primary resistor 1235a in accordance with this formula gives the schedule of resistances listed in column 3 of Table 4 below, while the resistance values $R_{dr}''$ of the secondary resistor 1235b listed in column 5 below are derived from Formula (66) above.

TABLE 4

| Primary Divisor Resistor 1235a | | | Secondary Divisor Resistor 1235b | |
|---|---|---|---|---|
| 1 | 2 | 3 | 4 | 5 |
| Dr | $R_{dr}$ before Re-adjustment (from Table 3) | $R_{dr}'$ Finally Readjusted values in Ohms | Dr (Second Digit) | $R_{dr}''$ (Secondary increment of resistance in Ohms) |
| 10 | 9.668 | 9.668 | 1 | 0.9811 |
| 20 | 19.479 | 19.545 | 2 | 1.9622 |
| 30 | 29.437 | 29.570 | 3 | 2.9433 |
| 40 | 39.544 | 39.746 | 4 | 3.9244 |
| 50 | 49.805 | 50.075 | 5 | 4.9055 |
| 60 | 60.217 | 60.565 | 6 | 5.8866 |
| 70 | 70.802 | 71.221 | 7 | 6.8677 |
| 80 | 81.545 | 82.040 | 8 | 7.8488 |
| 90 | 92.457 | 93.031 | 9 | 8.8299 |

The value of $R_{dr}$ for any divisor is set up by adjusting the primary resistor 1235a to correspond to the first digit of the divisor and by adjusting the resistance $R_{dr}''$ of the secondary resistor 1235b to correspond to the second digit thereof.

Therefore, $$R_{dr} = R_{dr}' \text{ (from Table 4, column 3)} + R_{dr}'' \text{ (from Table 4, column 5)} \quad (69)$$

As an example if $Dr = 24$ $$R_{dr}' = 19.545$$
$$R_{dr}'' = 3.9244$$
$$R_{dr} = 23.4694$$

Table 5 shows the finally selected values of the various elements of the Wheatstone bridge system used in this preferred embodiment.

TABLE 5

$R = 45$ ohms, per (35)
$E = 100$ volts, per (60)
$r_s = 33$ ohms, per (52)
$i_s =$ approximately 50 milliamperes when $\frac{Dv}{Dr} = q_n + 1$, per (57)
$R_{dv} = Dv \times 0.1$ ohms from Equations 1 and 20, (70)
$R_{dr} = R_{dr}' + R_{dr}''$ (from Table 4), per (69)
$r_2 =$ values listed in Table 2, column 9

It may be found that when the ratio $Dv/Dr$ is a whole integer and the maximum and minimum values of the above elements, which correspond to this ratio, are substituted in Equation 53, the variations in current through the solenoid corresponding to the digital value one less than said ratio never departs from the desirable 50 milliamperes by more than plus or minus 5 milliamperes, which in the case of the present embodiment is well within the safe operating range of current, and would require, in actual division operation, a nominal number of correction cycles.

*Application of finally selected values to numerical example*

A numerical example of a typical division problem was described hereinbefore to show how the machine operates during different stages in the division calculations, and in that description it was assumed that the machine was capable of estimating the quotient digits specified. Now that the values of the various elements of the quotient estimating mechanism have been established, these values and the foregoing equations will next be applied to the above mentioned example and prove that the assumptions made therein were correct.

The present machine is provided with two overflow numeral wheels on the left side of the dividend register. These orders are referred to hereinafter as the 00 and 0 orders respectively from left to right and the following orders to the right thereof are designated I, II, III, etc. orders.

The left factor indicator has no overflow dials and in the following description the respective orders from left to right are referred to as I, II, III, etc. orders. With the exception of those instances in which the dividend may be built up as the result of preceding calculations, the dividend of a division problem is invariably set up in the dividend register commencing with the I order, and the ordinal sensing mechanism described hereinafter senses only three orders at a time. This sensing mechanism is intially positioned with respect to the register 100 so that it senses the 0, I, II orders, which in this instance initially contain the digits 0, 6, and 9, respectively. Each order of the sensing mechanism adjusts a respective resistor, and according to the present problem resistor 1232 (Figs. 16B and 2) is set at 0, resistor 1234a is set at 6, and the resistor 1234b is set at 9 by mechanism described hereinafter. The resistor 1232 is provided for reasons described later and has no function in the present comparison since it is adjusted to zero. The value $Dv = 69$, thus represents the dividend during the comparison for estimation of the first quotient digit. The I, II numeral wheels of the left factor indicator determine the setting of arrow 1233a (Fig. 2) at 2 on the resistance 1235a, and the setting of arrow 1233b at 4 on resistor 1235b. The value $Dr = 24$ thus represents the divisor during the aforementioned comparison. A pair of contacts 1365 are set to the position shown in Fig. 2 during the initial sensing and cuts out of circuit the resistor 1236 described later in connection with the correction cycle.

Depression of the (=) key 152 (Fig. 2) closes the circuit to ground at switch 1247, and current flows through the resistors $R_{dv}$ and $R_{dr}$ and also through the parallel resistor R. According to the present problem, $Dv = 69$ and $Dr = 24$, and from Equation 70, $R_{dv} = 6.9$ ohms. According to Table 4, the value of the resistor 1235a is 19.545 ohms when it is set at 2, corresponding to the leftmost digit of the divisor, and the value of the resistor 1235b, when set at 4, is 3.924 ohms, which corresponds to the second digit of the divisor. Then according to Equation 69, $$R_{dr} = 19.545 + 3.924 = 23.469$$

ohms when $Dr = 24$. The true quotient of the ratio of the dividend to the divisor, $$\frac{69}{24} = 2.875$$

which indicates that theoretically the number 2 solenoid should operate. The value $r_2 = 33.39$ ohms, corresponding to the number 2 solenoid (Table 2, column 9), is used in the present example. The values of the constants R, E, $r_s$ listed in Table 5, and the above values of $R_{dv}$, $R_{dr}$ and $r_2$ are substituted in Equation 53 from which the current $i_s$ through the number 2 solenoid is computed as equal to 65.6 milliamperes. This is slightly less than the 67 milliamperes specified hereinbefore as the minimum current required to operate any one of the solenoids (Fig. 2). The margin is so slight in this instance that the number 2 solenoid might operate, thereby avoiding an overstroke, but since its operation would not be certain we will assume that the 65.6 milliamperes proves insufficient to operate it, therefore the switch 1240 operated by the number 2 solenoid is not opened and the current flows through the number 3 to 9 solenoid inclusive, Obviously the current through the higher numbered solenoids under these conditions is far in excess of 67 milliamperes, with the result that this excessive current will cause operation of the 3 to 9 solenoids.

As mentioned briefly hereinbefore in connection with Fig. 1, the voltage is greater across the higher number solenoids and there will be a tendency for these to operate first, but in rapid succession the switches 1240 will be opened by the respective solenoids. In the case of the present example, only the 5 to 9 solenoids approximately would initially operate. The operation of these solenoids would be simultaneous, but the greater current on the higher numbered solenoids would make them tend to operate somewhat faster, each solenoid opening its respective switch 1240, the 9 first, the 8 next, etc., and cutting the higher solenoids out of circuit. The cutting out of the higher numbered extraneous solenoids would provide a potential difference across the number 3 solenoid, sufficient to render it operative, so that finally the opening in the number 3 switch 1240 cuts out all the extraneous solenoids above 3, leaving only the number 3 solenoid in operation. Furthermore this current through the number 3 solenoid reduces the amount of current through the number 2 solenoid to a value somewhat below the 65.6 milliamperes computed therefor, and this further decreases the possibility of the number 2 solenoid operating. Although the above action has been described in steps, the energization of the solenoids and the opening of the switches 1240 occur in the form of a wave, moving from 9 downwardly to 3 so rapidly as to require only an extremely small fraction of a second to establish the selection of the solenoid representing the estimated quotient digit.

In the description of the operation of these solenoids which are shown in Figs. 5 and 6, it was explained that when the solenoid is energized sufficiently to overcome the pull of its polarized armature, the plunger 1019 (Fig. 6) remains ejected until recocked by the mechanism described hereinbefore. The ejected plungers of the extraneous solenoids 4 to 9 in this instance are ineffective to control the setting since the arm 1023 (Fig. 5) which is rocked clockwise to setting position, is blocked by the plunger of the number 3 solenoid, in the case of the present example, thereby determining the setting of the shaft 270 and the multiplier sides of the partial product selectors to their number 3 positions.

Following the estimation of the quotient and the setting of the partial product selectors, the product of 3 times the divisor 2402 is subtracted from the dividend. As stated hereinbefore in step 2 of the description of the numerical example of the present problem, this subtraction causes an overdraft which in this instance causes the numeral wheels in the 0, I, II orders of the product register to stand at 997. During the sensing of these three numeral wheels, the brushes 1237 and 1231a (Fig. 2) are each moved to their 9 positions, and the brush 1231b to its number 7 position. These settings serve to set up a total resistance in accordance with Equation 70 described hereinbefore, making the total resistance of $R_{dv}=99.7$ ohms. In the comparison for detecting an overdraft, the contacts 1370 are opened and contacts 1365 are closed (Fig. 2) by mechanism described hereinafter, thereby cutting the $R_{dr}$ resistors out of circuit and connecting the resistor 1236 into circuit.

In the event of an overdraft the three numeral wheels of the product register which are sensed will never be less than 900 or greater than 999, therefore 900 was selected hereinbefore in the description of step 3 of the numerical example, as the abstract number which the overdraft resistor would represent for comparison with the registration on said three product numeral wheels. Upon reference to the last column of Table 3 it will be noted that the value of $R_{dr}$ departs slightly from the value of $Dr$, and that the departure increases as $Dr$ increases. In the preferred embodiment therefore the number 900 is represented by the resistor 1236, having an arbitrarily chosen resistance of 1000 ohms. By substituting in Equation 53, 1000 for $R_{dr}$, 99.7 for $R_{dv}$, and 36.39 for $r_2$ corresponding to the number 1 solenoid (Table 2, column 9), and the values of R, E, and $r_s$ shown in Table 5, we get $i_s$ equal to 77.1 milliamperes as the current through the number 1 solenoid. By similarly substituting in Equation 53 the value $r_2=39.95$ corresponding to the zero solenoid we get the current $i_s$ through the zero solenoid equal to 16.80 milliamperes, therefore, the zero solenoid will not operate and the number 1 solenoid will operate, and determine the setting of the multiplier sides of the partial product selectors to "1," after which $1 \times 2402$ is added to the product register, per step 4 of the description of the numerical example.

In case no overdraft has occurred, the first or leftmost product numeral wheel sensed always stands at 0, and the greatest number which could ever be sensed in the second and third numeral wheels would therefore be 99 and according to Equation 70, a dividend $Dv=99$ is represented by an $R_{dv}$ resistance of 9.9 ohms. By substituting in Equation 53 9.9 for $R_{dv}$ and 1000 for $R_{dr}$, and 39.95 for $r_2$ (Table 2, column 9), we get $i_s=216.5$ milliamperes as the current through the zero solenoid, which causes operation of the shift initiating mechanism mentioned hereinbefore.

By comparing Figs. 16B and 2, it will be seen that the elements of the bridge circuits, shown in Fig. 16B, are drawn in an arrangement which presents an appearance quite different from that of Fig. 2, but are nevertheless connected in the same relation and represented by the same reference characters and numerals. In Fig. 16B the resistor R is tapped at points located as described hereinbefore, and connected to the solenoids 1001 to 1009. The rectifiers 1242 are interposed between the resistor R and all the solenoids except the number 9 solenoid, which is connected directly to resistor R. The upper end of resistor R is connected to the main line at point Y, and the other end is connected at point Z, to leads 1245 and 1246, and upon closure of the main division switch 1247 is connected to ground. The $R_{dv}$ resistors 1232, 1234a and 1234b (Figs. 16B and 2) are connected in series and have the resistance values specified hereinbefore. One end of the series is connected to point X and the other end thereof is connected to the main line through leads 1361 and 1321. The $R_{dr}$ resistors 1235a and 1235b are similarly connected in series and also have resistance values specified hereinbefore. One end of the latter series is connected to point X and the other end is connected to one of the contacts 1370 and selectively connected to ground through lead 1246 and switch 1247. Before describing the timing and complete sequence of the division operation, the structural details of the division mechanism will be described immediately hereinafter.

Dividend (÷) key

The dividend key effects substantially the same operations as the "+" key, described in the application Serial No. 506,519, namely, it transfers the item standing in the left factor indicator to the product register and then effects a clearance operation for zeroizing the left factor indicator. The principal difference between the keys is that the "÷" key disables the quotient register during entry of the dividend into the product register. For a more specific description of the operations performed by the "+" key and the "÷" key, reference is made to the last mentioned application.

Setting of the divisor resistances

Entry of the divisor, following transfer of the dividend to the product register, sets the $R_{dr}$ resistors 1235a and 1235b (Fig. 16B), according to the first two digits of the divisor, by means of the following mechanism. An arm 1260 (Fig. 4) is fixed to each of the two leftmost wheels only of the left factor register 110, which numeral wheels are referred to hereinafter as those in the I and II orders, respectively. Each arm 1260 carries a brush 1233 insulated from the arm, which brush is adapted to sweep across a set of stationary contacts 1263 associated with the respective numeral wheel. These contacts are connected to the taps of their respective resistors 1235a and 1235b, the 0 to 9 contacts 1263 in the I order being connected to resistor 1235a at the respective 0 to 9 points designated 1263a (Fig. 16B), and the corresponding contacts in the II order similarly connected to resistor 1235b at the respective points designated 1263b. The brush 1233 (Fig. 4) in the I order is connected into the circuit in the manner in which brush 1233a is shown diagrammatically in Fig. 16B, namely to point X, and the brush 1233 in the II order is connected to the zero end of the resistor 1235a as brush 1233b is shown diagrammatically in Fig. 16B. The taps 1263a and 1263b of resistors 1235a and 1235b are located at points specified in columns 3 and 5, respectively, of Table 4, so that in the case of the division problem described in connection with Fig. 2, the I numeral wheel stands at 2 and connects 19.545 ohms (column 3) into the circuit, while the II numeral wheel stands at 4 and connects 3.924 ohms (column 5) into the circuit, giving a total of 23.469 ohms for the value of $R_{dr}$.

Dividend sensing mechanism and setting of the dividend resistors $R_{dv}$

The value of the dividend or remainder becomes smaller and smaller during each division cycle and it is therefore necessary to provide a mechanism which is shiftable transversely into alignment with successive lower order numeral wheels, so that the $R_{dv}$ resistors (Fig. 16B) may be adjusted according to the numeral value of the current remainder. In addition to being shiftable transversely, the dividend sensing mechanism is adapted to move into sensing position at the beginning of each division cycle and then to move out near the end of the cycle so that it may be shifted one order toward the right preparatory to sensing the next lower order numeral wheels during the following division cycle. Since only three resistors are required for establishing the resistance value representing the dividend or remainder, the sensing mechanism is arranged to sense only three numeral wheels at a time.

The sensing mechanism is mounted on a shiftable carriage 1270 (Fig. 4) comprising frame end plates 1271 (Fig. 8) which are adapted to slide on three shafts 1275, 1276, 1277. Three gears 1285, 1286, and 1287 (Figs. 8 and 4) are keyed to their respective shafts 1275, 1276, 1277 and are adapted to slide on these shafts with the carriage. Each of the three gears is held in alignment with a respective segment 1280, 1281, or 1282 (Fig. 4) by bushings 1278 (Fig. 8) mounted on the shafts between the gears and the carriage end plates. The end plates are held rigidly by tie bolts and bushings 1279 and also by a web 1274 (Fig. 4) integral with and connecting the plates. Each of the three segments has an integral hub 1273 (Fig. 8) freely mounted on a worm shaft 1290 between the carriage end plates, so as to maintain the segments in correct alignment with their respective pinion gears. A worm nut 1291 is fixed to the carriage and cooperates with the groove in the worm shaft so as to shift the carriage, including the gears and segments, when the shaft is rotated by mechanism described hereinafter. The shafts 1275, 1276 and 1277 are journaled in bearings 1292 mounted on the machine frame plates and extend toward the right through the frame plate 1293. Gears 1295, 1296, and 1297 (Figs. 8 and 13) are freely mounted on the right ends of their respective shafts between the frame plate 1293 (Fig. 8) and pins 1299 fixed to the shafts. A lug 1298 (Fig. 13) is provided on the hub of each gear and lies in the path of its respective pin 1299. Springs 1294 (Fig. 8) are wound around the hubs and are stressed between holes in the hubs and the pins 1299 so as to urge the lugs counter-clockwise against the pins. A segment 1300 (Fig. 13) meshes with all three gears 1295, 1296, and 1297 and is urged counter-clockwise about shaft 1290 on which it is freely mounted, by a torsion spring 1303. A latch 1305 hooks over the top of a stud 1306 mounted on the segment and holds the segment in its extreme clockwise position against the torque of the spring, thereby holding the sensing mechanism out of operation.

When the equals key 152 is depressed to initiate a division calculation, the latch 1305 is rocked clockwise from above stud 1306, as will be more fully described hereinafter, and spring 1303 is then free to rock the segment counter-clockwise, which drives the three gears 1295, 1296, and 1297 clockwise. The springs 1294 (Fig. 8) yieldably force the pins and shafts to follow the gears. The three gears 1285, 1286, and 1287 (Fig. 4), which are keyed to the shafts, are likewise driven clockwise and each one drives its respective segment 1280, 1281, 1282 counter-clockwise until blocked by the lug 1310 with which it is aligned. Each of these lugs is positioned by the following mechanism and controls the movement of the sensing mechanism according to the numeral displayed on the three numeral wheels which are currently being sensed.

Figure 11:
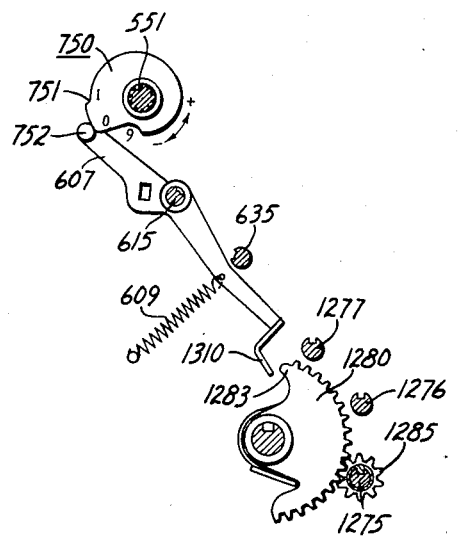
Fig. 11 is a sectional view, taken from the right side of the machine, showing the mechanism for sensing the registration on the numeral wheels of the dividend register.

Each numeral wheel of the product register has fixed thereto a cam 750 (Fig. 11) which cam is shown in its zero position. A lever 607, freely mounted on a shaft 615, is urged clockwise by a spring 609, and carries a roller 752 which rides the periphery of the cam. The numeral wheel assembly including the cam may be rotated in either direction. If driven in a plus direction, the roller 752 mounted on lever 607 drops abruptly at the point designated 751 to the number one position, and from the number one to the number eight position. The cam has a constant drop and finally drops off abruptly at the number nine position. Between the number nine and zero positions, the cam is so designed that the roller may ride up the steep rise of the cam when the cam is rotated in a plus direction. For each digital position of a numeral wheel therefore, its respective lever 607 assumes a specific position and the lug 1310 thereof blocks the tip 1283 of one of the three segments such as segment 1280 (Fig. 11). The arrangement is therefore such that when the segment 1300 (Fig. 13) is unlatched, it drives all three sets of gears, shafts, and segments until they are individually blocked by three respective lugs 1310 (Fig. 4). The gears and shafts associated with the blocked sensing carriage segments are thus stopped at rotated positions corresponding to the numerals displayed on the numeral wheels currently being sensed. Each of the springs 1294 (Fig. 8) yields after its respective shaft is blocked, so as to allow the segment 1300 (Fig. 13) to move its fullest extent and drive the other sets of gears and shafts until they are similarly blocked.

A brush 1237 (Fig. 10) corresponding to the brush of the same number in Fig. 16B is set on a contact 1311 corresponding to the numeral displayed on the highest order or leftmost of the three numeral wheels sensed. Similarly, the brushes 1231a, 1231b (Fig. 10), fixed to the shafts 1276 and 1277, respectively, are set on the contacts 1312 and 1313 corresponding to the respective numerals displayed on the second and third numeral wheels sensed, thereby switching into the bridge circuit, resistance values which together establish the value of $R_{dv}$ corresponding to the registration on the three numeral wheels sensed.

*Equals (=) key and the start of division*

Depression of the "=" key following the set up of the dividend and the divisor, starts the machine dividing, by rendering certain devices effective to first condition the machine for division and then to start the operation of the machine. A division control lever 1350, described hereinafter, and shown diagrammatically in Fig. 16B, is moved toward the right upon depression of the "=" key and closes contacts 1366 and 1370, and opens contact 1365. The opening of the contacts 1365 cuts out of the bridge circuit, the correction resistor 1236, and closure of the contacts 1370 connects the $R_{dr}$ resistors into said circuit preparatory to comparison and estimation of the quotient digit. Closure of the contacts 1366 closes the circuit from the main line 382 to leads 1321, 1361, 1362, and 1363 through the MR (main reverse) solenoid to ground. This solenoid, as expalined in the application Serial Number 506,519, determines subtractive operation of the product and quotient registers. During division, however, the quotient register must operate additively during subtractive operation of the product register; therefore, a switch 1329 is also closed upon depression of the "=" key and closes the circuit from the main line and lead 1321 through the QR (quotient reverse) solenoid 530, thereby conditioning the quotient register for operation opposite to that of the product register (in this case determining additive operation). The sensing mechanism described hereinbefore is also released upon depression of the equals key and moves into sensing position to cause setting of the $R_{dv}$ resistors. Finally the main division switch 1247 is closed upon movement of the sensing mechanism into sensing position. This switch closes two parallel circuits, the first of which is the circuit described in detail immediately hereinafter which leads through the Wheatstone bridge to ground, to determine the energization of the solenoids 1001 to 1009 or 1011, according to the estimation, and the second of which leads through the MC (main clutch) solenoid to ground to cause engagement of the main clutch and start operation of the machine.

The first circuit above, through the Wheatstone bridge, may be more readily seen upon cross reference to Figs. 16B and 2 during the following description of this circuit, which includes leads 1321 and 1361, connected to the main line, brush 1237 through the dividend resistance $R_{dv}$ to point X. From point X, two parallel circuits branch off, namely, one through the $R_{dr}$ resistors, switch 1370 (now closed), lead 1246 and the closed switch 1247 to ground. The second parallel circuit from X to ground includes lead 1241, the closed switches 1366 and 1367, through whichever one of the solenoids 1001 to 1009 is indicative of the quotient digit, and through the respective rectifier to resistor R, and from point Z on resistor R through lead 1245, lead 1246, switch 1247 to ground.

The second circuit above, namely that through the MC solenoid, includes lead 1321 connected to the main line, leads 1361, 1371, the closed contacts 1372 and 1373, lead 1374 through the MC solenoid 550, and therefrom through lead 1375, the main division switch 1247 to ground.

A preferred structural form of the controlling mechanism schematically outlined above will be described immediately hereinafter. As above outlined, these mechanisms operate to set the $R_{dv}$ and $R_{dr}$ resistors according to the values of the representation of the dividend and divisor factors, and to position the driving mechanism for driving the product register in a subtractive direction and the quotient register in an additive direction. The closure of the circuit through the Wheatstone bridge network described hereinbefore in connection with Fig. 2 causes operation of the solenoids 1001 to 1009 corresponding to the estimated quotient digit and finally causes engagement of the main clutch to effect the actual registration.

Referring now to the structure for accomplishing the above functions. The "=" key 152 (Fig. 13) is mounted in the usual way and is normally maintained in raised position by a spring 1322. When the key is depressed, an ear 1323 formed on the key stem rocks a lever 1325 clockwise, together with the shaft 1197 to which it is fixed. A bell crank 1330 is also fixed to the shaft 1197 and has an insulation tip 131 which, upon clockwise rocking of the bell crank, allows switch 1320 to close. This switch corresponds to the switch of the same number in Fig. 16B for effecting energization of the QR (quotient reverse) solenoid 580. A latch 1335 (Fig. 13) is urged by a spring 1337 in a clockwise direction about a stud 1336 upon which it is freely pivoted so that when the bell crank 1330 is rocked clockwise, the latch snaps under a shoulder 1334 and maintains the division control mechanism in operative position after the operator releases the equals key.

A main division control lever 1350 which effects periodic operation of the contacts 1360, 1365, 1370, referred to in connection with Fig. 16B is also released upon depression of the equals key as follows. A link 1341 is connected by a stud 1338 at one end to bell crank 1330, and a stud 1342 is fixed on the other end of the link. The latter stud extends through an elongated hole 1343 in a latch 1340, having a hook 1344. The stud 1342 also extends through an aperture 1346 in a second latch 1345, also having a hook 1347. Latch 1340 is freely mounted on a shaft 1351 and latch 1345 is fixed thereto and urged counter-clockwise by a spring 1348. Depression of the "=" key thus rocks both latches clockwise and releases the division control lever 1350 which rocks toward the right under urge of a spring 1352. The division control lever has two positions which may be called minus "—" and plus "+" positions as shown by the arrows in Figs. 13 and 16B. This lever is automatically restored and released at certain periods in the division cycle and determines whether the machine subtracts or adds the product of the current quotient digit times the divisor and also throws the correction resistor described hereinbefore into or out of the Wheatstone bridge circuit. The initial rightward movement described above allows contacts 1360 to close the circuit through the MR solenoid 570 as described in connection with Fig. 16B. The insulation tip 1353 also closes the contacts 1370 and opens the contacts 1365 for controlling the circuits in the Wheatstone bridge described hereinbefore.

The sensing mechanism is also released at substantially the same time the division control lever is released so as to complete the conditioning of the machine for operation before the main division switch 1247 (Fig. 16B) is closed. A lug 1339 (Fig. 13) is provided on latch 1340, and when the latch is rocked clockwise, the lug rocks a lever 1308 and an integral shaft 1307 clockwise. Latch 1305 is also fixed to said shaft and is rocked clockwise to release segment 1300 and the sensing mechanism described hereinbefore. An insulation tip 1359 is mounted on the segment 1300, and near the end of the counter-clockwise movement of the segment for effecting the sensing of the numeral wheels and the setting of the dividend resistors accordingly, this insulation tip closes the main division switch 1247, whereupon the first division cycle starts. The divisor is then multiplied by the estimated current quotient digit by means of the partial products mechanism and is negatively entered into the product register.

Briefly this multiplication is controlled by the partial product selectors 859 (Figs. 16A and 12), and since the divisor, in division, is entered into the left factor indicator, as is the multiplicand in multiplication, the multiplicand sides of the partial product selectors are set according to the divisor. The solenoids 1001 to 1009 (Figs. 16B and 5) are energized under control of the Wheatstone bridge network described hereinbefore and effect a setting of shaft 270 (Fig. 5) and the multiplier sides of all the partial product selectors. Operation of the main clutch following energization of the solenoids 1001 to 1009 then drives the timing switch 610 (Fig. 16B) which controls the entry of the estimated quotient digit into the register 120 and the negative entry of the product of said digit times the divisor into the product register 100.

Means are provided to cut off the current to the solenoids 1001 to 1009 and to the MC solenoid after they have performed their function, so as to prevent overheating of the solenoids during continuous operation of the machine. For this purpose a cam 1380 (Fig. 16B) is mounted on the main clutch shaft 410 (Fig. 14), and is adapted to rock a cam follower 1381 counter-clockwise shortly after the beginning of the main clutch cycle. This opens a pair of switches 1366 and 1372 which are in the circuit through the solenoids 1001 to 1009 (Fig. 16B) and the circuit through the MC solenoid respectively. At the end of the main clutch cycle, when the cam 1380 (Fig. 14) returns to the position shown, a spring 1352 returns the cam follower to the position shown and allows the switches 1366 and 1372 to close, preparatory to the initiation of the next cycle.

Following the first minus division cycle the remainder is sensed and compared against the resistor 1236 described hereinbefore to determine whether the original estimation was correct and shift should follow, or whether said estimation was not correct and a correction cycle should follow. It is necessary therefore to next switch the $R_{dr}$ resistors out of circuit and the correction resistor 1236 in, and also to change the driving mechanism from minus to plus so that if the correction cycle is found to be necessary, the machine will be in condition to add the product of one times the divisor to the remainder.

These two conditioning functions are effected by the restoration of the control lever 1350 (Fig. 13) which is also shown diagrammatically in Fig. 16B. This restoration of the division control lever is effected at the end of the regular division cycle as follows. A cam 1385 (Fig. 14) is fixed to the main clutch shaft 410 and is adapted to rock a cam follower 1386 and shaft 1355 clockwise near the end of the main clutch cycle. The division control lever 1350 is fixed to the shaft 1355 and is therefore restored to the plus position shown. It will be recalled that the two latches 1340 and 1345 were rocked clockwise by link 1341 (Fig. 13) upon depression of the equals key, and that this link is held in its leftward position by latch 1335. It will be noted further that the division control lever should be latched in its plus position at least until the correction cycle is initiated. For this reason the latch 1345 is adapted to be disconnected from link 1341 so that it may be in position to latch the division control lever when it is restored. When the latch 1340 was rocked clockwise by the equals key as described hereinbefore, a stud 1349 was moved upwardly and raised the right end of link 1341. The stud 1342, carried by the link 1341, was also raised into alignment with the narrowed horizontal part of the aperture 1346 in latch 1345, to allow the latter latch to rock counter-clockwise under urge of the spring 1348, so that when the division control lever 1350 (Fig. 14) is restored as described above, the latch 1345 is enabled to retain the division control lever in the position shown in Figs. 13 and 14. The latch 1340, however, has only an elongated hole 1343 and is therefore held in its clockwise or unlatching position until the latch 1335 (Fig. 13) is released at the end of division.

The restoration of the division control lever 1350 (Fig. 13) thus opens contacts 1360 and 1370 and closes contacts 1365, the first of which opens the circuit through the MR solenoid (Fig. 16B) and thus positions the product register driving mechanism for plus operation. Switch 1320, shown also in Fig. 13, is allowed to remain closed by the bell crank 1330 being held in its clockwise position by latch 1335 so that the circuit through the QR solenoid (Fig. 16B) is maintained closed to effect energization of the latter solenoid and continue to position the quotient register driving mechanism for operation opposite to that of the product register (in this instance minus operation). The contacts 1370 (Fig. 16B) which are opened as described above, cut the $R_{dr}$ resistors out of the bridge circuit, and the contacts 1365, which are closed, connect the correction resistor 1236 into the circuit in place thereof. As indicated by illustrative resistance values previously outlined, the resistance of resistor 1236 is of such a large value that a "1" estimate will result if a "9" is present in the highest product numeral wheel being sensed as will be true in case of overdraft, while a "0" estimate will result if a "0" is preesnt in that numeral wheel, as will be true in case the quotient digit was correct as originally estimated.

Assume for the purpose of the present description that a correction cycle is necessary, as in the case of the division problem described hereinbefore. The number 1 solenoid 1001 (Fig. 16B) is therefore energized, and since the main division switch 1247 is maintained closed, the circuit described hereinbefore through the MC solenoid is closed and causes the latter to reenergize and effect re-engagement of the main clutch for the second cycle. The timing of this energization, described in detail hereinafter, is such that the current is applied to the MC solenoid before the main clutch has a chance to disengage at the end of the first cycle. In this way the correction cycle follows the division cycle without interruption and in the case of the present example causes the machine to subtract "1" from the quotient and add one times the divisor to the remainder.

At the end of the correction cycle the main clutch cam 1385 (Fig. 14) tends to again restore the division control lever 1350, but without effect since the latter is held in its restored plus position during the correction cycle. The contact 1365 thus remains closed and the correction resistor 1236 (Fig. 16B) remains in the circuit for comparison against the corrected first remainder, the first sensed digit of which will be zero if the overdraft has been eliminated; in which case the zero solenoid 1011 (Fig. 16B) is energized, which opens the contacts 1373 and 1367 in the circuits through the MC solenoid and the multiplier solenoids respectively, and closes the contact 1376 in the circuit through the SC solenoid. Near the end of the instant correction cycle, the shift clutch is engaged upon closure of the contacts 1366 and 1372 (Figs. 14 and 16B) described hereinbefore, which closure occurs at a time specified hereinafter in the description of the division timing chart (Fig. 17A).

*Shift operation during division*

A plurality of operations are performed by the shift clutch, namely, (1) the sensing mechanasm is moved out of sensing position to allow the segments 1280, 1281, 1282 (Fig. 4) to pass the lugs 1310, when the sensing carriage is shifted; (2) the sensing carriage is shifted one order toward the right; (3) the product and the quotient shift switches are advanced one step; (4) the division control lever is released for movement to its minus position preparatory for a minus division cycle in the next order.

To accomplish item 1 above, an eccentric 1390 (Fig. 13) is driven by the shift clutch shaft 970 and carries a stud 1391. When the sensing mechanism is in its sensing position the segment 1300 stands in its extreme counterclockwise position so that the stud 1391 lies in the right end of an elongated hole 1392 in the segment. Operation of the eccentric in the direction of the arrow pulls the stud toward the right and rocks segment 1300 clockwise and by means of the connecting gears and shafts also rocks the sensing carriage segments 1280, 1281, and 1282 (Fig. 4) clockwise during the first part of the shift clutch cycle.

To accomplish item 2, the sensing carriage is shifted one order toward the right by the following mechanism during the time the sensing segments are rocked out of sensing position. A second eccentric 1400 (Figs. 8 and 9) is also mounted on the shift clutch shaft 970 and rotates clockwise. A lever 1401, rotatably mounted on this eccentric, includes two arms 1402 and 1403. This lever is urged counter-clockwise by a spring 1426 and guided by the arm 1403 resting against a stud 1404. This stud is mounted on a rearwardly extending arm of a latch 1406 which normally assumes the position shown. The stud 1404 normally holds the arm 1403 up so that when the arm 1401 is actuated by the shift clutch during multiplication the stud holds the arm 1402 away from the teeth of the ratchet 1405 and prevents actuation of the sensing carriage shift mechanism, but when the "=" key is depressed and the latch 1305 (Fig. 13) is rocked clockwise as described hereinbefore, an ear 1408 on the latch moves toward the left. A spring 1409 (Fig. 9) is tensioned between the ear 1408 and a second ear 1410 on the pawl 1406, so that the pawl is rocked clockwise into engagement with the ratchet 1405. This moves the stud 1404 to the position designated 1404a, which allows the arm 1402 to move downwardly on top of the ratchet wheel. The arm 1403 is of such shape that the initial one-third of a cycle of rotation of eccentric 1400 moves the arm 1402 toward the right and then downwardly into engagement with a tooth of the ratchet 1405. During the next one-third cycle or thereabouts the arm 1402 moves toward the left and advances the ratchet one step to a position in which it is held by the pawl 1406. During the remainder of the cycle it moves toward the right to its starting position, and during each subsequent shift cycle, the ratchet is advanced one step and held there by the pawl 1406. During this advance a spring 1407 (Fig. 8) is wound up thereby storing the power derived from the shift clutch.

The ratchet 1405 (Fig. 8), which drives the sensing carriage shift mechanism, is freely mounted on the worm shaft 1290 and transmits the drive from the ratchet to the last mentioned shaft by a gear train including a gear 1415 (Fig. 9) fixed to the ratchet and meshing with a pinion 1416 which is integral with a large gear 1417, both of which are supported on a stub shaft 1418 fixed to the machine frame. The large gear 1417 meshes with a pinion 1421 which is fixed to the worm shaft 1290. The gear train greatly increases the movement imparted to the ratchet and advances the worm shaft one full revolution for each step of movement of the ratchet. The sensing carriage is thus moved toward the right by an amount equal to the distance between denominational orders of the product register so that during successive shift cycles the segments 1280, 1281, 1282 are first shifted from their initial position, namely from alignment with the 0, I, II numeral wheels, into alignment with the I, II, III numeral wheels, and then at the next succeeding shift into alignment with the II, III, IV numeral wheels, etc.

With reference to item 3 above, the cam 975 (Fig. 8) also driven by the shift clutch shaft, shifts the product and quotient shift switches by means of a mechanism, shown in the application Serial Number 506,519, and not disclosed herein. The movement of the product shift switch 1100 (Fig. 16A) connects the partial product selectors 850 to successively lower orders of the product register, and similarly, the quotient shift switch 1140 is shifted so that the successive quotient digits may be entered into successively lower orders of the quotient register.

To accomplish item 4 above, another cam 1430 (Fig. 13) is adapted to release the division control member 1350 during the latter part of the shift cycle. This cam is keyed to the shift clutch shaft 970 and rocks a cam follower 1431, shaft 1351, and latch 1345 clockwise, thereby releasing the division control lever 1350, which then moves to its minus position preparatory to the next division cycle.

The mechanism for restoring the multiplier solenoids, following the actuating phase of a multiplication cycle, is actuated upon energization of the MSR (multiplier solenoid restore) solenoid (Figs. 5 and 16B) described hereinbefore. Since the actuating phase of a division cycle is a negative multiplication, the multiplier solenoids are restored in division as well. Furthermore, the zero to nine solenoids 1011 and 1001 to 1009 are all operated when a shift occurs in division, and it is necessary to provide a mechanism which is operable during such a shift cycle to restore the multiplier solenoids. This is accomplished by providing a branch lead from the MSR solenoid lead 1047 (Fig. 16B) to ground, and a switch 1423 in the last mentioned lead which is operable by the shift mechanism to close the circuit from the main line lead 989 through the MSR solenoid to ground. For this purpose a lever 1412 (Fig. 9) is freely mounted on the stud 1404 and urged counter-clockwise about said stud by a spring 1426 tensioned between an ear 1411 and a stud 1412a on the lever 1412. A stud 1414 holds the latter lever in the position shown to prevent excessive movement thereof. A roller 1413 is mounted on the lever 1412 and is so positioned relative to the eccentric 1400 that when the latter is rotated by the shift clutch 965 in the direction of the arrow, the high portion 1400a of the eccentric engages the roller 1413 and rocks the lever clockwise. An insulation tip 1422 is thus moved clockwise and closes the switch 1423 at approximately 18% of the shift cycle. At approximately 40% of the shift cycle the high portion of the eccentric passes the roller and allows the spring 1426 to return the lever 1412 to the position shown and allow the switch 1423 to open.

*Division stop mechanism*

Means are provided to automatically terminate the division calculation when the machine has reached its capacity for registration of quotient digits. This is accomplished by power derived from the shift clutch during the idle shift, following the last division cycle, and is conditioned for such termination by movement of the shift mechanism into its last position.

When the "=" key is depressed and the bell crank 1330 (Fig. 13) is rocked clockwise, an ear 1440 (Fig. 15) moves downwardly and allows a spring 1441 to rock a link 1442 downwardly to the position where a shoulder 1443 rests on the top of an ear 1444 of latch 1335. The link 1442 is pivoted to a lever 1445 which is fixed to a shaft 1446. A second lever 1447 is also fixed to the shaft and carries a stud 1448 which lies in an elongated hole 1449 of a link 1450. Lever 1447 normally is blocked in the counter-clockwise position shown by an arm 1455. The link 1450 is moved to the right and returned to its initial position during each shift clutch cycle as explained in the application Serial Number 506,519, and during such movement the elongated hole 1449 rides idly over the stud 1448 without imparting any movement to levers 1447 and 1445 at this time. When the quotient shift switch 1140 (Fig. 16A) shifts into its last operative position preceding the last ordinal division operation, the arm 1455 is moved to the left as seen in Fig. 15. The spring (not shown) which causes such leftward movement of arm 1455 is stronger than spring 1441 and therefore rocks levers 1447 and 1445 clockwise to the extent permitted by the slot 1449 and stud 1448. The link 1442 is thus moved toward the right to a position where the shoulder 1443 drops down behind the ear 1444.

During an idle shift following the last division cycle, the link 1450 (Fig. 15) is again pulled toward the right. Since the stud 1448 rests in the left end of the hole 1449 at this time, the rightward movement of link 1450 rocks levers 1447 and 1445 counter-clockwise and pulls the link 1442 toward the left. Shoulder 1443 rocks latch 1335 counter-clockwise and releases the bell crank 1330, whereupon the division control mechanism is returned to the initial position shown in Fig. 13.

The stop key is designed to stop the machine in substantially the same way, namely, depression of the stop key 153 (Fig. 15) rocks a lever 1465 clockwise, which lever is freely pivoted on the shaft 1446 and has an ear 1466 which is adapted to rock levers 1445 and 1447 clockwise and slide link 1442 toward the right, so that during the following shift cycle when the link 1442 is returned to the position shown, the latch 1355 is tripped as described above. At this time the latch 1345 (Fig. 13) holds the division control lever 1350 in the plus position shown, to which position it was moved by cam 1385 (Fig. 14) during the latter part of the preceding minus cycle. The release of bell crank 1330 (Fig. 13) by latch 1335 enables the spring 1326 to return said bell crank, link 1341, and latch 1340 to division control lever latching position shown, so that when the second latch 1345 is tripped by cam 1430 during the normal or idle shift cycle as described hereinbefore, the first latch 1340 prevents release of the division control lever. The counter-clockwise return movement of latch 1340 also releases the sensing latch 1305 so that when the sensing segment 1300 is returned by the eccentric 1390 during said shift cycle, the latch 1305 is effective to lock the segment in the position shown and to hold the main division switch 1247 open. Return of the bell crank 1330 (Fig. 15) also moves ear 1440 upwardly and disengages link 1442 from ear 1444, to enable latch 1335 to latch the division control mechanism in operative position when the equals key is again depressed during a subsequent calculation.

At the end of division, when the latch 1305

(Fig. 13) returns to its latching position shown, the pawl 1406 (Fig. 9) is rocked counter-clockwise to release the ratchet. The stud 1494, which is also moved counter-clockwise, moves the arm 1493 upwardly and the arm 1492 above and out of the path of the teeth of the ratchet 1495, whereby the spring 1497 which was previously wound up is free to return the carriage to its initial position.

SEQUENCE OF DIVISION OPERATIONS

The division sequence illustrated in the timing chart (Figs. 17A and 17B) is based on the problem 69731÷2402=290303913. This problem was chosen so as to illustrate the different conditions which may be encountered in division problems as follows. The first quotient digit involves an overdraft and a correction cycle, followed by a shift cycle. The second division cycle correctly estimates the second quotient digit (without an overdraft and correction cycle) which is followed by a second shift. The third quotient digit is directly estimated as a "zero" shift and a shift is immediately effected and is followed by another division cycle and so on. During the last division cycle shown in Fig. 17B, a "3" quotient digit is estimated. This may be considered as being either the fourth or ninth and last digit of the quotient 290303913, which is "3" in either case. In order to shorten the timing chart and description, however, it is assumed that it is the last digit, so as to illustrate how the idle shift at the end of the calculation stops the machine.

The set up of the dividend and divisor is not shown in the chart, since the timing thereof is entirely dependent upon the speed of the operator, and the machine does not actually start dividing until the operator depresses the "=" key. Depression of this key (Fig. 17A, line 2) trips the sensing latch 1305 (line 4) and (Fig. 13), and also trips the division lever latches 1340 and 1345 (lines 6 and 7). The "=" key also closes the switch in the circuit through the quotient reverse solenoid (line 3). Latches 1340 and 1345 (lines 6 and 7) release the division control lever (line 8) which closes the circuit to the main reverse solenoid (line 9) and also switches the R_dr resistors into circuit. The sensing latch 1305 (line 4) releases the dividend sensing mechanism (line 5) which closes the main division switch 1247 as shown by the black portion of line 5. This switch completes the division estimating circuit and causes operation of one of the multiplier solenoids (line 16) or the zero solenoid (line 17). In the case of the first cycle in the present example, the number three solenoid 1003 is energized, as described hereinbefore. Soon after the number three solenoid (line 16) operates in response to the energization thereof, the main clutch solenoid (line 10) completes its stroke and effects engagement of the main clutch (line 11). The main clutch drives the partial product setting mechanism (line 15) which under control of the number three multiplier solenoid (line 16) sets the partial product selectors for multiplication of three times the divisor and also sets the quotient selection switch 1160 (Fig. 16B) for controlling entry of the digit "3" into the quotient register. At this same time, the timing switch (line 12) starts, and after a short idle period, effects engagement of the first quotient numeral wheel clutch, the registration of which is shown by line 13. The main clutch and cam 1380 (Fig. 14) also open the cut out switches 1372 and 1366 (Fig. 16B) as shown also by line 14, which action also cuts the current off to the main clutch and multiplier solenoids as shown by the black and white portions of lines 10 and 16 marked "on" and "current off," so as to reduce the heating of the solenoids.

During the minus cycle (line 1), the first quotient numeral wheel (line 13) is advanced from 0 to 3 and the product numeral wheels (not shown in this chart) are reduced by the amount of three times the divisor and in the present instance effect an overdraft explained hereinbefore. The partial product setting and the quotient selection switch are restored at the time designated 1470 (line 15) and the multiplier solenoids which have operated, namely the number 3 to 9 multiplier solenoids, inclusive, are restored at the time designated 1471 (line 16). Near the end of the main clutch cycle the division control lever (line 8) is restored and the latch 1345 (line 7) locks it in its plus position. The division control lever opens the circuit to the main reverse solenoid as shown by the black and white portions of line 9, which enables the main reverse clutch to reverse to plus position under spring pressure just before full cycle position as described in the application Serial Number 506,519. Near the end of the main clutch cycle the cut out switches (line 14) are also closed at the time designated 1472 and close the circuit through the main clutch solenoid (line 10) which maintains the main clutch in engagement while it passes through full cycle position. In this way the second or correction cycle follows immediately after the first cycle. Current is also supplied, at this time, to one of the multiplier solenoids, which in the present instance is the number one solenoid (line 16) and which is energized as described hereinbefore in connection with Fig. 2 so as to control the setting of the partial product setting mechanism accordingly at the time designated 1473 (line 15).

During the correction cycle, one times the divisor is added to the product register and corrects the overdraft, and "1" is subtracted from the 3 quotient numeral wheel, which moves from three to two, as shown in line 13. Near the end of the second main clutch cycle the partial product setting mechanism (line 15) is restored as before, and the multiplier solenoids (line 16) are also restored by the mechanism described hereinbefore. The cut-out switches (line 14) are again closed, and this time the zero solenoid (line 17) is energized by the quotient estimating mechanism according to the present problem described hereinbefore. The main clutch solenoid (line 10) is also energized as before, but for only an instant as shown at the point designated 1474, since simultaneous energization of the zero solenoid opens the contact 1373 (Fig. 16B) immediately, and cuts the main clutch solenoid out of circuit so that the main clutch may disengage at the end of its current cycle. The zero solenoid also closes the contacts 1376 in the circuit to the shift clutch solenoid (line 18) which effects engagement of the shift clutch (line 19). The latter completes a one order shift of the product and quotient shift switches (line 20) at about two-thirds of the shift clutch cycle. Also the dividend sensing mechanism (line 5) is rocked out by the shift clutch, and switch 1247 (Fig. 13) is opened as described hereinbefore. This switch opening is represented by the white part of line 5, Fig. 17A, and opens all the division control circuits as shown by the white portions of lines 17 and 18 so as to suspend further control of the main and shift clutches until near the end of the shift cycle. The multiplier solenoids are restored by operation of the mechanism shown in Figs. 5 and 6 and described hereinbefore. Restoration of the zero solenoid allows the contacts 1373 (Fig. 16B), in the circuit through the main clutch solenoid to close, and also closes switch 1367, in the circuit to the multiplier solenoids. These circuits are not completed, however, until the main division switch 1247 closes at the point designated 1475 (line 5), near the end of the shift clutch cycle. If the next succeeding quotient estimation gives a zero estimate, the zero solenoid will be re-energized again thereby changing the setting of the switches controlled by the zero solenoid back to their "shift clutch" setting. Otherwise the zero solenoid restoration leaves them conditioned for instituting a main clutch operation upon closure of switch 1247.

During the shift clutch cycle, the cam 1430 (Fig. 13) trips the latch 1345 (line 7) which releases the division control lever (line 8) for movement to minus position, so as to cause re-energization of the main reverse solenoid (line 9) at the time designated 1476. In working out the specific problem illustrated, the main clutch solenoid (line 10) is re-energized upon closure of the main division switch 1247 at the time designated 1475 (line 5), so that the main clutch (line 11) is re-engaged shortly after the end of the shift clutch cycle. The quotient numeral wheels are represented on line 13, and the digit "2" represents the first numeral wheel registration, and after the word "shift" a zero appears on the same line. This zero represents the initial reading of the second numeral wheel which is actuated during the second cycle. The manner in which the respective shift cycles serve to operatively associate the partial product selectors with successive lower product numeral wheel orders may be understood from the description of multiplication described hereinbefore.

The end of the chart at the right of Fig. 17A is repeated at the beginning (the left) of the chart Fig. 17B, which chart shows the continuation of the problem. A "9" quotient is estimated during the second minus cycle (the first in the Fig. 17B) and is correct. Therefore near the end of the ensuing minus cycle the "0" solenoid (line 17) is energized at the time designated 1478, corresponding to the time 1472 at which the main clutch solenoid was re-energized in the first minus cycle (Fig. 17A). The second shift is effected in exactly the same way as described in connection with the first. However, in this instance, according to the particular problem, a zero is again estimated and a third shift (line 1) is effected. Following the third shift a significant digit "3" is estimated and is correct.

In the problem used for this example, the ninth or last quotient digit is also "3," therefore let us assume for the remainder of the description of Fig. 17B that the next shift is the last or idle shift. This last shift (line 1), is the same as the others except that the division stop mechanism described hereinbefore releases the "=" key mechanism (line 2) and enables the return of the latch 1340 (line 6) to latching position at the time designated 1493. The return of the "=" key mechanism opens switch 1320 (Fig. 13) and causes de-energization of the quotient reverse solenoid (line 3), while the latch 1340 (line 6) which was disabled throughout the division calculation latches the division control lever (line 8), and prevents the release thereof when the latch 1345 (line 7) is rocked to unlatching position at the regular time in the shift cycle. Since the division control lever is not released, the latch 1345 is ineffectively rocked out by the shift mechanism and immediately returns to its normal latching position as shown at the time designated 1494 (line 7). The restoration of latch 1340 (line 6) releases into operation the sensing latch 1305 (line 4), also at the time designated 1493. This latter latch prevents the release of the sensing mechanism shown partly in Fig. 13, thus preventing the closure of the main division switch 1247 (line 5). The restart of the main clutch as well as the restart or continuation of shift clutch operation is thus prevented, thereby forestalling the continuation of division and stopping the machine at the end of the current shift cycle (line 19).

SECOND EMBODIMENT OF THE WHEATSTONE BRIDGE

A second embodiment of the Wheatstone bridge is shown in Fig. 18. This bridge includes the same resistors R, $R_{dv}$ and $R_{dr}$, previously described in connection with the bridge shown in Fig. 2, but differs from the latter bridge in that the solenoids are connected across the bridge in what is generally known as a "chain circuit" by means of which the solenoids operate in seriatim instead of substantially simultaneously as in the case of the first embodiment.

At the beginning of a pre-estimation, only the solenoid $q_9$ (Fig. 18) is in circuit, while the remainder of the solenoids are cut out of circuit by the normally open switches 2040a.

Energization of the solenoid $q_9$ moves the switch arm 2051 associated therewith to its lower position, thus opening the switch 2040 in the circuit of said solenoid and closing the switch 2040a in the circuit of the solenoid $q_8$. Energization of the latter solenoid in turn cuts itself out of circuit and throws the solenoid $q_7$ into circuit. In this manner the solenoids are energized in a wave starting with the solenoid $q_9$ and progressing down to and including the solenoid which is significant of the ratio $Dv/Dr$.

The solenoids 2006 and 2007, shown in detail in Fig. 19, are similar to those previously disclosed in connection with Fig. 6 of the first embodiment except that they are not of a polarized type; that is, the armatures 2019 do not "stick" to the solenoid casings either when the solenoids are energized or de-energized.

The arrangement is such that upon energization of a solenoid 2007, for example, the switch leaf 2053 tends to follow the switch arm 2051 and hold the contacts of switch 2040 closed until just before the armature of the solenoid is moved to its full ejected position. At this time the switch 2040a is closed to throw the next lower numbered solenoid into circuit and the switch 2040 is opened to cut the energized solenoid out of circuit. A spring urged latch 2052 is provided to move over the head of the armature and hold the plunger of the armature and its associated switches in operated position even though the solenoid becomes de-energized with the opening of switch 2040.

The latches 2052 hold the armatures of the energized solenoids in operated positions until the MSR magnet 1045 (Fig. 20) is energized. The energization of the magnet rocks the plates 1041a and 1041b clockwise in the manner described hereinbefore in connection with the MSR magnet shown in Fig. 6 and in the present embodiment the tips 1043 of the plates have been altered slightly so as to effect rocking of the latches and release of the armatures 2019. At such time the armatures and the switches 2040 and 2040a are returned by the arm 2051 to the positions shown in Figs. 18 and 19.

Rectifiers, such as the rectifiers 1242 (Fig. 2) of the first embodiment of the Wheatstone bridge have been eliminated from the bridge circuits of the second embodiment (Fig. 18). It will be recalled that the rectifiers 1242 (Fig. 2) prevent the flow of current from resistor R to point X through circuits connected to taps on the resistor R having a higher potential than that of point X, and permit the flow of current only in the opposite direction, namely, from X to resistor R.

The respective values of $R_{dv}$ and $R_{dr}$ establish a potential at point X for which there is a corresponding balance point generally designated "b" at any point on resistor R and selective amounts of current flow from X to those taps on resistor R which are on the right-hand side of the balance point. If there were no rectifiers in the bridge circuits of Fig. 2, then selective amounts of current would also flow in the opposite direction from respective taps on the left-hand side of the balance point "b" to the point X. Current which flows in a direction from point X to the taps will be referred to hereinafter as "forward" current while current in the opposite direction, namely from the taps to point X, will be referred to as "reverse" current.

In the second embodiment the energization of a solenoid significant of the ratio $Dv/Dr$ switches the next lower numbered solenoid into circuit and energization of the latter solenoid by reverse current must be prevented. Only that solenoid which is immediately below a balance point need be considered with respect to reverse current since all others below are cut out of circuit by the switches 2040a when operation of the one immediately below the balance point is prevented. The resistance step between the taps 0 and 1 on resistor R is the greatest and therefore the operation of the 0 and 1 solenoids is most critical with respect to the problem of preventing operation of the lower solenoid by reverse current. By application of the Formula 53 and the tables of values presented hereinbefore, the current required to cause energization of the solenoids may be so determined that when the number 1 solenoid is energized by forward current there is insufficient reverse current to cause energization of the 0 solenoid. The new value of the solenoid current $i_s$ necessary to satisfy the above requirements is somewhat greater than that specified in the first embodiment.

If the above described solenoids were connected at the same taps specified in the first embodiment, then because of the greater amount of current required to operate these solenoids and the smaller resistance steps between the taps of the higher numbered solenoids, the number 8 solenoid, for example, would operate only when the balance point is below the tap of the number 7 solenoid. This would, in some examples, result in over-estimation of a quotient digit by as much as two integers rather than the usual one integer. Such over-estimation would be corrected by mechanism described fully in connection with the first embodiment but slower overall operation would result. This can be avoided, however, by graduating the current requirements of the higher numbered solenoids in proportion to each respective resistance step on resistor R, or preferably, by providing identical solenoids 2000–2009 and locating their points of connection to resistor R in accordance with the theory disclosed in the first embodiment using the new value of the solenoid current $i_s$ described above.

THIRD EMBODIMENT OF THE WHEATSTONE BRIDGE

A third embodiment of the Wheatstone bridge is shown in Fig. 21 which provides for energization of one or more quotient solenoids $q_0-q_9$ by the selective flow of plate current through respective ones of a series of electronic tubes 3010–3019. The power for the energization of the solenoids and the tubes is derived from a source which is independent of the source of power for the bridge circuit. The grid circuits of the tubes are in the bridge circuit and control the plate current and consequently cause operation of the solenoids with negligible current drain from the bridge.

The windings of the solenoids $q_0-q_9$ are included in respective parallel plate circuits each of which includes a plate 3001 and a cathode 3002 of an electronic tube 3010—3019. The plate circuit, including the winding of the solenoid, is connected to a source of electrical power designated at 3003 which is independent of the bridge circuit. When sufficient current passes through the tube, its respective solenoid is energized.

The flow of plate current in a tube 3010—3019 (Fig. 21) is determined by the control voltage in its respective grid circuit. Each grid circuit comprises a grid 3004, a cathode 3002, and their respective connections to the resistor R and point X. The grids are connected to the resistor R by respective taps 0–9, thus establishing the potentials of the grids with respect to point Y. The cathodes 3002 are connected to point X by a common lead 3023 and during each pre-estimation operation, the ratio of $Dv/Dr$ establishes the potential for all of the cathodes with respect to Y, and thus with respect to the grids. The voltage between point X and each grid tap determines the control voltage for a respective tube and thus controls the flow of plate current in accordance with the ratio $Dv/Dr$. The lowest numbered solenoid which is energized, controls the multiplication in the manner previously described.

The resistors 3021 are provided between the taps on resistor R and the respective grids to control the flow of grid current and to limit the excess flow of plate current in the higher numbered tubes during a lower numbered pre-estimation. It will be obvious, however, that a grid resistor, which limits the excess amount of plate current does not affect the determination of whether or not current shall flow across a tube and energize a solenoid.

The flow of plate current through the different tubes is simultaneous since the plate circuits are wired in parallel. It will be noted, however, that the balance of the bridge is not disturbed by the flow of current through one or more tubes and their respective solenoids since the source of the plate current is independent of the bridge; therefore, the correction for the disturbance of the bridge condition, caused by the inclusion of the solenoids in the bridge circuits of the first embodiment and which correction was made in connection with the bridge (Fig. 2), may be dispensed with in the third embodiment (Fig. 21).

The self bias resistors 3022 (Fig. 21) may be provided between X and the respective cathodes to adjust the plate characteristics of the selected type of tubes to the grid voltages which are available under the given conditions of operation of the bridge.

In review, then, of the arrangement shown in Fig. 21, the solenoids are selectively energized by the flow of plate current in their respective tubes. The flow of plate current in a tube is controlled by the grid voltage of the tube. This grid voltage is determined by: (1) the point at which the grid is connected to resistor R, and (2) by the value of the ratio Dv/Dr. Since the grid connections on resistor R are permanent, the grid voltages, and, correspondingly, the plate current of a tube, is under the direct control of the ratio Dv/Dr. Therefore, the energization of the solenoids is determined in each case by the value of said ratio Dv/Dr.

I claim:

1. In a calculating machine having selecting mechanism including a dividend register and means for setting a dividend therein, and a divisor indicator and means for setting a divisor therein; multiplying mechanism for multiplying said divisor by an estimated quotient digit and negatively entering the product thereof into said dividend register; the combination of division mechanism, including a quotient estimating unit comprising, a first means controlled by said selecting mechanism and said dividend register and operable in advance of the operation of the said multiplying mechanism to establish a selected electromotive force representative of the ratio of said dividend to said divisor, and a second means for establishing a plurality of different electromotive forces, mechanism for comparing the electromotive force established by said first means with the plurality of the electromotive forces established by said second means comprising a series of devices representative of the quotient digits one to nine connected in parallel between said first means and said second means and selectively operable by electrical current caused to flow through said devices in response to the differences in potential between the electromotive force established by said first means and those established by said second means, with means for preventing flow of current through all but one of said devices, and means controlled by said one of the devices through which current is permitted to flow for controlling said multiplying mechanism.

2. In a calculating machine having selecting mechanism including, a dividend register and means for setting a dividend therein, and a divisor indicator and means for setting a divisor therein; multiplying mechanism for multiplying said divisor by an estimated quotient digit and negatively entering the products thereof into said dividend register; the combination of, division mechanism including a quotient estimating unit comprising, a first means controlled by selecting mechanism and said dividend register and operable in advance of the operation of said multiplying mechanism to establish a selected electromotive force representative of the ratio of said dividend to said divisor, and a second means for establishing a plurality of different electromotive forces, mechanism for comparing the electromotive force established by said first means with the plurality of electromotive forces established by said second means comprising, a series of devices representative of the quotient digits one to nine connected in parallel between said first means and said second means and selectively operable by electrical current caused to flow through said devices in response to the differences in potential between the electromotive force establishd by said first means and those established by said second means, and rectifying means for preventing the flow of current through those of said devices representative of quotient digits beyond the last of said series through which current is thus permitted to flow, with means controlled by one of the devices through which current is permitted to flow for controlling said multiplying mechanism.

3. In a calculating machine having a dividend receiving device, a divisor receiving device, and a quotient register; the combination of, division mechanism including a quotient estimating unit comprising, a first means controlled by said dividend and divisor receiving devices to establish a selected electromotive force representative of the ratio of the dividend to the divisor, a second means for establishing a plurality of different electromotive forces certain of which are of greater and others of lesser electrical potentials than the potential of said selected electromotive force, and means for comparing the electromotive force established by said first means with the plurality of electromotive forces established by said second means comprising, a series of devices representative of the quotient digits one to nine connected in parallel between said first means and said second means and selectively operable by electrical current caused to flow through said devices in response to the differences in potential between the electromotive force established by said first means and those established by said second means, with switching means controlled by each of the operated devices to disconnect those of said operated devices within said series but short of the last device within the series through which current is thus permitted to flow and to thereby prevent the flow of current through said devices, and means controlled by the device through which current continues to flow for controlling said quotient register.

4. In a calculating machine having a dividend receiving device, a divisor receiving device, and a quotient register; the combination of, division mechanism including a quotient estimating unit comprising, a first means controlled by said dividend and divisor receiving devices to establish a selected electromotive force representative of the ratio of the dividend to the divisor, a second means for establishing a plurality of different electromotive forces certain of which are of greater and others of lesser electrical potentials than the potential of said selected electromotive force, and mechanism for comparing the electromotive force established by said first means with the plurality of electromotive forces established by said second means comprising, a series of devices representative of the quotient digits one to nine connected in parallel between said first means and said second means and operable by electrical current caused to flow through said devices in response to the differences in potential between the electromotive force establishd by said first means and those established by said second means, with rectifying means for preventing the flow of current through those of said devices representative of quotient digits beyond the last of said series through which current is thus permitted to flow to thereby prevent operation thereof, switching means controlled by each of the operated devices to disconnect those of said devices within said series but short of the last device within the series through which current is thus permitted to flow and to thereby prevent the flow of current through said devices, and means controlled by the device through which current continues to flow for controlling said quotient register.

5. In a calculating machine having a quotient registering mechanism and quotient estimating means comprising a Wheatstone bridge, said bridge including a dividend resistor and a divisor resistor, and means for adjusting said dividend and divisor resistors to establish a selected resistance ratio therebetween which corresponds approximately to the ratio of said dividend to said divisor; the combination of, means for connecting said dividend resistor to said divisor resistor at a junction point; quotient resistor means comprising a resistor tapped at a plurality of points each dividing the resistor into two resistances having a predetermined ratio to each other, a plurality of leads connected in parallel from said junction point between the dividend and divisor resistors to the tapped points of said quotient resistor, a source of electrical power, means for connecting said power source to said bridge to energize the same and permit different amounts of current to flow over respective ones of said leads according to the respective differences between said selected resistance ratio and said plurality of resistance ratios, and a plurality of devices each connected in series with a respective one of said parallel leads and operable by said respective different amounts of current to control said registering mechanism, with means for preventing flow of current through all but one of said devices.

6. In a calculating machine having a pre-estimation division mechanism including a Wheatstone bridge, a plurality of quotient elements connected across said bridge each corresponding to a respective one of the quotient digits one to nine, and means selectively operable in response to the variation in the current flow across the bridge to bring into effective operation a selected one of said quotient elements; said Wheatstone bridge including a first variable resistor adjustable to establish resistance values composed of unit components of resistance ($r_{dv}$) each corresponding to a unit digital increment of a dividend, and a second variable resistor adjustable to establish resistance values composed of unit components of resistance ($r_{dr}$) corresponding to a unit digital increment of a divisor; said components of resistance ($r_{dr}$) differing in resistance values from the units component of the resistance ($r_{dv}$) of the first variable resistor.

7. In a calculating machine having a pre-estimation division mechanism including a Wheatstone bridge, a plurality of quotient elements connected across said bridge each corresponding to a respective one of the quotient digits one to nine, and means selectively operable in response to the variation in the current flow across the bridge to bring into effective operation a selected one of said quotient elements; said Wheatstone bridge including a first variable resistor adjustable to establish resistance values composed of unit components of resistance ($r_{dv}$) each corresponding to a unit digital increment of a dividend, and a second variable resistor adjustable to establish resistance values composed of unit components of resistance ($r_{dr}$) corresponding to a unit digital increment of a divisor, said components of resistance ($r_{dr}$) being greater than the units component of the resistance ($r_{dv}$) of the first variable resistor.

8. In a calculating machine having a quotient register, a quotient estimating device comprising a Wheatstone bridge having on one side thereof, a variable resistor adjustable to establish resistance values composed of unit components of resistance ($r_{dv}$) each corresponding to a unit digital increment of a dividend, and a second variable resistor adjustable to establish resistance values composed of unit components of resistance ($r_{dr}$) each corresponding to a unit digital increment of a divisor, means for connecting said two resistors in series at a junction point, a fixed resistor on the other side of the bridge, and a plurality of taps on said fixed resistor each dividing said resistor into two resistance components having a predetermined ratio of resistance to each other, a plurality of quotient elements each corresponding to a respective one of the quotient digits zero to nine, inclusive, and connected across the bridge in parallel between said junction point and respective ones of said taps, means for rendering only one of said elements effective to control entry of a respective one of said digits into said register, the ratio of the unit component of resistance ($r_{dr}$) to the unit component of resistance ($r_{dv}$) lying between values of the order of about four and eighteen.

9. In a calculating machine having a quotient register, a quotient estimating device comprising a Wheatstone bridge having on one side thereof, a variable resistor adjustable to establish resistance values composed of unit components of resistance ($r_{dv}$) each corresponding to a unit digital increment of a dividend, and a second variable resistor adjustable to establish resistance values composed of unit components of resistance ($r_{dr}$) each corresponding to a unit digital increment of a divisor, means for connecting said two resistors in series at a junction point, a fixed resistor on the other side of the bridge, and a plurality of taps on said fixed resistor each dividing said resistor into two resistance components having a predetermined ratio of resistance to each other, a plurality of quotient elements ($q_0$, $q_1$ ... $q_n$ ... $q_9$) corresponding to the respective quotient digits (0, 1 ... $n$ ... 9) and connected across the bridge in parallel between said junction point and respective ones of said taps, means for rendering only one of said elements effective to control entry of a respective one of said digits into said register, the ratio of the resistance $r_{dr}$ to the resistance $r_{dv}$ being substantially in accordance with the following formula:

$$\frac{r_{dr}}{r_{dv}} = \sqrt{q_n^2 + 3q_n + 2}$$

10. In a calculating machine having a quotient register, a quotient estimating device comprising a Wheatstone bridge having on one side thereof, a dividend resistor adjustable to establish a plurality of resistance values lying within the limits ($R_{dv}^{max}$) and ($R_{dv}^{min}$), and a divisor resistor adjustable to establish a plurality of resistance values lying within the limits ($R_{dr}^{max}$) and ($R_{dr}^{min}$), means for connecting said two resistors in series at a junction point, and means for adjusting said dividend and divisor resistors to establish a selected resistance ratio there-between which corresponds to the ratio of a selected dividend to a selected divisor, a fixed resistor (R) on the other side of the bridge, and a plurality of taps on said fixed resistor each dividing said resistor into two resistance components having a predetermined ratio of resistance to each other, a plurality of quotient solenoids ($q_0, q_1 \ldots q_n \ldots q_9$) each corresponding to a respective one of the quotient digits ($0, 1 \ldots n \ldots 9$) and connected across said bridge in parallel between said junction point and respective ones of said taps, means for rendering only one of said solenoids effective to control entry of a respective one of said digits into said register, the resistance ($r_s$) of each of said solenoids being proportioned with respect to the maximum and minimum resistance values of the dividend and divisor resistors substantially in accordance with the following formula:

$$r_s = \frac{(R_{dr}^{max}+A)(R_{dv}^{max}+R-A)}{2(R_{dr}^{max}+R_{dv}^{max}+R)} + \frac{(R_{dr}^{min}+A)(R_{dv}^{min}+R-A)}{2(R_{dr}^{min}+R_{dv}^{min}+R)}$$

wherein $$A = \frac{10 R R_{dv}^{max}}{10 R_{dr}^{max} + R_{dr}^{max}(q_n+1)}$$

11. The quotient estimating device described in claim 16 wherein $q_n = 8$.

12. In a calculating machine having a quotient register, a quotient estimating device comprising a Wheatstone bridge having on one side thereof, a dividend resistor adjustable to establish a plurality of resistance values ($R_{dv}$), and a divisor resistor adjustable to establish a plurality of resistance values ($R_{dr}$), means for connecting said two resistors in series at a junction point, and means for adjusting said dividend and divisor resistors to establish one of a plurality of selected resistance ratios ($R_{dv}/R_{dr}$) therebetween which represents one of a plurality of respective dividend to divisor ratios ($Dv/Dr$), a resistor on the other side of the bridge said resistor having a fixed resistance value and a plurality of taps on said fixed resistor each dividing said resistor into two resistance components $r_1$ and $r_2$ having a predetermined ratio of resistance ($r_1/r_2$) to each other, a plurality of quotient solenoids, ($q_0, q_1 \ldots q_n \ldots q_9$) corresponding to the respective quotient digits ($0, 1 \ldots n \ldots 9$) and connected across the bridge in parallel between said junction point and respective ones of said taps, a source of electrical power, and means for connecting said power source to said bridge to cause different amounts of current to flow through said solenoids in accordance with the difference between said selected resistance ratio ($R_{dv}/R_{dr}$) and said predetermined resistance ratios ($r_1/r_2$), means for rendering only one of said solenoids effective to control entry of a respective one of said digits into said register, the resistance ratio $r_1/r_2$ which is established by a tap connected to a quotient solenoid $q_n$ differing from the $R_{dv}/R_{dr}$ ratio corresponding to a $Dv/Dr$ ratio of $n$ sufficiently to cause an operating current to flow through the solenoid $q_n$.

13. In a calculating machine having a quotient register, a quotient estimating device comprising a Wheatstone bridge having on one side thereof, a dividend resistor adjustable to establish a plurality of resistance values ($R_{dv}$), and a divisor resistor adjustable to establish a plurality of resistance values ($R_{dr}$), means for connecting said two resistors in series at a junction point, and means for adjusting said dividend and divisor resistors to establish one of a plurality of selected resistance ratios ($R_{dv}/R_{dr}$) therebetween which represents one of a plurality of respective dividend to divisor ratios ($Dv/Dr$), a resistor on the other side of the bridge, said resistor having a fixed resistance value and a plurality of taps on said fixed resistor each dividing said resistor into resistance components $r_1$ and $r_2$ having a predetermined ratio of resistance ($r_1/r_2$) to each other, a plurality of quotient solenoids ($q_0 \ldots q_n \ldots q_9$) corresponding to the respective quotient digit ($0 \ldots 1 \ldots n \ldots 9$) and connected across the bridge in parallel between said junction point and respective ones of said taps, a source of electrical power, and means for connecting said power source to said bridge to cause different amounts of current to flow through said solenoids in accordance with the difference between said selected resistance ratio ($R_{dv}/R_{dr}$) and said predetermined resistance ratio ($r_1/r_2$), means for rendering only one of said solenoids effective to control entry of a respective one of said digits into said register, the resistance ratio $r_1/r_2$ which is established at a tap connected to a quotient solenoid $q_n$ differing from the $R_{dv}/R_{dr}$ ratio corresponding to a $Dv/Dr$ ratio greater than $n$ and less than $n+1$ sufficiently to cause an operating current to flow through the solenoid $q_n$.

14. In a calculating machine having a quotient register, a quotient estimating device comprising a Wheatstone bridge having on one side thereof, a divisor resistor adjustable to establish a plurality of resistance values ($R_{dv}$) lying within the maximum and minimum resistance limits ($R_{dv}^{max}$) and ($R_{dv}^{min}$), and a divisor resistor adjustable to establish a plurality of resistance values ($R_{dr}$) lying within the maximum and minimum resistance limits ($R_{dr}^{max}$) and ($R_{dr}^{min}$), means for connecting said two resistors in series at a junction point, and means for adjusting said dividend and divisor resistors to establish one of a plurality of selected resistance ratios ($R_{dv}/R_{dr}$) therebetween which corresponds to one of a plurality of selected ratios ($D_v/D_r$) of a selected dividend value ($Dv$) to a selected divisor value ($Dr$), a resistor on the other side of the bridge said resistor having a fixed resistance value ($R$), and a plurality of taps on said resistor each dividing said resistor into two resistance components ($r_1$) and ($r_2$) having a predetermined ratio of resistance to each other, a plurality of quotient solenoids ($q_0, q_1 \ldots q_n \ldots q_9$) corresponding to the respective quotient digits ($0, 1 \ldots n \ldots 9$) and connected across the bridge in parallel between said junction point and respective ones of said taps, each of said solenoids being operable on a current ($i_s$) and having a resistance ($r_s$); a source of electrical power, and means for connecting said power source to said bridge to establish a voltage drop ($E$) across the bridge and to cause different amounts of current to flow through said solenoids in accordance with the difference between said selected resistance ratio and said predetermined resistance ratios, means for rendering only one of said solenoids effective to control entry of a respective one of said digits into said register, the resistance ($r_2$) being proportioned substantially in accordance with the following formula:

$$r_2 = \frac{r_2' + r_2''}{2} = \frac{R}{2} + \frac{E}{2i_s} - \sqrt{\left(\frac{R}{4} + \frac{E}{4i_s}\right)^2 - \frac{\frac{R_{dr}^{\max}RE}{i_s} - \frac{(R_{dr}^{\max})^2 R(q_n+1)}{K} - \left[\frac{(q_n+1)R_{dr}^{\max}}{K} + R_{dr}^{\max}\right]r_s R}{4\left[\frac{(q_n+1)R_{dr}^{\max}}{K} + R_{dr}^{\max}\right]}}$$

$$\sqrt{\left(\frac{R}{4} + \frac{E}{4i_s}\right)^2 - \frac{\frac{R_{dr}^{\min}RE}{i_s} - \frac{(R_{dr}^{\min})^2 R(q_n+1)}{K} - \left[\frac{(q_n+1)R_{dr}^{\min}}{K} + R_{dr}^{\min}\right]r_s R}{4\left[\frac{(q_n+1)R_{dr}^{\min}}{K} + R_{dr}^{\min}\right]}}$$

15. In a calculating machine having a quotient register, a quotient estimating device comprising a Wheatstone bridge having on one side thereof, a dividend resistor adjustable to establish a plurality of resistance values ($R_{dv}$), and a divisor resistor adjustable to establish a plurality of resistance values ($R_{dr}$), means for connecting said two resistors at a junction point, selectively operable means for adjusting said dividend and divisor resistors to establish a selected resistance ratio ($R_{dv}/R_{dr}$) which represents a given ratio of the dividend to the divisor, a fixed resistor on the other side of the bridge, and a plurality of taps thereon each dividing said fixed resistor into two resistance components having a predetermined ratio of resistance to each other, a plurality of electrically operated devices each connected across said bridge between a respective tap and said junction point and operable in accordance with the difference between said selected resistance ratio and said predetermined resistance ratio to estimate the quotient of said dividend and divisor, means for rendering only one of said devices effective to control entry of a respective one of said digits into said register, the aforementioned dividend and divisor resistors being so proportioned with respect to each other that said selected resistance ratio ($R_{dv}/R_{dr}$) corresponding to said given dividend and divisor ratio decreases in response to proportional increase of the individual values of the dividend and divisor.

16. A quotient estimating device for calculating machines comprising a Wheatstone bridge having a dividend resistor and a divisor resistor, means for receiving a selected dividend and divisor, and means operable under control of said receiving means to adjust the dividend and divisor resistors to establish a resistance ratio therebetween which is representative of the dividend-divisor ratio, a plurality of quotient elements, and means selectively operable in accordance with said resistance ratio to cause an operating current to flow through the selected one of said elements which corresponds to the partial quotient of the selected dividend and divisor, at least one of said resistors being composed of nonuniform steps of resistance to cause substantially the same current to flow through said selected one of the elements for different individual values of the dividend and divisor which are in the same given ratio.

17. In a calculating machine having a quotient register, a quotient estimating device comprising a Wheatstone bridge having on one side thereof a dividend resistor means including components of resistance ($r_{dv}$) and adjustable to establish a resistance value ($R_{dv}$) which is representative of a selected dividend value, a divisor resistor means adjustable to establish a resistance value ($R_{dr}$) which is representative of a selected divisor value ($Dr$), means connecting said two resistor means in series at a junction point, a quotient resistor on the other side of the bridge having a fixed resistance value ($R$), which resistor is tapped at a plurality of points each dividing said resistor into two resistance components ($r_1$) and ($r_2$), a plurality of quotient solenoids ($q_0, q_1 \ldots q_n \ldots q_9$) corresponding to the respective quotient digits ($0, 1, \ldots n \ldots 9$) and connected across the bridge in parallel between said junction point and said taps, said solenoids each having a resistance ($r_s$) and each operable on a current ($i_s$), a source of electrical power and means for connecting said power source to said bridge to energize the same at a voltage ($E$), means for rendering only one of said solenoids effective to control entry of a respective one of said digits into said register, the divisor resistance value ($R_{dr}$) being proportioned substantially in accordance with the following formula:

$$R_{dr} = \frac{r_2 + \frac{i_s}{E}r_2(R - r_2) + r_s R}{R - r_2 - \frac{i_s}{E}R_{dv}R + r_2(R - r_2) + r_s R} R_{dv}$$

wherein $$R_{dv} = Dr(q_n + 1)r_{dv}$$

18. In a calculating machine having a dividend register and a divisor indicator, selecting mechanism for setting a dividend in said register and a divisor in said indicator; multiplying mechanism for multiplying said divisor by an estimated quotient digit and negatively entering the product thereof into said dividend register; the combination of division mechanism including a quotient estimating unit comprising, a source of electrical power, a first means connected to said source and controlled by said divisor indicator and said dividend register and operable in advance of the operation of said multiplying mechanism to establish a selected electromotive force representative of the ratio of said dividend to said divisor, and a second means for establishing a plurality of different electromotive forces; mechanism for comparing the electromotive force established by said first means with the plurality of the electromotive forces established by said second means comprising, a series of devices representative of the quotient digits one to nine connected in parallel between said first means and said second means and selectively operable in response to the difference in potential between the electromotive force established by said first means and those established by said second means, with a second source of electrical power, a second series of devices connected to said second source and each operable under control of a respective one of the devices in the first series, and means controlled by the second series of devices for controlling said multiplying mechanism.

19. In a calculating machine having a dividend register and a divisor indicator, selecting mechanism for setting a dividend in said register and a divisor in said indicator; multiplying mechanism for multiplying said divisor by an estimated quotient digit and negatively entering the product thereof into said dividend register; the combination of division mechanism including a quotient estimating unit comprising, a source of electrical power, a first means connected to said source and controlled by said divisor indicator and said dividend register to establish a selected electromotive force representative of the ratio of said dividend to said divisor, and a second means for establishing a plurality of different electromotive forces, mechanism for comparing the electromotive force established by said first means with the plurality of the electromotive forces established by said second means comprising, a series of electronic tubes representative of the quotient digits one to nine, means for connecting the control circuits of said tubes in parallel between said first means and said second means and effective to cause current to flow through the controlled circuits of selected ones of said tubes in response to the difference in potential between the electromotive force established by said first means and those established by said second means, with a second source of electrical power, a series of devices each connected to said second source through the controlled circuit of a respective tube and selectively operable by the current caused to flow through the latter circuit, and means responsive to said devices upon operation thereof for controlling said multiplying mechanism.

20. In a calculating machine having a dividend register and a divisor indicator, selecting mechanism for entering a dividend in said register and a divisor in said indicator; multiplying mechanism for multiplying said divisor by an estimated quotient digit and negatively entering the product thereof into said dividend register; the combination of division mechanism including a quotient estimating unit comprising, a source of electrical power, a first means connected to said source and including a dividend resistor the resistance value of which is determined by said dividend register and a divisor resistor the resistance value of which is determined by said divisor indicator, said two resistors connected at a junction point and operable to establish at said junction point an electromotive force which is representative of the ratio of the dividend to the divisor, and a second means for establishing a plurality of different electromotive forces, mechanism for comparing the electromotive force established at said junction point by said first means with the plurality of electromotive forces established by said second means comprising, a series of electronic tubes representative of the quotient digits one to nine, means for connecting the control circuits of said tubes in parallel between said junction point and said second means and effective to cause current to flow through the controlled circuit of selected ones of said tubes in response to the difference in potential between the electromotive forces established by said first means and those established by said second means, with a second source of electrical power, a series of devices each connected to said second source and through the controlled circuit of the respective tube to said junction point and selectively operable by the current caused to flow through the latter circuit, and means responsive to said devices upon operation thereof for controlling said multiplying mechanism.

HAROLD T. AVERY.

REFERENCES CITED

The following references are of record in the file of this patent:

UNITED STATES PATENTS

| Number | Name | Date |
|---|---|---|
| 1,952,368 | Gardner | Mar. 27, 1934 |
| 2,108,146 | Simpson | Feb. 15, 1938 |

FOREIGN PATENTS

| Number | Country | Date |
|---|---|---|
| 571,270 | Great Britain | Aug. 14, 1945 |

Certificate of Correction

Patent No. 2,538,826

January 23, 1951

HAROLD T. AVERY

It is hereby certified that error appears in the printed specification of the above numbered patent requiring correction as follows:

Column 1, line 7, for "divident" read *dividend*; column 5, line 4, for the word "outer" read *other*; line 9, for "one" read *on*; column 11, line 57, for "tips 4043" read *tips 1043*; column 12, line 57, for "multiplied" read *multiplier*; column 22, line 9, after that portion of the fraction reading "0.1K" insert a closing parenthesis; lines 46 and 47, for "$\sqrt{19.889} = (R_{dv} + R_{dr})^{min} 4.46$" read *$\sqrt{19.889} = (R_{dv} + R_{dr})^{min} 4.46$*; column 25, line 27, for that portion of the fraction reading "$q_n = 11$" read *$q_n + 11$*; column 31, line 66, for "desired" read *designed*; column 39, line 64, for "expalined" read *explained*; column 40, lines 8 and 9, for "mmediately" read *immediately*; line 63, for the numeral "131" read *1331*; column 43, line 19, for "preesnt" read *present*; column 44, line 60, for "warm" read *worm*; column 47, line 15, for "69731+2402" read *69731÷2402*; column 50, line 25, for "$R_{dv}$" read *$R_{dv}$*; column 57, line 31, for the claim reference numeral "16" read *10*;

and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*